(12) United States Patent
Chaturvedi et al.

(10) Patent No.: US 8,892,646 B2
(45) Date of Patent: Nov. 18, 2014

(54) SYSTEM AND METHOD FOR SHARED SESSION APPEARANCE IN A HYBRID PEER-TO-PEER ENVIRONMENT

(75) Inventors: Sivakumar Chaturvedi, Allen, TX (US); Satish Gundabathula, Irving, TX (US); Rameshkumar Chaturvedi, Allen, TX (US)

(73) Assignee: Damaka, Inc., Richardson, TX (US)

( * ) Notice: Subject to any disclaimer, the term of this patent is extended or adjusted under 35 U.S.C. 154(b) by 0 days.

(21) Appl. No.: 12/868,364

(22) Filed: Aug. 25, 2010

(65) Prior Publication Data
US 2012/0054276 A1    Mar. 1, 2012

(51) Int. Cl.
G06F 15/16    (2006.01)
H04L 29/02    (2006.01)
H04L 29/08    (2006.01)
H04L 12/701   (2013.01)
H04L 29/06    (2006.01)

(52) U.S. Cl.
CPC ............ H04L 67/1046 (2013.01); H04L 45/00 (2013.01); H04L 65/403 (2013.01)
USPC ........... 709/204; 370/260; 370/380; 370/399; 455/417; 455/518

(58) Field of Classification Search
CPC ..... H04L 65/403; H04L 45/00; H04L 67/104; H04L 67/1046
USPC ......... 709/204, 223, 225, 224, 202, 203, 229, 709/250, 226, 227, 238; 370/260, 261, 370/310–312, 229, 462, 472, 381, 438, 907, 370/418, 387, 468, 252, 401, 390, 270, 328, 370/380, 346, 352, 353, 427, 230, 235, 395, 370/432, 338, 414, 413, 389, 398, 335, 327, 370/399, 354, 467, 356, 331, 400, 265, 447, 370/392, 236, 351, 396, 477, 296; 379/177, 379/221, 202, 201, 49; 455/518, 450, 436, 455/466, 416, 503, 343, 517, 127, 445, 427, 455/12, 428, 5, 19, 434, 456, 411, 414, 458, 455/417, 426, 463, 435, 41, 47, 512, 403, 455/555, 461, 554, 446, 90; 375/256, 316; 398/58, 48; 340/10.33, 539, 7.39, 7.21, 340/7.32; 711/151, 158; 710/240–244, 111, 710/113, 116, 119; 705/17
See application file for complete search history.

(56) References Cited

U.S. PATENT DOCUMENTS 5,442,637 A    8/1995    Nguyen
5,761,309 A    6/1998    Ohashi et al.
(Continued)

FOREIGN PATENT DOCUMENTS

EP    1404082 A2    3/2004
EP    160339 A1    12/2005
(Continued)

OTHER PUBLICATIONS

Balamurugan Karpagavinayagam et al. (Monitoring Architecture for Lawful Interception in VoIP Networks, ICIMP 2007, Aug. 24, 2008).*

(Continued)

*Primary Examiner* — Zachary A Davis
*Assistant Examiner* — Oleg Korsak
(74) *Attorney, Agent, or Firm* — Howison & Arnott, LLP

(57) ABSTRACT

An improved system and method are disclosed for peer-to-peer communications. In one example, the method enables the joining and/or recording of an ongoing peer-to-peer communication session in real time.

38 Claims, 53 Drawing Sheets

(56) References Cited

U.S. PATENT DOCUMENTS

| | | | |
|---|---|---|---|
| 5,790,637 A | 8/1998 | Johnson et al. | |
| 5,818,447 A | 10/1998 | Wolf et al. | |
| 5,889,762 A | 3/1999 | Pajuvirta et al. | |
| 6,031,818 A | 2/2000 | Lo et al. | |
| 6,128,283 A | 10/2000 | Sabaa et al. | |
| 6,141,687 A | 10/2000 | Blair | |
| 6,161,082 A | 12/2000 | Goldberg et al. | |
| 6,202,084 B1 | 3/2001 | Kumar et al. | |
| 6,219,638 B1 | 4/2001 | Padmanabhan et al. | |
| 6,298,129 B1 * | 10/2001 | Culver et al. | 379/202.01 |
| 6,311,150 B1 | 10/2001 | Ramaswamy et al. | |
| 6,343,067 B1 | 1/2002 | Drottar et al. | |
| 6,360,196 B1 | 3/2002 | Poznaski et al. | |
| 6,389,016 B1 | 5/2002 | Sabaa et al. | |
| 6,438,376 B1 | 8/2002 | Elliott et al. | |
| 6,473,425 B1 | 10/2002 | Bellaton et al. | |
| 6,574,668 B1 | 6/2003 | Gubbi et al. | |
| 6,674,459 B2 * | 1/2004 | Ben-Shachar et al. | 348/14.09 |
| 6,741,691 B1 | 5/2004 | Ritter et al. | |
| 6,754,181 B1 * | 6/2004 | Elliott et al. | 370/252 |
| 6,766,373 B1 | 7/2004 | Beadle | |
| 6,826,613 B1 | 11/2004 | Wang et al. | |
| 6,836,765 B1 | 12/2004 | Sussman | |
| 6,842,460 B1 | 1/2005 | Olkkonen et al. | |
| 6,850,769 B2 | 2/2005 | Grob et al. | |
| 6,898,413 B2 | 5/2005 | Yip et al. | |
| 6,912,278 B1 | 6/2005 | Hamilton | |
| 6,940,826 B1 | 9/2005 | Simard et al. | |
| 6,963,555 B1 | 11/2005 | Brenner et al. | |
| 6,975,718 B1 | 12/2005 | Pearce et al. | |
| 6,987,756 B1 | 1/2006 | Ravindranath et al. | |
| 6,999,575 B1 | 2/2006 | Sheinbein | |
| 6,999,932 B1 | 2/2006 | Zhou | |
| 7,006,508 B2 * | 2/2006 | Bondy et al. | 370/410 |
| 7,010,109 B2 * | 3/2006 | Gritzer et al. | 379/202.01 |
| 7,013,155 B1 | 3/2006 | Ruf et al. | |
| 7,079,529 B1 | 7/2006 | Khuc | |
| 7,080,158 B1 | 7/2006 | Squire | |
| 7,092,385 B2 | 8/2006 | Gallant et al. | |
| 7,117,526 B1 | 10/2006 | Short | |
| 7,123,710 B2 * | 10/2006 | Ravishankar | 379/221.1 |
| 7,184,415 B2 | 2/2007 | Chaney et al. | |
| 7,185,114 B1 | 2/2007 | Hariharasubrahmanian | |
| 7,272,377 B2 | 9/2007 | Cox et al. | |
| 7,302,496 B1 | 11/2007 | Metzger | |
| 7,304,985 B2 | 12/2007 | Sojka et al. | |
| 7,345,999 B2 | 3/2008 | Su et al. | |
| 7,346,044 B1 | 3/2008 | Chou et al. | |
| 7,353,252 B1 | 4/2008 | Yang et al. | |
| 7,353,255 B2 | 4/2008 | Acharya et al. | |
| 7,412,374 B1 | 8/2008 | Seiler et al. | |
| 7,457,279 B1 | 11/2008 | Scott et al. | |
| 7,477,282 B2 | 1/2009 | Firestone et al. | |
| 7,487,248 B2 | 2/2009 | Moran et al. | |
| 7,512,652 B1 | 3/2009 | Appelman et al. | |
| 7,542,472 B1 | 6/2009 | Gerendai et al. | |
| 7,564,843 B2 | 7/2009 | Manjunatha et al. | |
| 7,570,743 B2 * | 8/2009 | Barclay et al. | 379/35 |
| 7,574,523 B2 | 8/2009 | Traversat et al. | |
| 7,590,758 B2 | 9/2009 | Takeda et al. | |
| 7,613,171 B2 | 11/2009 | Zehavi et al. | |
| 7,623,476 B2 * | 11/2009 | Ravikumar et al. | 370/261 |
| 7,623,516 B2 * | 11/2009 | Chaturvedi et al. | 370/389 |
| 7,656,870 B2 * | 2/2010 | Ravikumar et al. | 370/389 |
| 7,664,495 B1 | 2/2010 | Bonner et al. | |
| 7,769,881 B2 * | 8/2010 | Matsubara et al. | 709/232 |
| 7,774,495 B2 | 8/2010 | Pabla et al. | |
| 7,778,187 B2 | 8/2010 | Chaturvedi et al. | |
| 7,782,866 B1 | 8/2010 | Walsh et al. | |
| 7,917,584 B2 | 3/2011 | Arthursson | |
| 8,009,586 B2 | 8/2011 | Chaturvedi et al. | |
| 8,065,418 B1 | 11/2011 | Abuan et al. | |
| 8,380,872 B2 * | 2/2013 | Margolis et al. | 709/238 |
| 2001/0050923 A1 | 12/2001 | Park et al. | |
| 2002/0031212 A1 | 3/2002 | O'Neil et al. | |
| 2002/0037000 A1 | 3/2002 | Park et al. | |
| 2002/0038282 A1 | 3/2002 | Montgomery | |
| 2002/0042769 A1 | 4/2002 | Gujral et al. | |
| 2002/0062285 A1 | 5/2002 | Amann et al. | |
| 2002/0064167 A1 | 5/2002 | Khan et al. | |
| 2002/0080719 A1 | 6/2002 | Parkvall et al. | |
| 2002/0087887 A1 | 7/2002 | Busam et al. | |
| 2002/0097150 A1 | 7/2002 | Sandelman et al. | |
| 2002/0120757 A1 | 8/2002 | Sutherland et al. | |
| 2002/0124096 A1 | 9/2002 | Loguinov et al. | |
| 2002/0143548 A1 | 10/2002 | Korall et al. | |
| 2002/0150110 A1 | 10/2002 | Inbar et al. | |
| 2002/0152325 A1 | 10/2002 | Elgebaly et al. | |
| 2002/0156844 A1 | 10/2002 | Maehiro | |
| 2002/0166053 A1 | 11/2002 | Wilson | |
| 2002/0173303 A1 | 11/2002 | Shibutani | |
| 2002/0176404 A1 | 11/2002 | Girard | |
| 2002/0178087 A1 | 11/2002 | Henderson et al. | |
| 2002/0184310 A1 | 12/2002 | Traversat et al. | |
| 2003/0009565 A1 | 1/2003 | Arao | |
| 2003/0031210 A1 | 2/2003 | Harris | |
| 2003/0035441 A1 | 2/2003 | Cheng et al. | |
| 2003/0043764 A1 | 3/2003 | Kim et al. | |
| 2003/0044020 A1 | 3/2003 | Aboba et al. | |
| 2003/0046056 A1 | 3/2003 | Godoy et al. | |
| 2003/0046585 A1 | 3/2003 | Minnick | |
| 2003/0061025 A1 | 3/2003 | Abir | |
| 2003/0061481 A1 | 3/2003 | Levine et al. | |
| 2003/0072485 A1 | 4/2003 | Guerin et al. | |
| 2003/0076815 A1 | 4/2003 | Miller et al. | |
| 2003/0078858 A1 | 4/2003 | Angelopoulos et al. | |
| 2003/0088676 A1 | 5/2003 | Smith et al. | |
| 2003/0105812 A1 | 6/2003 | Flowers, Jr. et al. | |
| 2003/0110047 A1 | 6/2003 | Santosuosso | |
| 2003/0115251 A1 | 6/2003 | Fredrickson et al. | |
| 2003/0126213 A1 | 7/2003 | Betzler | |
| 2003/0135569 A1 | 7/2003 | Khakoo et al. | |
| 2003/0137939 A1 | 7/2003 | Dunning et al. | |
| 2003/0158722 A1 | 8/2003 | Lord | |
| 2003/0163525 A1 | 8/2003 | Hendriks et al. | |
| 2003/0163697 A1 | 8/2003 | Pabla et al. | |
| 2003/0172145 A1 | 9/2003 | Nguyen | |
| 2003/0174707 A1 | 9/2003 | Grob et al. | |
| 2003/0177186 A1 | 9/2003 | Goodman et al. | |
| 2003/0177422 A1 | 9/2003 | Tararoukhine et al. | |
| 2003/0187650 A1 | 10/2003 | Moore et al. | |
| 2003/0202480 A1 | 10/2003 | Swami | |
| 2003/0212772 A1 | 11/2003 | Harris | |
| 2003/0214955 A1 | 11/2003 | Kim | |
| 2003/0217171 A1 | 11/2003 | Von Stuermer et al. | |
| 2003/0217318 A1 | 11/2003 | Choi | |
| 2003/0220121 A1 | 11/2003 | Konishi et al. | |
| 2003/0229715 A1 | 12/2003 | Baratakke et al. | |
| 2004/0005877 A1 | 1/2004 | Vaananen | |
| 2004/0024879 A1 | 2/2004 | Dingman et al. | |
| 2004/0034776 A1 | 2/2004 | Fernando et al. | |
| 2004/0034793 A1 | 2/2004 | Yuan | |
| 2004/0039781 A1 | 2/2004 | LaVallee et al. | |
| 2004/0044517 A1 | 3/2004 | Palmquist | |
| 2004/0052234 A1 | 3/2004 | Ameigeiras et al. | |
| 2004/0062267 A1 | 4/2004 | Minami et al. | |
| 2004/0068567 A1 | 4/2004 | Moran et al. | |
| 2004/0100973 A1 | 5/2004 | Prasad | |
| 2004/0103212 A1 | 5/2004 | Takeuchi et al. | |
| 2004/0128554 A1 | 7/2004 | Maher, III et al. | |
| 2004/0133689 A1 | 7/2004 | Vasisht | |
| 2004/0139225 A1 | 7/2004 | Takahashi | |
| 2004/0139228 A1 | 7/2004 | Takeda et al. | |
| 2004/0139230 A1 | 7/2004 | Kim | |
| 2004/0143678 A1 | 7/2004 | Chari et al. | |
| 2004/0148434 A1 | 7/2004 | Matsubara et al. | |
| 2004/0153858 A1 | 8/2004 | Hwang | |
| 2004/0158471 A1 | 8/2004 | Davis et al. | |
| 2004/0162871 A1 | 8/2004 | Pabla et al. | |
| 2004/0203834 A1 | 10/2004 | Mahany | |
| 2004/0213184 A1 | 10/2004 | Hu et al. | |
| 2004/0228279 A1 | 11/2004 | Midtun et al. | |
| 2004/0240399 A1 | 12/2004 | Corrao et al. | |
| 2004/0249953 A1 | 12/2004 | Fernandez et al. | |

(56) References Cited

U.S. PATENT DOCUMENTS

| | | |
|---|---|---|
| 2004/0260952 A1 | 12/2004 | Newman et al. |
| 2004/0267527 A1 | 12/2004 | Creamer et al. |
| 2004/0267938 A1 | 12/2004 | Shoroff et al. |
| 2004/0268257 A1 | 12/2004 | Mudusuru |
| 2005/0004982 A1 | 1/2005 | Vernon et al. |
| 2005/0008024 A1 | 1/2005 | Newpol et al. |
| 2005/0015502 A1 | 1/2005 | Kang et al. |
| 2005/0033843 A1 | 2/2005 | Shahi et al. |
| 2005/0033985 A1 | 2/2005 | Xu et al. |
| 2005/0050227 A1 | 3/2005 | Michelman |
| 2005/0071481 A1 | 3/2005 | Danieli |
| 2005/0086309 A1 | 4/2005 | Galli et al. |
| 2005/0091407 A1 | 4/2005 | Vaziri et al. |
| 2005/0105524 A1 | 5/2005 | Stevens et al. |
| 2005/0119005 A1 | 6/2005 | Segal et al. |
| 2005/0120073 A1 | 6/2005 | Cho |
| 2005/0130650 A1 | 6/2005 | Creamer et al. |
| 2005/0132009 A1 | 6/2005 | Solie |
| 2005/0136911 A1 | 6/2005 | Csapo et al. |
| 2005/0138119 A1 | 6/2005 | Saridakis |
| 2005/0138128 A1 | 6/2005 | Baniel et al. |
| 2005/0143105 A1 | 6/2005 | Okamoto |
| 2005/0144288 A1 | 6/2005 | Liao |
| 2005/0187781 A1 | 8/2005 | Christensen |
| 2005/0187957 A1 | 8/2005 | Kramer et al. |
| 2005/0195802 A1 | 9/2005 | Klein et al. |
| 2005/0198499 A1 | 9/2005 | Salapaka et al. |
| 2005/0201357 A1 | 9/2005 | Poyhonen |
| 2005/0201485 A1 | 9/2005 | Fay |
| 2005/0208947 A1 | 9/2005 | Bahl |
| 2005/0220017 A1 | 10/2005 | Brand et al. |
| 2005/0246193 A1 | 11/2005 | Roever et al. |
| 2005/0249196 A1 | 11/2005 | Ansari et al. |
| 2005/0254440 A1 | 11/2005 | Sorrell |
| 2005/0270992 A1 | 12/2005 | Sanzgiri et al. |
| 2005/0286519 A1 | 12/2005 | Ravikumar et al. |
| 2006/0002355 A1 | 1/2006 | Baek et al. |
| 2006/0062180 A1 | 3/2006 | Sayeedi et al. |
| 2006/0069775 A1 | 3/2006 | Artobello et al. |
| 2006/0072506 A1 | 4/2006 | Sayeedi et al. |
| 2006/0120375 A1 | 6/2006 | Ravikumar et al. |
| 2006/0121902 A1 | 6/2006 | Jagadeesan et al. |
| 2006/0121986 A1 | 6/2006 | Pelkey et al. |
| 2006/0148516 A1 | 7/2006 | Reddy et al. |
| 2006/0165029 A1 | 7/2006 | Melpignano et al. |
| 2006/0168643 A1 | 7/2006 | Howard et al. |
| 2006/0171534 A1 | 8/2006 | Baughman |
| 2006/0182100 A1 | 8/2006 | Li et al. |
| 2006/0183476 A1 | 8/2006 | Morita et al. |
| 2006/0187926 A1 | 8/2006 | Imai et al. |
| 2006/0195402 A1 | 8/2006 | Malina et al. |
| 2006/0203750 A1 | 9/2006 | Ravikumar et al. |
| 2006/0205436 A1 | 9/2006 | Liu et al. |
| 2006/0218624 A1 | 9/2006 | Ravikumar et al. |
| 2006/0230166 A1 | 10/2006 | Philyaw |
| 2006/0246903 A1 | 11/2006 | Kong et al. |
| 2006/0258289 A1 | 11/2006 | Dua |
| 2007/0016921 A1 | 1/2007 | Levi et al. |
| 2007/0019545 A1 | 1/2007 | Alt et al. |
| 2007/0025270 A1 | 2/2007 | Sylvain |
| 2007/0078785 A1 | 4/2007 | Bush et al. |
| 2007/0082671 A1 | 4/2007 | Feng et al. |
| 2007/0110043 A1 | 5/2007 | Girard |
| 2007/0111794 A1 | 5/2007 | Hogan et al. |
| 2007/0116224 A1 | 5/2007 | Burke et al. |
| 2007/0130253 A1 | 6/2007 | Newson et al. |
| 2007/0136459 A1 | 6/2007 | Roche et al. |
| 2007/0165629 A1 | 7/2007 | Chaturvedi et al. |
| 2007/0190987 A1 | 8/2007 | Vaananen |
| 2007/0206563 A1 | 9/2007 | Silver et al. |
| 2007/0239892 A1 | 10/2007 | Ott et al. |
| 2007/0253435 A1 | 11/2007 | Keller et al. |
| 2007/0260359 A1 | 11/2007 | Benson et al. |
| 2007/0274276 A1 | 11/2007 | Laroia et al. |
| 2007/0297430 A1 | 12/2007 | Nykanen et al. |
| 2008/0005328 A1 | 1/2008 | Shively et al. |
| 2008/0019285 A1 | 1/2008 | John et al. |
| 2008/0032695 A1 | 2/2008 | Zhu et al. |
| 2008/0069105 A1 | 3/2008 | Costa et al. |
| 2008/0080392 A1 | 4/2008 | Walsh et al. |
| 2008/0091813 A1 | 4/2008 | Bodlaender |
| 2008/0123685 A1 | 5/2008 | Varma et al. |
| 2008/0130639 A1 | 6/2008 | Costa-Requena et al. |
| 2008/0168440 A1 | 7/2008 | Regnier et al. |
| 2008/0192756 A1 | 8/2008 | Damola et al. |
| 2008/0235362 A1 | 9/2008 | Kjesbu et al. |
| 2008/0235511 A1 | 9/2008 | O'Brien et al. |
| 2008/0250408 A1 | 10/2008 | Tsui et al. |
| 2008/0273541 A1 | 11/2008 | Pharn |
| 2008/0320096 A1 | 12/2008 | Szeto |
| 2009/0003322 A1 | 1/2009 | Isumi |
| 2009/0006076 A1 | 1/2009 | Jindal |
| 2009/0052399 A1 | 2/2009 | Silver et al. |
| 2009/0055473 A1 | 2/2009 | Synnergren |
| 2009/0088150 A1 | 4/2009 | Chaturvedi et al. |
| 2009/0136016 A1 | 5/2009 | Gornoi et al. |
| 2009/0156217 A1 | 6/2009 | Bajpai |
| 2009/0182815 A1 | 7/2009 | Czechowski et al. |
| 2009/0192976 A1 | 7/2009 | Spivack et al. |
| 2009/0234967 A1 | 9/2009 | Yu et al. |
| 2009/0240821 A1 | 9/2009 | Juncker et al. |
| 2009/0257433 A1 | 10/2009 | Mutikainen et al. |
| 2009/0300673 A1 | 12/2009 | Bachet et al. |
| 2009/0327516 A1 | 12/2009 | Amishima et al. |
| 2010/0011108 A1 | 1/2010 | Clark et al. |
| 2010/0011111 A1 | 1/2010 | Vizaei |
| 2010/0049980 A1 | 2/2010 | Barriga et al. |
| 2010/0077023 A1 | 3/2010 | Eriksson |
| 2010/0107205 A1 | 4/2010 | Foti |
| 2010/0223047 A1 | 9/2010 | Christ |
| 2010/0279670 A1 | 11/2010 | Ghai et al. |
| 2010/0299150 A1 | 11/2010 | Fein et al. |
| 2010/0299313 A1 | 11/2010 | Orsini et al. |
| 2010/0312832 A1 | 12/2010 | Allen et al. |
| 2010/0312897 A1 | 12/2010 | Allen et al. |
| 2011/0040836 A1 | 2/2011 | Allen et al. |
| 2011/0099612 A1 | 4/2011 | Lee et al. |
| 2011/0122864 A1 | 5/2011 | Cherifi et al. |
| 2011/0145687 A1 | 6/2011 | Grigsby et al. |
| 2011/0314134 A1 | 12/2011 | Foti |
| 2012/0263144 A1 | 10/2012 | Nix |

FOREIGN PATENT DOCUMENTS

| | | |
|---|---|---|
| EP | 1638275 A2 | 3/2006 |
| EP | 1848163 A1 | 10/2007 |
| EP | 1988697 A1 | 11/2008 |
| EP | 1988698 A1 | 11/2008 |
| JP | 2005-94600 | 4/2005 |
| JP | 2007-043598 | 2/2007 |
| KR | 10-2005-0030548 | 3/2005 |
| WO | WO 2004/063843 | 7/2004 |
| WO | WO 2005/009019 | 1/2005 |
| WO | WO 03/079635 | 9/2005 |
| WO | 2006064047 A1 | 6/2006 |
| WO | WO 2006/075677 A1 | 7/2006 |

OTHER PUBLICATIONS

NiceLog User's Manual 385A0114-08 Rev. A2, Mar. 2004.*
RFC 5694 ("Peer-to-Peer (P2P) Architecture: Definition, Taxonomies, Examples, and Applicability", Nov. 2009).*
PCT: International Preliminary Report on Patentability of PCT/US2008/075141; Mar. 9, 2010; 5 pgs.
PCT: International Preliminary Report on Patentability of PCT/US2007/068820; Dec. 31, 2008; 8 pgs.
PCT: International Preliminary Report on Patentability of PCT/US2007/068823; Nov. 27, 2008; 8 pgs.
PCT: International Preliminary Report on Patentability of PCT/US2006/047841; Nov. 6, 2008; 7 pgs.
PCT: International Preliminary Report on Patentability of PCT/US2007/002424; Aug. 7, 2008; 6 pgs.
PCT: International Preliminary Report on Patentability of PCT/US2006/040312; May 2, 2008; 5 pgs.

(56) References Cited

OTHER PUBLICATIONS

PCT: International Preliminary Report on Patentability of PCT/IB2005/000821; Oct. 19, 2006; 10 pgs.
Chathapuram, "Security in Peer-To-Peer Networks", Aug. 8. 2001, XP002251813.
International Search Report and Written Opinion of the International Searching Authority from PCT/IB2005/000821, dated Aug. 5, 2005.
International Search Report and Written Opinion of the International Searching Authority from PCT/US2006/032791, dated Dec. 18, 2006.
International Search Report and Written Opinion of the International Searching Authority from PCT/US2006/040312, dated Mar. 2, 2007.
International Search Report and Written Opinion of the International Searching Authority from PCT/US2006/047841, dated Sep. 12, 2008.
International Search Report and Written Opinion of the International Searching Authority from PCT/US2007/002424, dated Aug. 14, 2007.
International Search Report and Written Opinion of the International Searching Authority from PCT/US2007/068820, dated Jun. 11, 2008.
International Search Report and Written Opinion of the International Searching Authority from PCT/US2007/068821, dated Jun. 14, 2008.
International Search Report and Written Opinion of the International Searching Authority from PCT/US2007068823, dated Jun. 1, 2008.
Jeff Tyson, "How Instant Messaging Works", www.verizon.com/learningcenter, Mar. 9, 2005.
Rory Bland, et al,"P2P Routing" Mar. 2002.
Rosenberg, "STUN—Simple Traversal of UDP Through NAT", Sep. 2002, XP015005058.
Salman A. Baset, et al, "An Analysis of the Skype Peer-To-Peer Internet Telephony Protocol", Department of Computer Science, Columbia University, New York, NY, USA, Sep. 15, 2004.
Singh et al., "Peer-to Peer Internet Telephony Using SIP", Department of Computer Science, Columbia University, Oct. 31, 2004, XP-002336408.
Sinha, S. and Oglieski, A., A TCP Tutorial, Nov. 1998 (Date posted on Internet: Apr. 19, 2001) [Retrieved from the Internet <URL:http//www.ssfnet.org/Exchange/tcp/tcpTutorialNotes.html>].
Pejman Khadivi, Terence D. Todd and Dongmei Zhao, "Handoff trigger nodes for hybrid IEEE 802.11 WLAN/cellular networks," Proc. of IEEE International Conference on Quality of Service in Heterogeneous Wired/Wireless Networks, pp. 164-170, Oct. 18, 2004.
International Search Report and Written Opinion of the International Searching Authority from PCT/US2008/078142, dated Mar. 27, 2009.
International Search Report and Written Opinion of the International Searching Authority from PCT/US2008/084950, dated Apr. 27, 2009.
Hao Wang, Skype VoIP service-architecture and comparison, In: INFOTECH Seminar Advanced Communication Services (ASC), 2005, pp. 4, 7, 8.
Seta, N.; Miyajima, H.; Zhang, L;; Fujii, T., "All-SIP Mobility: Session Continuity on Handover in Heterogeneous Access Environment,"Vehicular Technology Conference, 2007. VTC 2007—Spring. IEEE 65th, Apr. 22-25, 2007, pp. 1121-1126.
International Search Report and Written Opinion of the International Searching Authority from PCT/US2008/075141, dated Mar. 5, 2009.
Qian Zhang; Chuanxiong Guo; Zihua Guo; Wenwu Zhu, "Efficient mobility management for vertical handoff between WWAN and WLAN," Communications Magazine, IEEE, vol. 41. issue 11, Nov. 2003, pp. 102-108.
Isaacs, Ellen et al., "Hubbub: A sound-enhanced mobile instant messenger that supports awareness and opportunistic interactions," Proceedings of the SIGCHI Conference on Human Factors in Computing Systems; vol. 4, Issue No. 1; Minneapolis, Minnesota; Apr. 20-25, 2002; pp. 179-186.

PCT: International Preliminary Report on Patentability of PCT/US2008/084950; Jun. 1, 2010; 5 pgs.
J. Rosenberg et al. "Session Traversal Utilities for NAT (STUN)", draft-ietf-behave-rtc3489bis-06, Mar. 5, 2007.
PCT: International Search Report and Written Opinion for PCT/US2011/024870; Oct. 26, 2011; 12 pages.
J. Rosenberg et al. "Session Traversal Utilities for NAT (STUN)", draft-ietf-behave-rfc3489bis-06, Mar. 5, 2007.
PCT: International Search Report and Written Opinion for PCT/US2011/028685; Nov. 9, 2011; 10 pages.
PCT: International Search Report and Written Opinion for PCT/US2011/029954; Nov. 24, 2011; 8 pages.
PCT: International Search Report and Written Opinion for PCT/US2011/024891; Nov. 25, 2011; 9 pages.
PCT: International Search Report and Written Opinion for PCT/US2011/031245; Dec. 26, 2011; 13 pages.
Wireless Application Protocol—Wireless Transport Layer Security Specification, Version Feb. 18, 2000, Wireless Application Forum, Ltd. 2000; 99 pages.
PCT: International Search Report and Written Opinion for PCT/US2011/040864; Feb. 17, 2012; 8 pages.
PCT: International Search Report and Written Opinion for PCT/US2011/041565; Jan. 5, 2012; 7 pages.
PCT: International Search Report and Written Opinion for PCT/US2011/031246; Dec. 27, 2011; 8 pages.
PCT: International Search Report and Written Opinion for PCT/US2011/049000; Mar. 27, 2012; 10 pages.
PCT: International Search Report and Written Opinion for PCT/US2011/051877; Apr. 13, 2012; 7 pages.
PCT: International Search Report and Written Opinion for PCT/US2011/055101; May 22, 2012; 9 pages.
PCT: International Preliminary Report on Patentability of PCT/US2011/049000; Feb. 26, 2013; 6 pgs.
PCT: International Preliminary Report on Patentability of PCT/US2011/041565; Jan. 10, 2013; 6 pgs.
PCT: International Preliminary Report on Patentability of PCT/US2011/040864; Jan. 3, 2013; 6 pgs.
PCT: International Preliminary Report on Patentability of PCT/US2011/024870; Aug. 30, 2012; 7 pgs.
Dunigan, Tom, "Almost TCP over UDP (atou)," last modified Jan. 12, 2004; retrieved on Jan. 18, 2011 from <http://www.csm.ornl.gov/~dunigan/net100/atou.html> 18 pgs.
Mahy et al., The Session Initiation Protocol (SIP) "Replaces" Header, Sep. 2004, RFC 3891, pp. 1-16.
PCT: International Preliminary Report on Patentability of PCT/US2011/024891; Aug. 30, 2012; 6 pgs.
T. Dierks & E. Rescorla, The Transport Layer Security (TLS) Protocol (Ver. 1.2, Aug. 2008) retrieved at http://tools.ietf.org/htmllrfc5246. Relevant pages provided.
J. Rosenberg et al., SIP: Session Initiation Protocol (Jun. 2008) retrieved at http://tools.ietf.org/html/rfc3261. Relevant pages provided.
Philippe Bazot et al., Developing SIP and IP Multimedia Subsystem (IMS) Applications (Feb. 5, 2007) retrieved at redbooks IBM form No. SG24-7255-00. Relevant pages provided.
PCT: International Preliminary Report on Patentability of PCT/US2011/028685; Oct. 4, 2012; 6 pgs.
PCT: International Preliminary Report on Patentability of PCT/US2011/031245; Oct. 26, 2012; 9 pgs.
PCT: International Preliminary Report on Patentability of PCT/US2011/029954; Oct. 11, 2012; 5 pgs.
PCT: International Preliminary Report on Patentability of PCT/US2011/031246; Nov. 8, 2012; 5 pgs.
Rosenberg, J; "Interactive Connectivity Establishment (ICE): A Protocol for Network Address Translator (NAT) Traversal for Offer/Answer Protocols"; Oct. 29, 2007; I ETF; I ETF draft of RFC 5245, draft-ietf-mmusic-ice-19; pp. 1-120.
Blanchet et al; "IPv6 Tunnel Broker with the Tunnel Setup Protocol (TSP)"; May 6, 2008; IETF; IETF draft of RFC 5572, draftblanchet-v6ops-tunnelbroker-tsp-04; pp. 1-33.
Cooper et al; "NAT Traversal for dSIP"; Feb. 25, 2007; IETF; IETF draft draft-matthews-p2psip-dsip-nat-traversal-00; pp. 1-23.

(56) References Cited

OTHER PUBLICATIONS

Cooper et al; "The Effect of NATs on P2PSIP Overlay Architecture"; IETF; IETF draft draft-matthews-p2psip-nats-and-overlays-01.txt; pp. 1-20.

Srisuresh et al; "State of Peer-to-Peer(P2P) Communication Across Network Address Translators(NATs)"; Nov. 19, 2007; I ETF; I ETF draft for RFC 5128, draft-ietf-behave-p2p-state-06.txt; pp. 1-33.
PCT: International Search Report and Written Opinion for PCT/US2012/046026; Oct. 18, 2012; 6 pages.

* cited by examiner

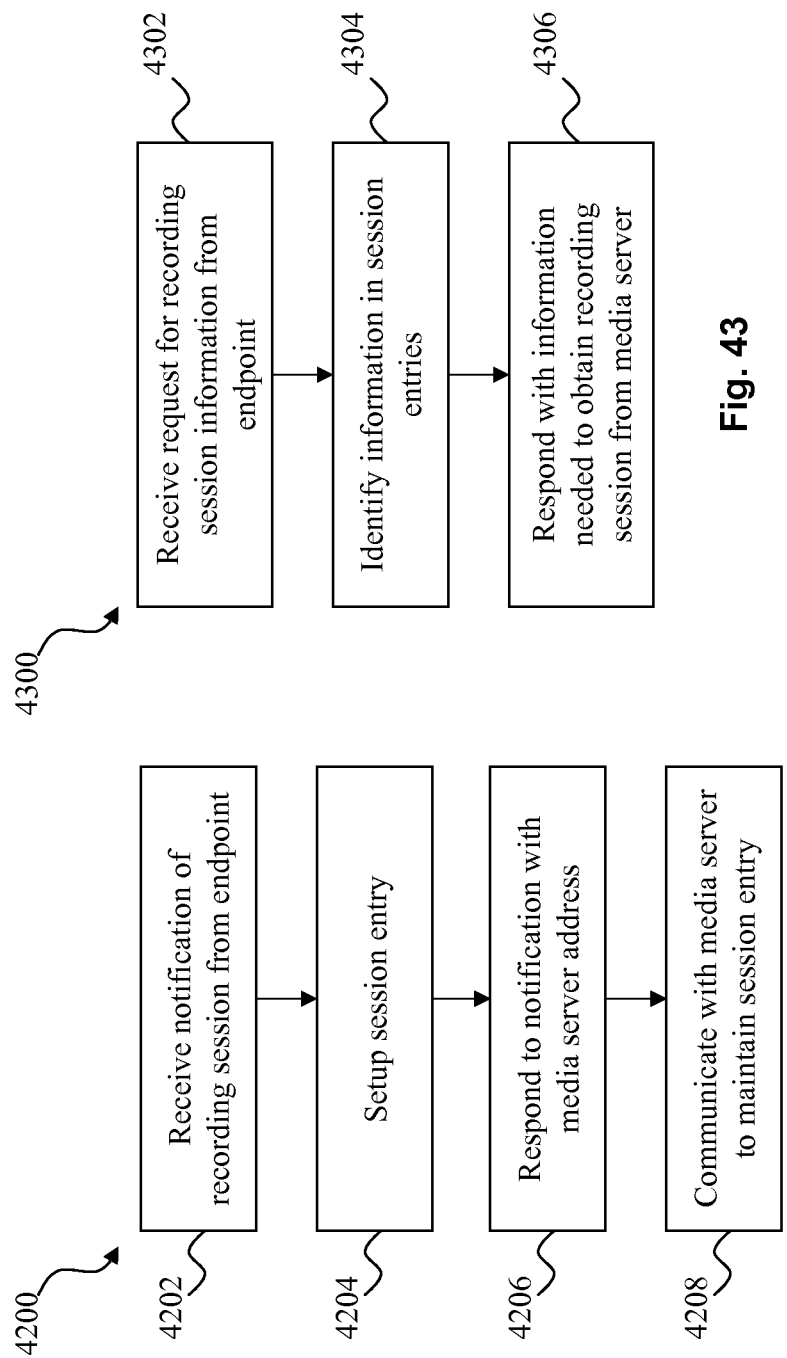

SYSTEM AND METHOD FOR SHARED SESSION APPEARANCE IN A HYBRID PEER-TO-PEER ENVIRONMENT

INCORPORATION BY REFERENCE

The present application incorporates by reference in their entirety U.S. Pat. No. 7,570,636, filed on Aug. 30, 2005, and entitled SYSTEM AND METHOD FOR TRAVERSING A NAT DEVICE FOR PEER-TO-PEER HYBRID COMMUNICATIONS, and U.S. patent application Ser. No. 12/705,925, filed on Feb. 15, 2010, and entitled SYSTEM AND METHOD FOR STRATEGIC ROUTING IN A PEER-TO-PEER ENVIRONMENT.

BACKGROUND

Current packet-based communication networks may be generally divided into peer-to-peer networks and client/server networks. Traditional peer-to-peer networks support direct communication between various endpoints without the use of an intermediary device (e.g., a host or server). Each endpoint may initiate requests directly to other endpoints and respond to requests from other endpoints using credential and address information stored on each endpoint. However, because traditional peer-to-peer networks include the distribution and storage of endpoint information (e.g., addresses and credentials) throughout the network on the various insecure endpoints, such networks inherently have an increased security risk. While a client/server model addresses the security problem inherent in the peer-to-peer model by localizing the storage of credentials and address information on a server, a disadvantage of client/server networks is that the server may be unable to adequately support the number of clients that are attempting to communicate with it. As all communications (even between two clients) must pass through the server, the server can rapidly become a bottleneck in the system.

Accordingly, what is needed are a system and method that addresses these issues.

BRIEF DESCRIPTION OF THE DRAWINGS

For a more complete understanding, reference is now made to the following description taken in conjunction with the accompanying Drawings in which:

FIG. 42 is a flow chart illustrating one embodiment of a method that may be executed by an access server within the system of FIG. 30 to handle a notification from an endpoint that a recording session is to begin.

FIG. 43 is a flow chart illustrating one embodiment of a method that may be executed by an access server within the system of FIG. 30 to handle a request from an endpoint for accessing recording session information.

DETAILED DESCRIPTION

Figure 1:
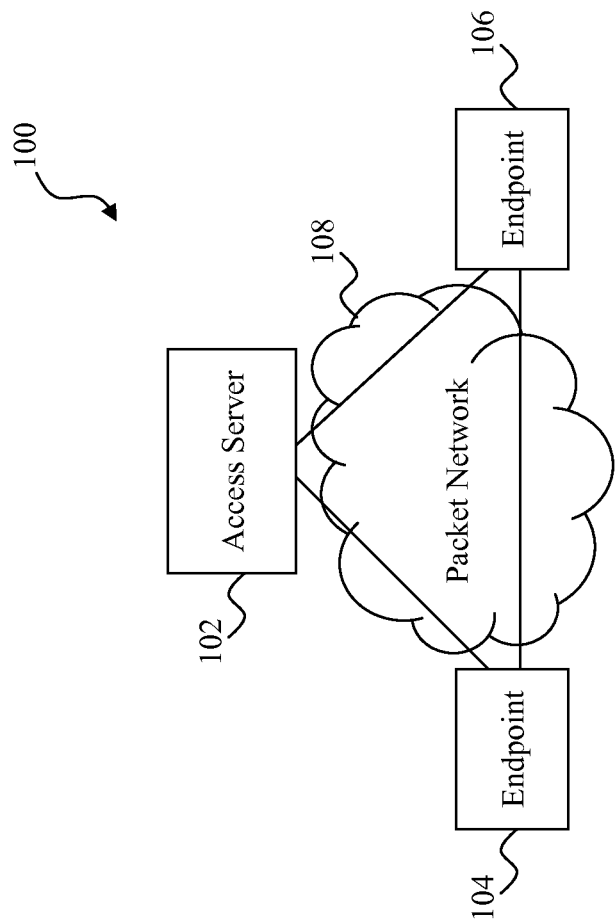
FIG. 1 is a simplified network diagram of one embodiment of a hybrid peer-to-peer system.

The present disclosure is directed to a system and method for peer-to-peer hybrid communications. It is understood that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, one embodiment of a peer-to-peer hybrid system 100 is illustrated. The system 100 includes an access server 102 that is coupled to endpoints 104 and 106 via a packet network 108. Communication between the access server 102, endpoint 104, and endpoint 106 is accomplished using predefined and publicly available (i.e., non-proprietary) communication standards or protocols (e.g., those defined by the Internet Engineering Task Force (IETF) or the International Telecommunications Union-Telecommunications Standard Sector (ITU-T)). For example, signaling communications (e.g., session setup, management, and teardown) may use a protocol such as the Session Initiation Protocol (SIP), while actual data traffic may be communicated using a protocol such as the Real-time Transport Protocol (RTP). As will be seen in the following examples, the use of standard protocols for communication enables the endpoints 104 and 106 to communicate with any device that uses the same standards. The communications may include, but are not limited to, voice calls, instant messages, audio and video, emails, and any other type of resource transfer, where a resource represents any digital data. In the following description, media traffic is generally based on the user datagram protocol (UDP), while authentication is based on the transmission control protocol/internet protocol (TCP/IP). However, it is understood that these are used for purposes of example and that other protocols may be used in addition to or instead of UDP and TCP/IP.

Connections between the access server 102, endpoint 104, and endpoint 106 may include wireline and/or wireless communication channels. In the following description, it is understood that the term "direct" means that there is no endpoint or access server in the communication channel(s) between the endpoints 104 and 106, or between either endpoint and the access server. Accordingly, the access server 102, endpoint 104, and endpoint 106 are directly connected even if other devices (e.g., routers, firewalls, and other network elements) are positioned between them. In addition, connections to endpoints, locations, or services may be subscription based, with an endpoint only having access if the endpoint has a current subscription. Furthermore, the following description may use the terms "user" and "endpoint" interchangeably, although it is understood that a user may be using any of a plurality of endpoints. Accordingly, if an endpoint logs in to the network, it is understood that the user is logging in via the endpoint and that the endpoint represents the user on the network using the user's identity.

The access server 102 stores profile information for a user, a session table to track what users are currently online, and a routing table that matches the address of an endpoint to each online user. The profile information includes a "buddy list" for each user that identifies other users ("buddies") that have previously agreed to communicate with the user. Online users on the buddy list will show up when a user logs in, and buddies who log in later will directly notify the user that they are online (as described with respect to FIG. 4). The access server 102 provides the relevant profile information and routing table to each of the endpoints 104 and 106 so that the endpoints can communicate directly with one another.

Accordingly, in the present embodiment, one function of the access server 102 is to serve as a storage location for information needed by an endpoint in order to communicate with other endpoints and as a temporary storage location for requests, voicemails, etc., as will be described later in greater detail.

Figure 2A:
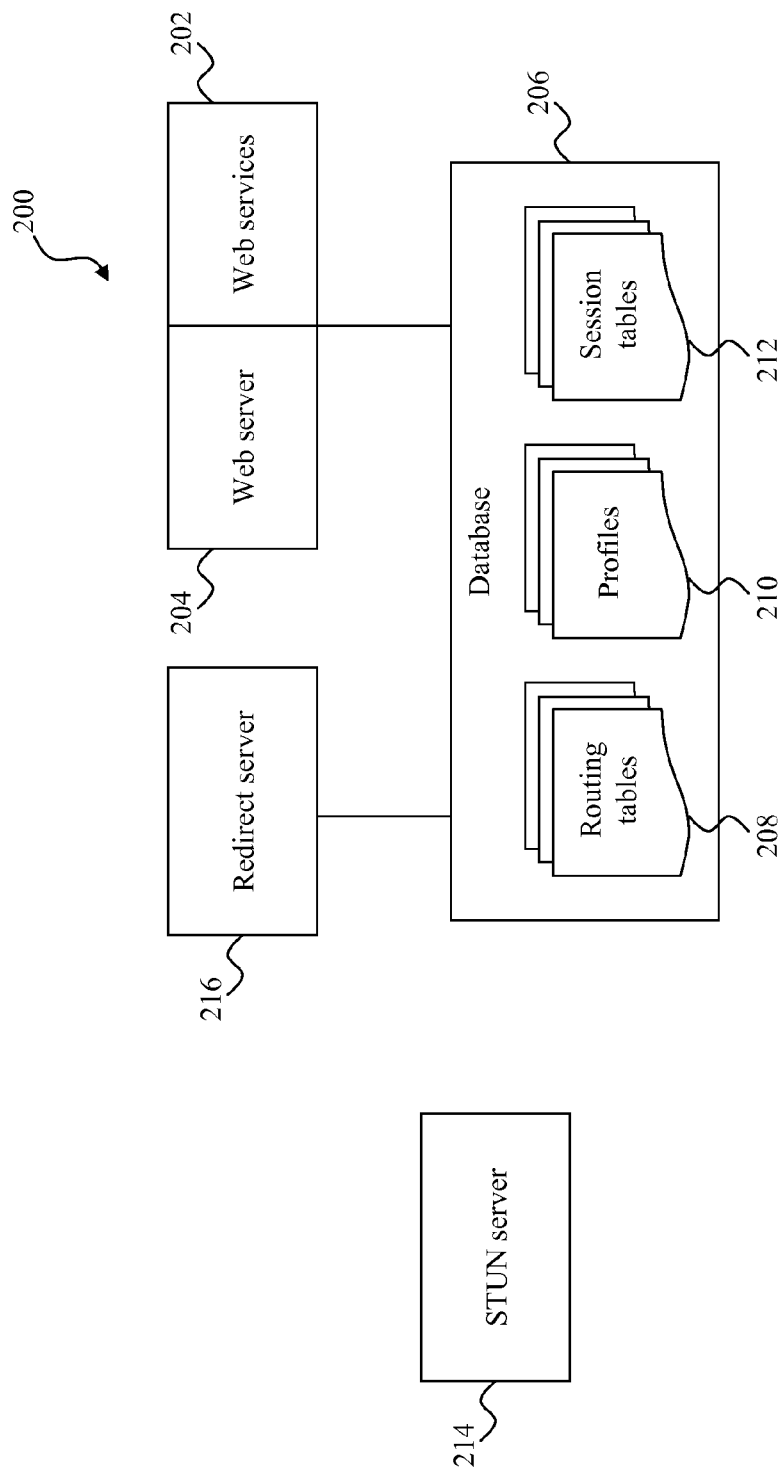
FIG. 2a illustrates one embodiment of an access server architecture that may be used within the system of FIG. 1.

With additional reference to FIG. 2a, one embodiment of an architecture 200 for the access server 102 of FIG. 1 is illustrated. The architecture 200 includes functionality that may be provided by hardware and/or software, and that may be combined into a single hardware platform or distributed among multiple hardware platforms. For purposes of illustration, the access server in the following examples is described as a single device, but it is understood that the term applies equally to any type of environment (including a distributed environment) in which at least a portion of the functionality attributed to the access server is present.

In the present example, the architecture includes web services 202 (e.g., based on functionality provided by XML, SOAP, .NET, MONO), web server 204 (using, for example, Apache or IIS), and database 206 (using, for example, mySQL or SQLServer) for storing and retrieving routing tables 208, profiles 210, and one or more session tables 212. Functionality for a STUN (Simple Traversal of UDP through NATs (Network Address Translation)) server 214 is also present in the architecture 200. As is known, STUN is a protocol for assisting devices that are behind a NAT firewall or router with their packet routing. The architecture 200 may also include a redirect server 216 for handling requests originating outside of the system 100. One or both of the STUN server 214 and redirect server 216 may be incorporated into the access server 102 or may be a standalone device. In the present embodiment, both the server 204 and the redirect server 216 are coupled to the database 206.

Figure 2B:
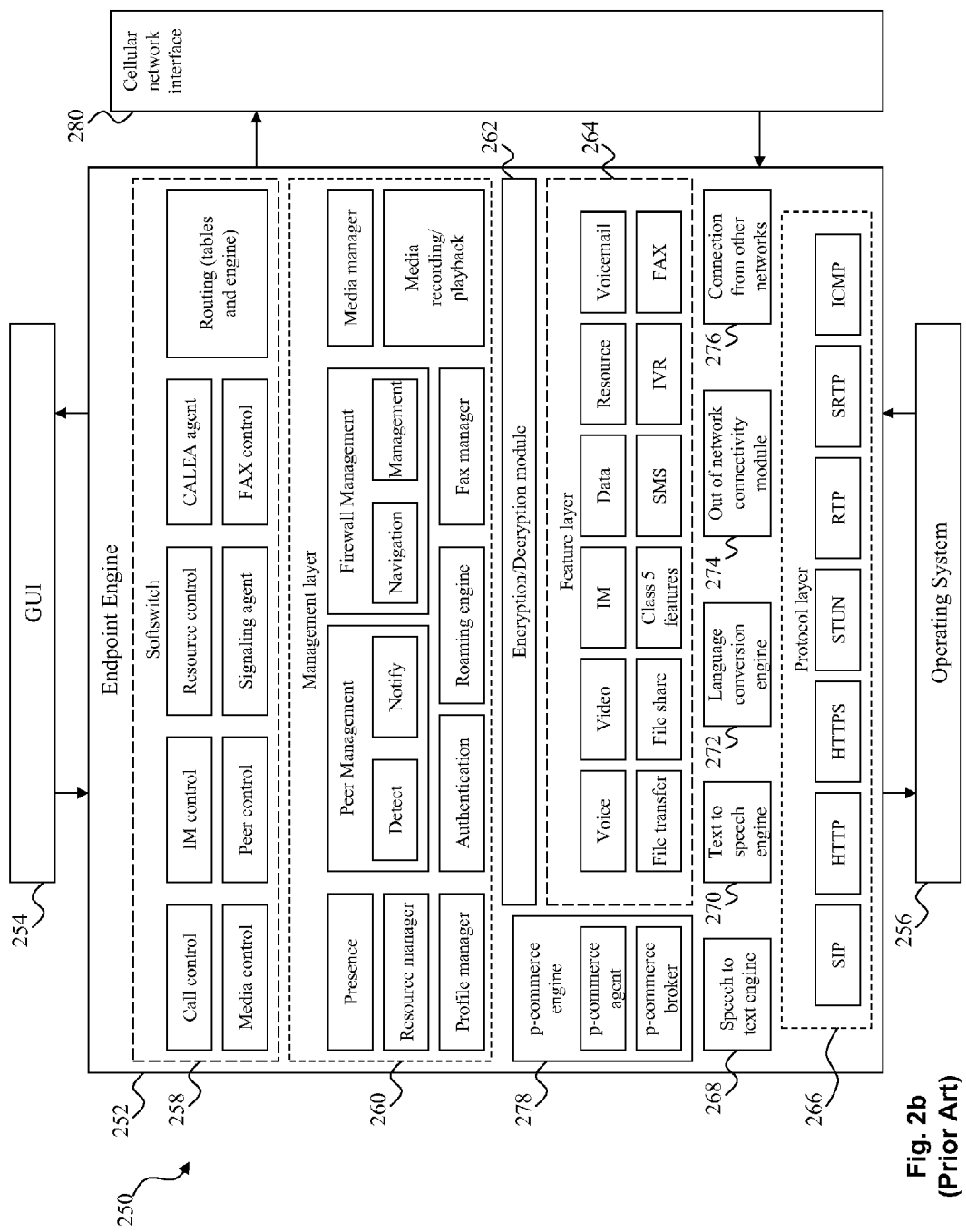
FIG. 2b illustrates one embodiment of an endpoint architecture that may be used within the system of FIG. 1.

Referring to FIG. 2b, one embodiment of an architecture 250 for the endpoint 104 (which may be similar or identical to the endpoint 106) of FIG. 1 is illustrated. It is understood that that term "endpoint" may refer to many different devices having some or all of the described functionality, including a computer, a VoIP telephone, a personal digital assistant, a cellular phone, or any other device having an IP stack upon which the needed protocols may be run. Such devices generally include a network interface, a controller coupled to the network interface, a memory coupled to the controller, and instructions executable by the controller and stored in the memory for performing the functions described in the present application. Data needed by an endpoint may also be stored in the memory. The architecture 250 includes an endpoint engine 252 positioned between a graphical user interface (GUI) 254 and an operating system 256. The GUI 254 provides user access to the endpoint engine 252, while the operating system 256 provides underlying functionality, as is known to those of skill in the art.

The endpoint engine 252 may include multiple components and layers that support the functionality required to perform the operations of the endpoint 104. For example, the endpoint engine 252 includes a softswitch 258, a management layer 260, an encryption/decryption module 262, a feature layer 264, a protocol layer 266, a speech-to-text engine 268, a text-to-speech engine 270, a language conversion engine 272, an out-of-network connectivity module 274, a connection from other networks module 276, a p-commerce (e.g., peer commerce) engine 278 that includes a p-commerce agent and a p-commerce broker, and a cellular network interface module 280.

Each of these components/layers may be further divided into multiple modules. For example, the softswitch 258 includes a call control module, an instant messaging (IM) control module, a resource control module, a CALEA (Communications Assistance to Law Enforcement Act) agent, a media control module, a peer control module, a signaling agent, a fax control module, and a routing module.

The management layer 260 includes modules for presence (i.e., network presence), peer management (detecting peers and notifying peers of being online), firewall management (navigation and management), media management, resource management, profile management, authentication, roaming, fax management, and media playback/recording management.

The encryption/decryption module 262 provides encryption for outgoing packets and decryption for incoming packets. In the present example, the encryption/decryption module 262 provides application level encryption at the source, rather than at the network. However, it is understood that the encryption/decryption module 262 may provide encryption at the network in some embodiments.

The feature layer 264 provides support for various features such as voice, video, IM, data, voicemail, file transfer, file sharing, class 5 features, short message service (SMS), interactive voice response (IVR), faxes, and other resources. The protocol layer 266 includes protocols supported by the endpoint, including SIP, HTTP, HTTPS, STUN, RTP, SRTP, and ICMP. It is understood that these are examples only, and that fewer or more protocols may be supported.

The speech-to-text engine 268 converts speech received by the endpoint (e.g., via a microphone or network) into text, the text-to-speech engine 270 converts text received by the endpoint into speech (e.g., for output via a speaker), and the language conversion engine 272 may be configured to convert inbound or outbound information (text or speech) from one language to another language. The out-of-network connectivity module 274 may be used to handle connections between the endpoint and external devices (as described with respect to FIG. 12), and the connection from other networks module 276 handles incoming connection attempts from external devices. The cellular network interface module 280 may be used to interact with a wireless network.

Figure 2C:
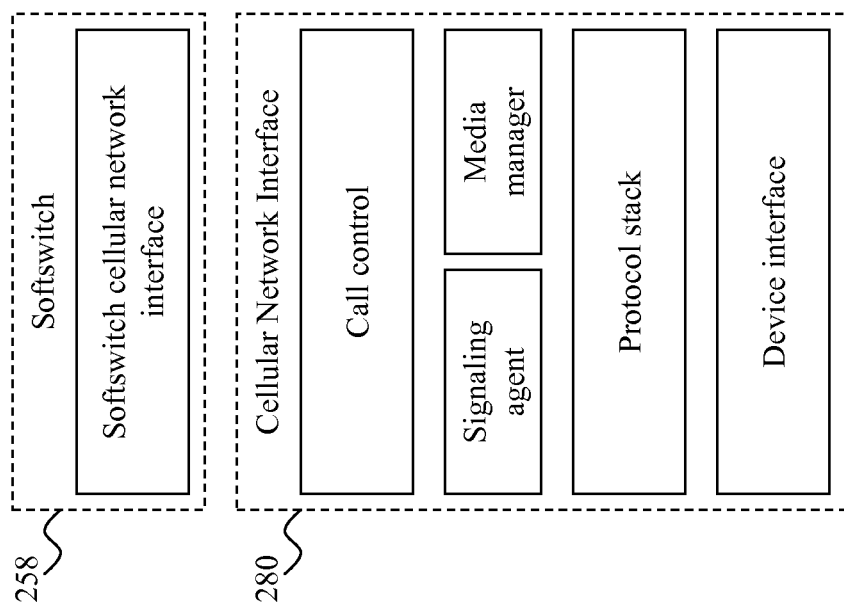
FIG. 2c illustrates one embodiment of components within the endpoint architecture of FIG. 2b that may be used for cellular network connectivity.

With additional reference to FIG. 2c, the cellular network interface module 280 is illustrated in greater detail. Although not shown in FIG. 2b, the softswitch 258 of the endpoint architecture 250 includes a cellular network interface for communication with the cellular network interface module 280. In addition, the cellular network interface module 280 includes various components such as a call control module, a signaling agent, a media manager, a protocol stack, and a device interface. It is noted that these components may correspond to layers within the endpoint architecture 250 and may be incorporated directly into the endpoint architecture in some embodiments.

Figure 2E:
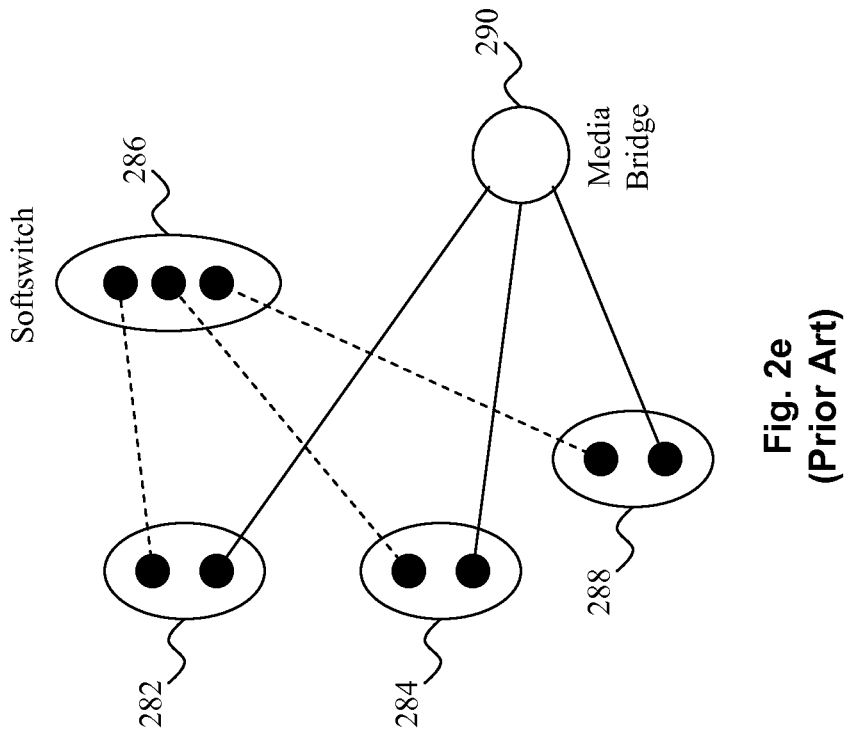
FIG. 2e illustrates a traditional softswitch configuration with three endpoints and a media bridge.
Figure 2D:
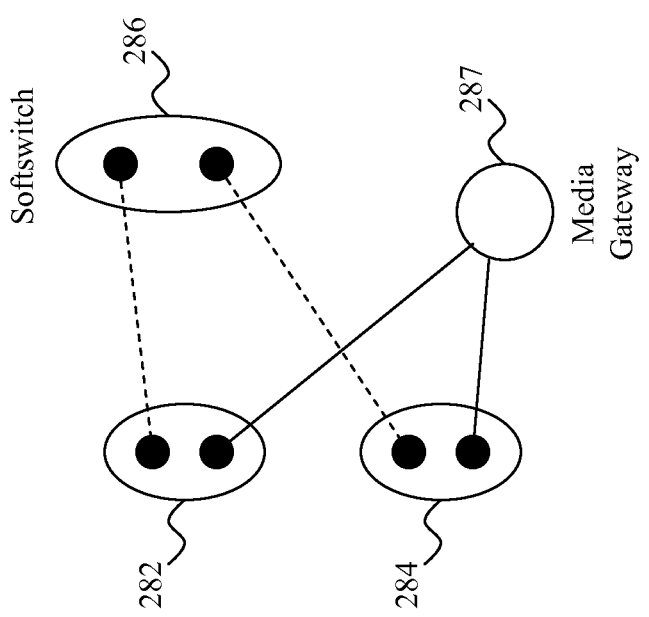
FIG. 2d illustrates a traditional softswitch configuration with two endpoints.

Referring to FIG. 2d, a traditional softswitch architecture is illustrated with two endpoints 282 and 284, neither of which includes a softswitch. In the present example, an external softswitch 286 maintains a first signaling leg (dotted line) with the endpoint 282 and a second signaling leg (dotted line) with the endpoint 284. The softswitch 286 links the two legs to pass signaling information between the endpoints 282 and 284. Media traffic (solid lines) may be transferred between the endpoints 282 and 284 via a media gateway 287.

With additional reference to FIG. 2e, the traditional softswitch architecture of FIG. 2d is illustrated with a third endpoint 288 that also does not include a softswitch. The external softswitch 286 now maintains a third signaling leg (dotted line) with the endpoint 288. In the present example, a conference call is underway. However, as none of the endpoints includes a softswitch, a media bridge 290 connected to each endpoint is needed for media traffic. Accordingly, each endpoint has at most two concurrent connections—one with the softswitch for signaling and another with the media bridge for media traffic.

Figure 2G:
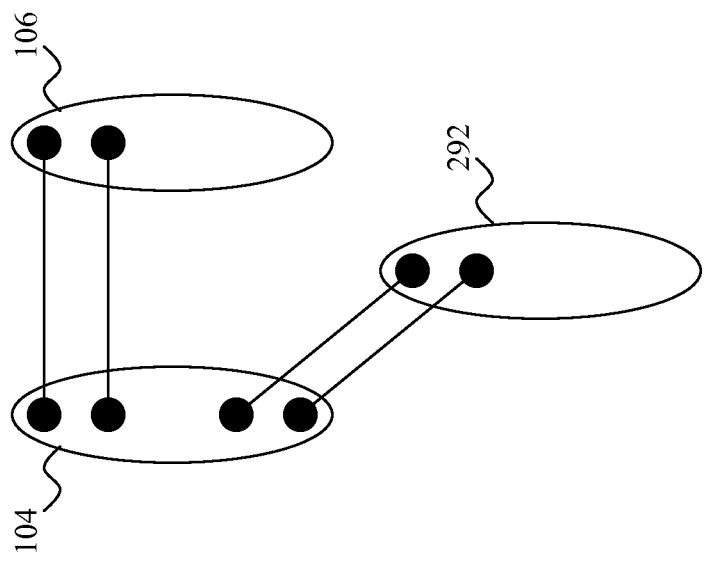
FIG. 2g illustrates one embodiment of the present disclosure with three endpoints, each of which includes a softswitch.
Figure 2F:
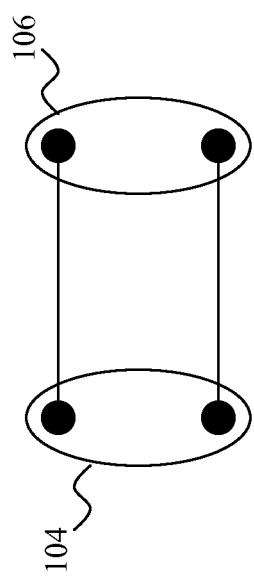
FIG. 2f illustrates one embodiment of the present disclosure with two endpoints, each of which includes a softswitch.

Referring to FIG. 2f, in one embodiment, unlike the traditional architecture of FIGS. 2d and 2e, two endpoints (e.g., the endpoints 104 and 106 of FIG. 1) each include a softswitch (e.g., the softswitch 258 of FIG. 2b). Each endpoint is able to establish and maintain both signaling and media traffic connections (both virtual and physical legs) with the other endpoint. Accordingly, no external softswitch is needed, as this model uses a distributed softswitch method to handle communications directly between the endpoints.

With additional reference to FIG. 2g, the endpoints 104 and 106 are illustrated with another endpoint 292 that also contains a softswitch. In this example, a conference call is underway with the endpoint 104 acting as the host. To accomplish this, the softswitch contained in the endpoint 104 enables the endpoint 104 to support direct signaling and media traffic connections with the endpoint 292. The endpoint 104 can then forward media traffic from the endpoint 106 to the endpoint 292 and vice versa. Accordingly, the endpoint 104 may support multiple connections to multiple endpoints and, as in FIG. 2f, no external softswitch is needed.

Referring again to FIG. 2b, in operation, the softswitch 258 uses functionality provided by underlying layers to handle connections with other endpoints and the access server 102, and to handle services needed by the endpoint 104. For example, as is described below in greater detail with respect to FIGS. 3a and 3b, incoming and outgoing calls may utilize multiple components within the endpoint architecture 250.

Figure 3A:
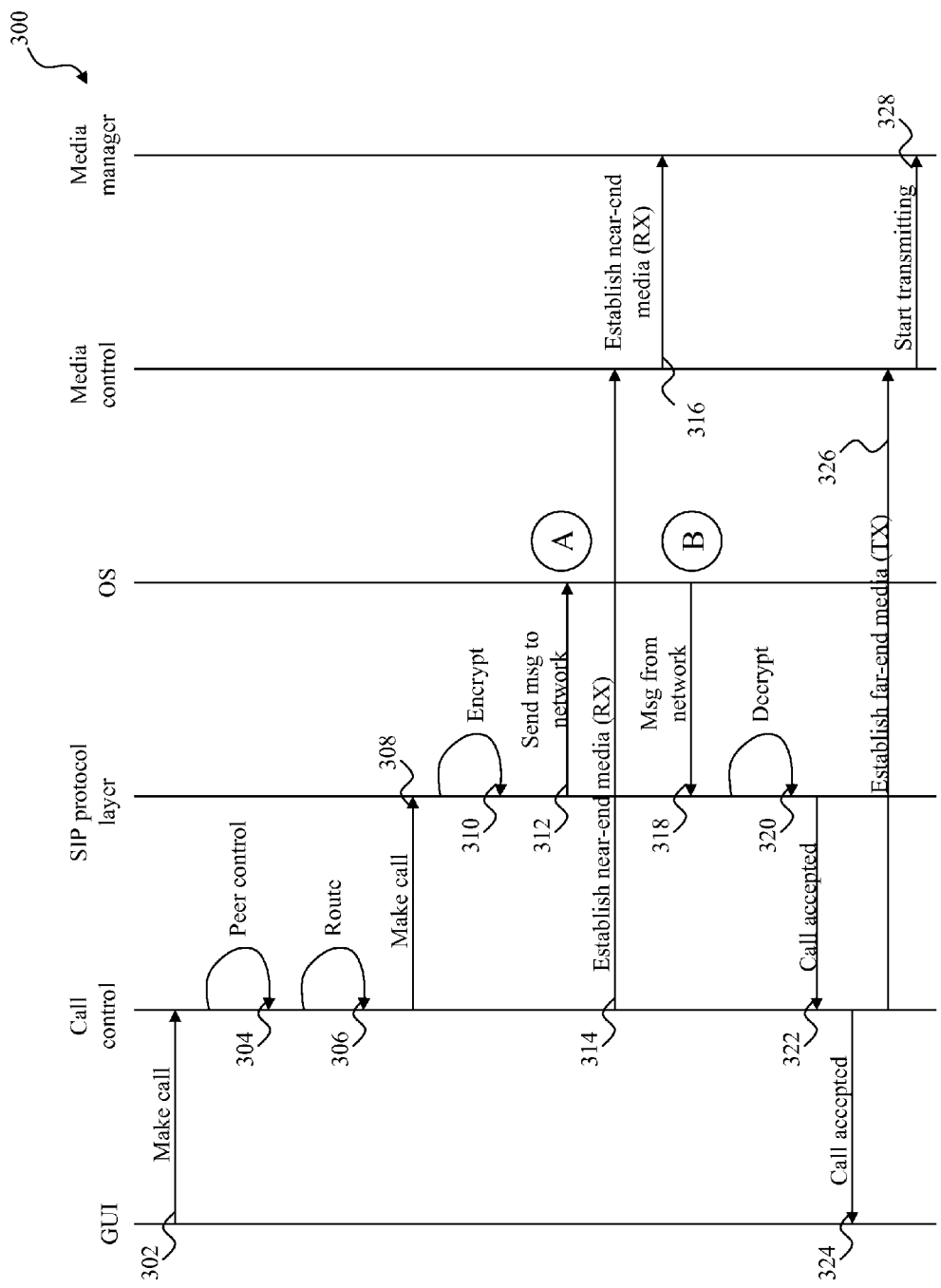
FIG. 3a is a sequence diagram illustrating the interaction of various components of FIG. 2b when placing a call.

Referring to FIG. 3a, a sequence diagram 300 illustrates an exemplary process by which the endpoint 104 may initiate a call to the endpoint 106 using various components of the architecture 250. Prior to step 302, a user (not shown) initiates a call via the GUI 254. In step 302, the GUI 254 passes a message to the call control module (of the softswitch 258) to make the call. The call control module contacts the peer control module (softswitch 258) in step 304, which detects the peer (if not already done), goes to the routing table (softswitch 258) for the routing information, and performs similar operations. It is understood that not all interactions are illustrated. For example, the peer control module may utilize the peer management module (of the management layer 260) for the peer detection. The call control module then identifies a route for the call in step 306, and sends message to the SIP protocol layer (of the protocol layer 266) to make the call in step 308. In step 310, the outbound message is encrypted (using the encryption/decryption module 262) and the message is sent to the network via the OS 256 in step 312.

After the message is sent and prior to receiving a response, the call control module instructs the media control module (softswitch 258) to establish the needed near-end media in step 314. The media control module passes the instruction to the media manager (of the management layer 260) in step 316, which handles the establishment of the near-end media.

Figure 3B:
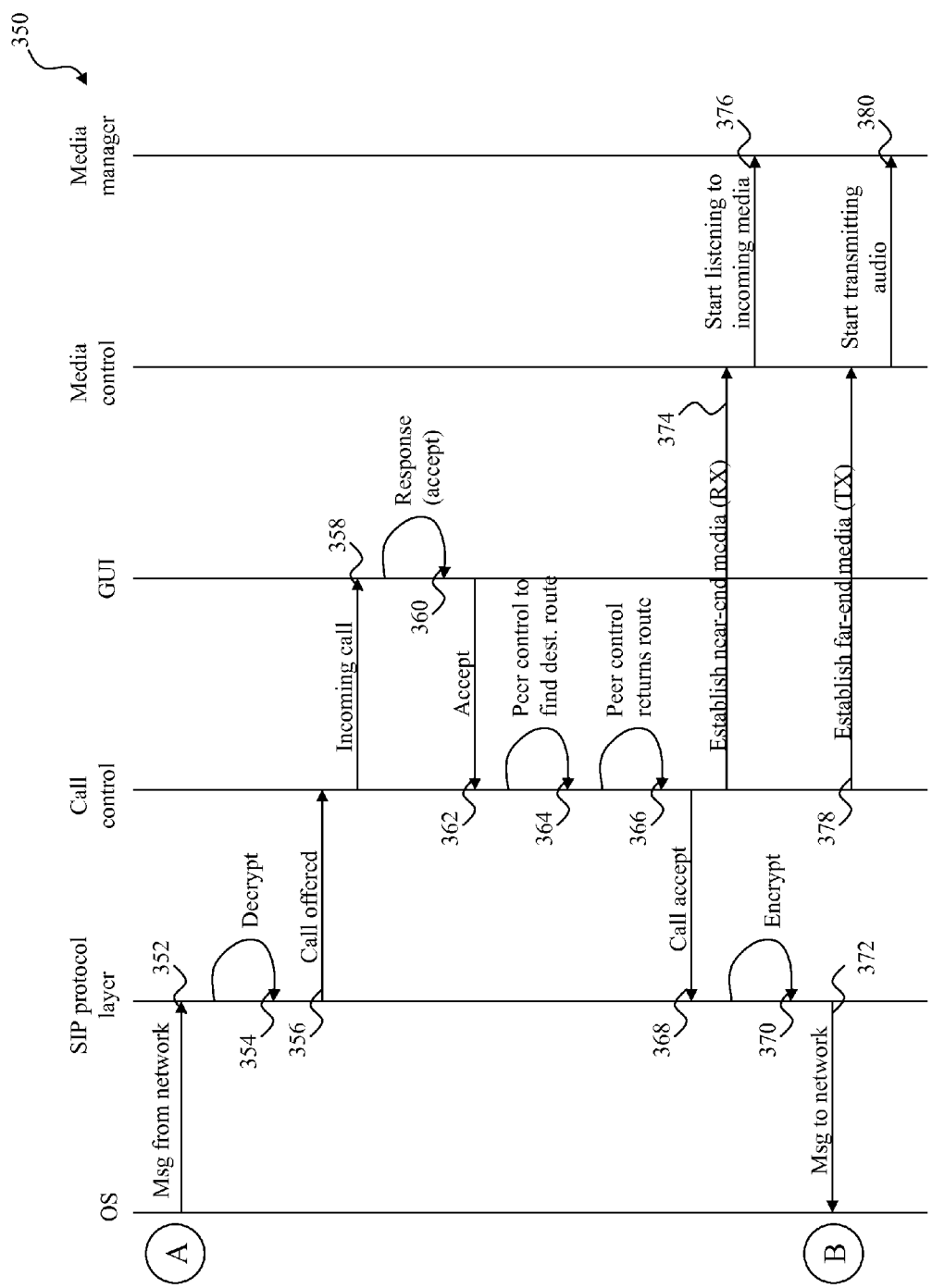
FIG. 3b is a sequence diagram illustrating the interaction of various components of FIG. 2b when receiving a call.

With additional reference to FIG. 3b, the message sent by the endpoint 104 in step 312 (FIG. 3a) is received by the endpoint 106 and passed from the OS to the SIP protocol layer in step 352. The message is decrypted in step 354 and the call is offered to the call control module in step 356. The call control module notifies the GUI of an incoming call in step 358 and the GUI receives input identifying whether the call is accepted or rejected (e.g., by a user) in step 360. In the present example, the call is accepted and the GUI passes the acceptance to the call control module in step 362. The call control module contacts the peer control module in step 364, which identifies a route to the calling endpoint and returns the route to the call control module in step 366. In steps 368 and 370, the call control module informs the SIP protocol layer that the call has been accepted and the message is encrypted using the encryption/decryption module. The acceptance message is then sent to the network via the OS in step 372.

In the present example, after the call control module passes the acceptance message to the SIP protocol layer, other steps may occur to prepare the endpoint 106 for the call. For example, the call control module instructs the media control module to establish near-end media in step 374, and the media control module instructs the media manager to start listening to incoming media in step 376. The call control module also instructs the media control module to establish far-end media (step 378), and the media control module instructs the media manager to start transmitting audio in step 380.

Returning to FIG. 3a, the message sent by the endpoint 106 (step 372) is received by the OS and passed on to the SIP protocol layer in step 318 and decrypted in step 320. The message (indicating that the call has been accepted) is passed to the call control module in step 322 and from there to the GUI in step 324. The call control module then instructs the media control module to establish far-end media in step 326, and the media control module instructs the media manager to start transmitting audio in step 328.

The following figures are sequence diagrams that illustrate various exemplary functions and operations by which the access server 102 and the endpoints 104 and 106 may communicate. It is understood that these diagrams are not exhaustive and that various steps may be excluded from the diagrams to clarify the aspect being described.

Figure 4:
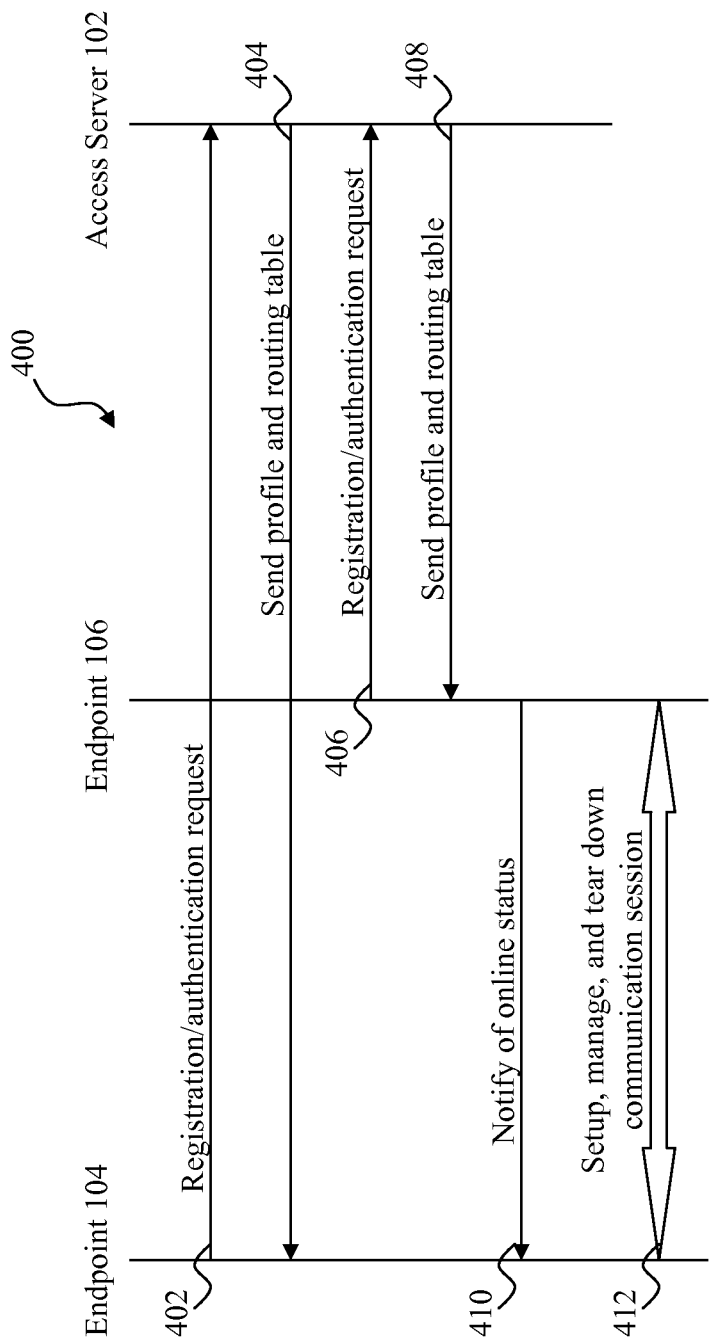
FIG. 4 is a sequence diagram illustrating an exemplary process by which an endpoint of FIG. 1 may be authenticated and communicate with another endpoint.

Referring to FIG. 4 (and using the endpoint 104 as an example), a sequence diagram 400 illustrates an exemplary process by which the endpoint 104 may authenticate with the access server 102 and then communicate with the endpoint 106. As will be described, after authentication, all communication (both signaling and media traffic) between the endpoints 104 and 106 occurs directly without any intervention by the access server 102. In the present example, it is understood that neither endpoint is online at the beginning of the sequence, and that the endpoints 104 and 106 are "buddies." As described above, buddies are endpoints that have both previously agreed to communicate with one another.

In step 402, the endpoint 104 sends a registration and/or authentication request message to the access server 102. If the endpoint 104 is not registered with the access server 102, the access server will receive the registration request (e.g., user ID, password, and email address) and will create a profile for the endpoint (not shown). The user ID and password will then be used to authenticate the endpoint 104 during later logins. It is understood that the user ID and password may enable the user to authenticate from any endpoint, rather than only the endpoint 104.

Upon authentication, the access server 102 updates a session table residing on the server to indicate that the user ID currently associated with the endpoint 104 is online. The access server 102 also retrieves a buddy list associated with the user ID currently used by the endpoint 104 and identifies which of the buddies (if any) are online using the session table. As the endpoint 106 is currently offline, the buddy list will reflect this status. The access server 102 then sends the profile information (e.g., the buddy list) and a routing table to the endpoint 104 in step 404. The routing table contains address information for online members of the buddy list. It is understood that steps 402 and 404 represent a make and break connection that is broken after the endpoint 104 receives the profile information and routing table.

In steps 406 and 408, the endpoint 106 and access server 102 repeat steps 402 and 404 as described for the endpoint 104. However, because the endpoint 104 is online when the endpoint 106 is authenticated, the profile information sent to the endpoint 106 will reflect the online status of the endpoint 104 and the routing table will identify how to directly contact it. Accordingly, in step 410, the endpoint 106 sends a message directly to the endpoint 104 to notify the endpoint 104 that the endpoint 106 is now online. This also provides the endpoint 104 with the address information needed to communicate directly with the endpoint 106. In step 412, one or more communication sessions may be established directly between the endpoints 104 and 106.

Figure 5:
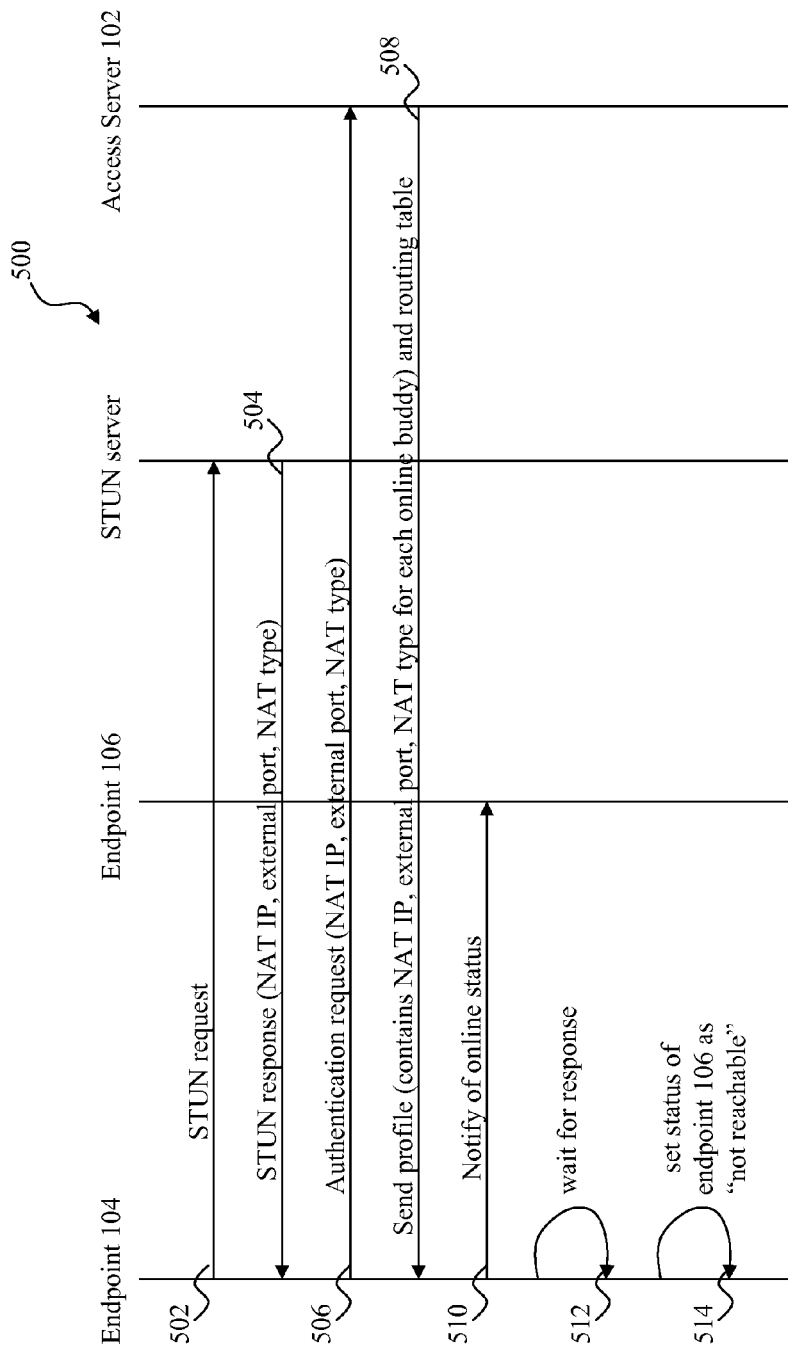
FIG. 5 is a sequence diagram illustrating an exemplary process by which an endpoint of FIG. 1 may determine the status of another endpoint.

Referring to FIG. 5, a sequence diagram 500 illustrates an exemplary process by which authentication of an endpoint (e.g., the endpoint 104) may occur. In addition, after authentication, the endpoint 104 may determine whether it can communicate with the endpoint 106. In the present example, the endpoint 106 is online when the sequence begins.

In step 502, the endpoint 104 sends a request to the STUN server 214 of FIG. 2. As is known, the STUN server determines an outbound IP address (e.g., the external address of a device (i.e., a firewall, router, etc.) behind which the endpoint 104 is located), an external port, and a type of NAT used by the device. The type of NAT may be, for example, full cone, restricted cone, port restricted cone, or symmetric, each of which is discussed later in greater detail with respect to FIG. 10. The STUN server 214 sends a STUN response back to the endpoint 104 in step 504 with the collected information about the endpoint 104.

In step 506, the endpoint 104 sends an authentication request to the access server 102. The request contains the information about endpoint 104 received from the STUN server 214. In step 508, the access server 102 responds to the request by sending the relevant profile and routing table to the endpoint 104. The profile contains the external IP address, port, and NAT type for each of the buddies that are online.

In step 510, the endpoint 104 sends a message to notify the endpoint 106 of its online status (as the endpoint 106 is already online) and, in step 512, the endpoint 104 waits for a response. After the expiration of a timeout period within which no response is received from the endpoint 106, the endpoint 104 will change the status of the endpoint 106 from "online" (as indicated by the downloaded profile information) to "unreachable." The status of a buddy may be indicated on a visual buddy list by the color of an icon associated with each buddy. For example, when logging in, online buddies may be denoted by a blue icon and offline buddies may be denoted by a red icon. If a response to a notify message is received for a buddy, the icon representing that buddy may be changed from blue to green to denote the buddy's online status. If no response is received, the icon remains blue to indicate that the buddy is unreachable. Although not shown, a message sent from the endpoint 106 and received by the endpoint 104 after step 514 would indicate that the endpoint 106 is now reachable and would cause the endpoint 104 to change the status of the endpoint 106 to online. Similarly, if the endpoint 104 later sends a message to the endpoint 106 and receives a response, then the endpoint 104 would change the status of the endpoint 106 to online.

It is understood that other embodiments may implement alternate NAT traversal techniques. For example, a single payload technique may be used in which TCP/IP packets are used to traverse a UDP restricted firewall or router. Another example includes the use of a double payload in which a UDP packet is inserted into a TCP/IP packet. Furthermore, it is understood that protocols other than STUN may be used. For example, protocols such as Internet Connectivity Establishment (ICE) or Traversal Using Relay NAT (TURN) may be used.

Figure 6:
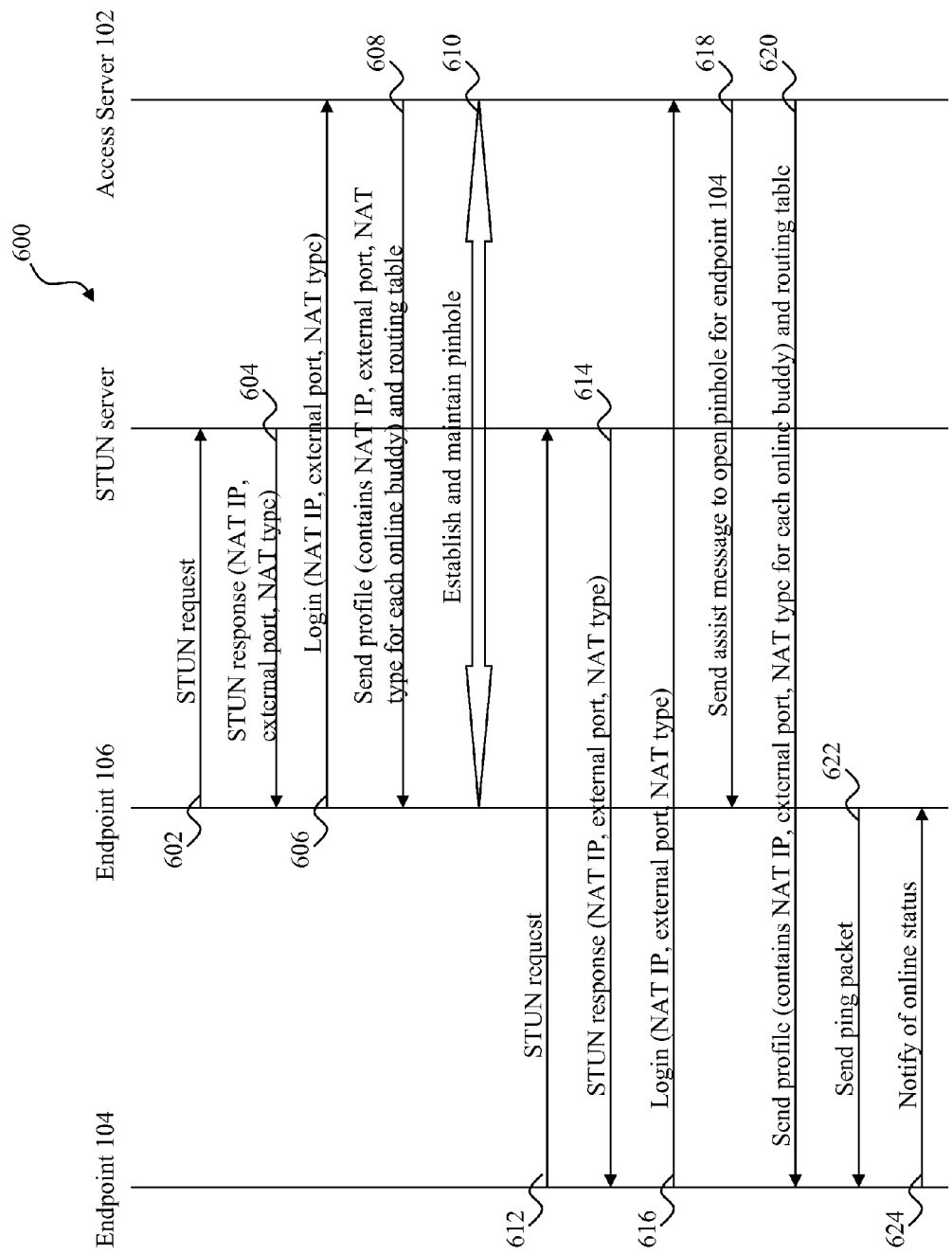
FIG. 6 is a sequence diagram illustrating an exemplary process by which an access server of FIG. 1 may aid an endpoint in establishing communications with another endpoint.

Referring to FIG. 6, a sequence diagram 600 illustrates an exemplary process by which the access server 102 may aid the endpoint 104 in establishing communications with the endpoint 106 (which is a buddy). After rendering aid, the access server 102 is no longer involved and the endpoints may communicate directly. In the present example, the endpoint 106 is behind a NAT device that will only let a message in (towards the endpoint 106) if the endpoint 106 has sent a message out. Unless this process is bypassed, the endpoint 104 will be unable to connect to the endpoint 106. For example, the endpoint 104 will be unable to notify the endpoint 106 that it is now online.

In step 602, the endpoint 106 sends a request to the STUN server 214 of FIG. 2. As described previously, the STUN server determines an outbound IP address, an external port, and a type of NAT for the endpoint 106. The STUN server 214 sends a STUN response back to the endpoint 106 in step 604 with the collected information about the endpoint 106. In step 606, the endpoint 106 sends an authentication request to the access server 102. The request contains the information about endpoint 106 received from the STUN server 214. In step 608, the access server 102 responds to the request by sending the relevant profile and routing table to the endpoint 106. In the present example, the access server 102 identifies the NAT type associated with the endpoint 106 as being a type that requires an outbound packet to be sent before an inbound packet is allowed to enter. Accordingly, the access server 102 instructs the endpoint 106 to send periodic messages to the access server 102 to establish and maintain a pinhole through the NAT device. For example, the endpoint 106 may send a message prior to the timeout period of the NAT device in order to reset the timeout period. In this manner, the pinhole may be kept open indefinitely.

In steps 612 and 614, the endpoint 104 sends a STUN request to the STUN server 214 and the STUN server responds as previously described. In step 616, the endpoint 104 sends an authentication request to the access server 102. The access server 102 retrieves the buddy list for the endpoint 104 and identifies the endpoint 106 as being associated with a NAT type that will block communications from the endpoint 104. Accordingly, in step 618, the access server 102 sends an assist message to the endpoint 106. The assist message instructs the endpoint 106 to send a message to the endpoint 104, which opens a pinhole in the NAT device for the endpoint 104. For security purposes, as the access server 102 has the STUN information for the endpoint 104, the pinhole opened by the endpoint 106 may be specifically limited to the endpoint associated with the STUN information. Furthermore, the access server 102 may not request such a pinhole for an endpoint that is not on the buddy list of the endpoint 106.

The access server 104 sends the profile and routing table to the endpoint 104 in step 620. In step 622, the endpoint 106 sends a message (e.g., a ping packet) to the endpoint 104. The endpoint 104 may then respond to the message and notify the endpoint 106 that it is now online. If the endpoint 106 does not receive a reply from the endpoint 104 within a predefined period of time, it may close the pinhole (which may occur simply by not sending another message and letting the pinhole time out). Accordingly, the difficulty presented by the NAT device may be overcome using the assist message, and communications between the two endpoints may then occur without intervention by the access server 102.

Figure 7:
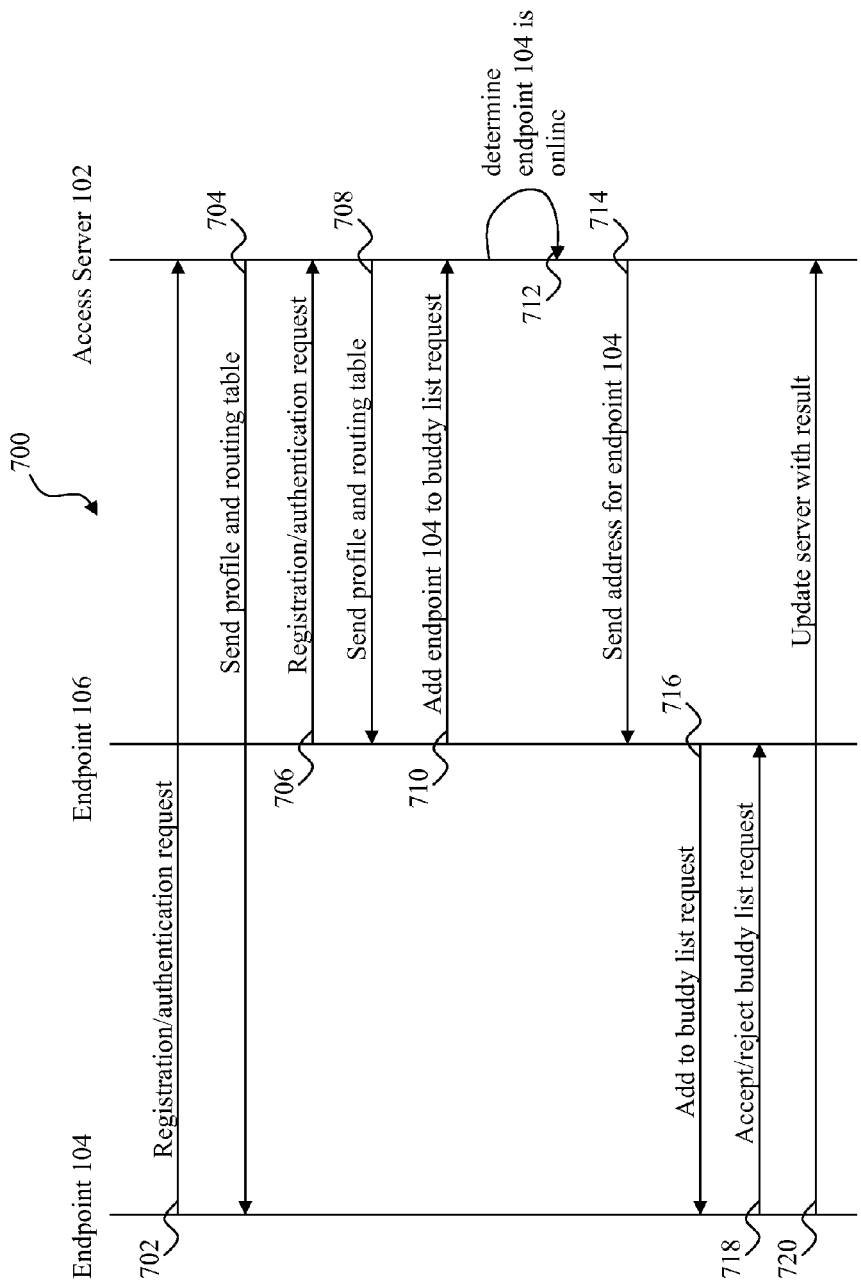
FIG. 7 is a sequence diagram illustrating an exemplary process by which an endpoint of FIG. 1 may request that it be added to the buddy list of another endpoint that is currently online.

Referring to FIG. 7, a sequence diagram 700 illustrates an exemplary process by which the endpoint 106 may request that it be added to the endpoint 104's buddy list. In the present example, the endpoints 104 and 106 both remain online during the entire process.

In step 702, the endpoint 104 sends a registration and/or authentication request message to the access server 102 as described previously. Upon authentication, the access server 102 updates a session table residing on the server to indicate that the user ID currently associated with the endpoint 104 is online. The access server 102 also retrieves a buddy list associated with the user ID currently used by the endpoint 104 and identifies which of the buddies (if any) are online using the session table. As the endpoint 106 is not currently on the buddy list, it will not be present. The access server 102 then sends the profile information and a routing table to the endpoint 104 in step 704.

In steps 706 and 708, the endpoint 106 and access server 102 repeat steps 702 and 704 as described for the endpoint 104. The profile information sent by the access server 102 to the endpoint 106 will not include the endpoint 104 because the two endpoints are not buddies.

In step 710, the endpoint 106 sends a message to the access server 102 requesting that the endpoint 104 be added to its buddy list. The access server 102 determines that the endpoint 104 is online (e.g., using the session table) in step 712 and sends the address for the endpoint 104 to the endpoint 106 in step 714. In step 716, the endpoint 106 sends a message directly to the endpoint 104 requesting that the endpoint 106 be added to its buddy list. The endpoint 104 responds to the endpoint 106 in step 718 with either permission or a denial, and the endpoint 104 also updates the access server 102 with the response in step 720. For example, if the response grants permission, then the endpoint 104 informs the access server 102 so that the access server can modify the profile of both endpoints to reflect the new relationship. It is understood that various other actions may be taken. For example, if the endpoint 104 denies the request, then the access server 102 may not respond to another request by the endpoint 106 (with respect to the endpoint 104) until a period of time has elapsed.

It is understood that many different operations may be performed with respect to a buddy list. For example, buddies may be deleted, blocked/unblocked, buddy status may be updated, and a buddy profile may be updated. For block/unblock, as well as status and profile updates, a message is first sent to the access server 102 by the endpoint requesting the action (e.g., the endpoint 104). Following the access server 102 update, the endpoint 104 sends a message to the peer being affected by the action (e.g., the endpoint 106).

Buddy deletion may be handled as follows. If the user of the endpoint 104 wants to delete a contact on a buddy list currently associated with the online endpoint 106, the endpoint 104 will first notify the access server 102 that the buddy is being deleted. The access server 102 then updates the profile of both users so that neither buddy list shows the other user as a buddy. Note that, in this instance, a unilateral action by one user will alter the profile of the other user. The endpoint 104 then sends a message directly to the endpoint 106 to remove the buddy (the user of the endpoint 104) from the buddy list of the user of endpoint 106 in real time. Accordingly, even though the user is online at endpoint 106, the user of the endpoint 104 will be removed from the buddy list of the endpoint 106.

Figure 8:
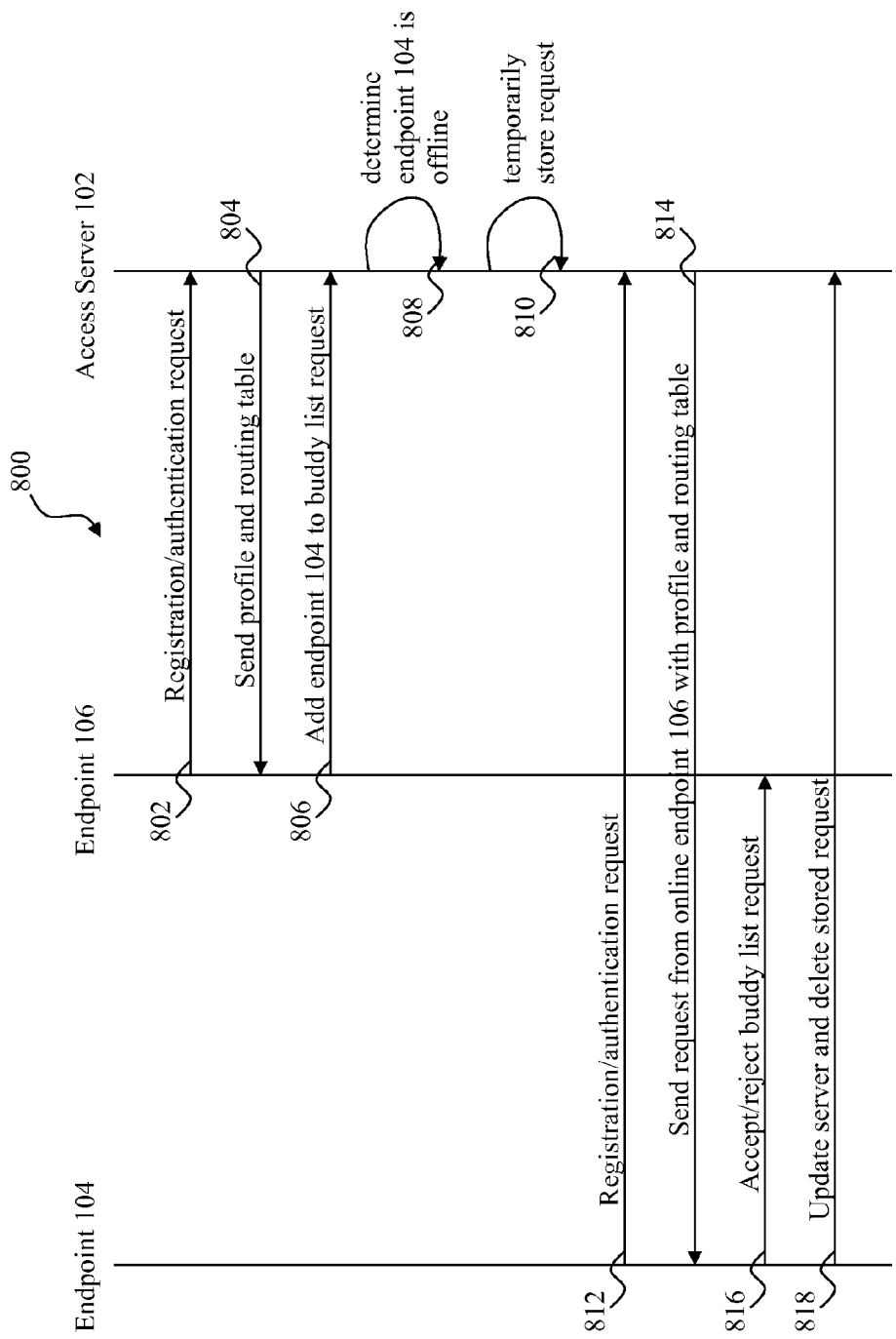
FIG. 8 is a sequence diagram illustrating an exemplary process by which an endpoint of FIG. 1 may request that it be added to the buddy list of another endpoint that is currently offline.

Referring to FIG. 8, a sequence diagram 800 illustrates an exemplary process by which the endpoint 106 may request that it be added to the endpoint 104's buddy list. In the present example, the endpoint 104 is not online until after the endpoint 106 has made its request.

In step 802, the endpoint 106 sends a registration and/or authentication request message to the access server 102 as described previously. Upon authentication, the access server 102 updates a session table residing on the server to indicate that the user ID currently associated with the endpoint 106 is online. The access server 102 also retrieves a buddy list associated with the user ID currently used by the endpoint 106 and identifies which of the buddies (if any) are online using the session table. The access server 102 then sends the profile information and a routing table to the endpoint 106 in step 804.

In step 806, the endpoint 106 sends a message to the access server 102 requesting that the endpoint 104 be added to its buddy list. The access server 102 determines that the endpoint 104 is offline in step 808 and temporarily stores the request message in step 810. In steps 812 and 814, the endpoint 104 and access server 102 repeat steps 802 and 804 as described for the endpoint 106. However, when the access server 102 sends the profile information and routing table to the endpoint 104, it also sends the request by the endpoint 106 (including address information for the endpoint 106).

In step 816, the endpoint 104 responds directly to the endpoint 106 with either permission or a denial. The endpoint 104 then updates the access server 102 with the result of the response in step 818 and also instructs the access server to delete the temporarily stored request.

Figure 9:
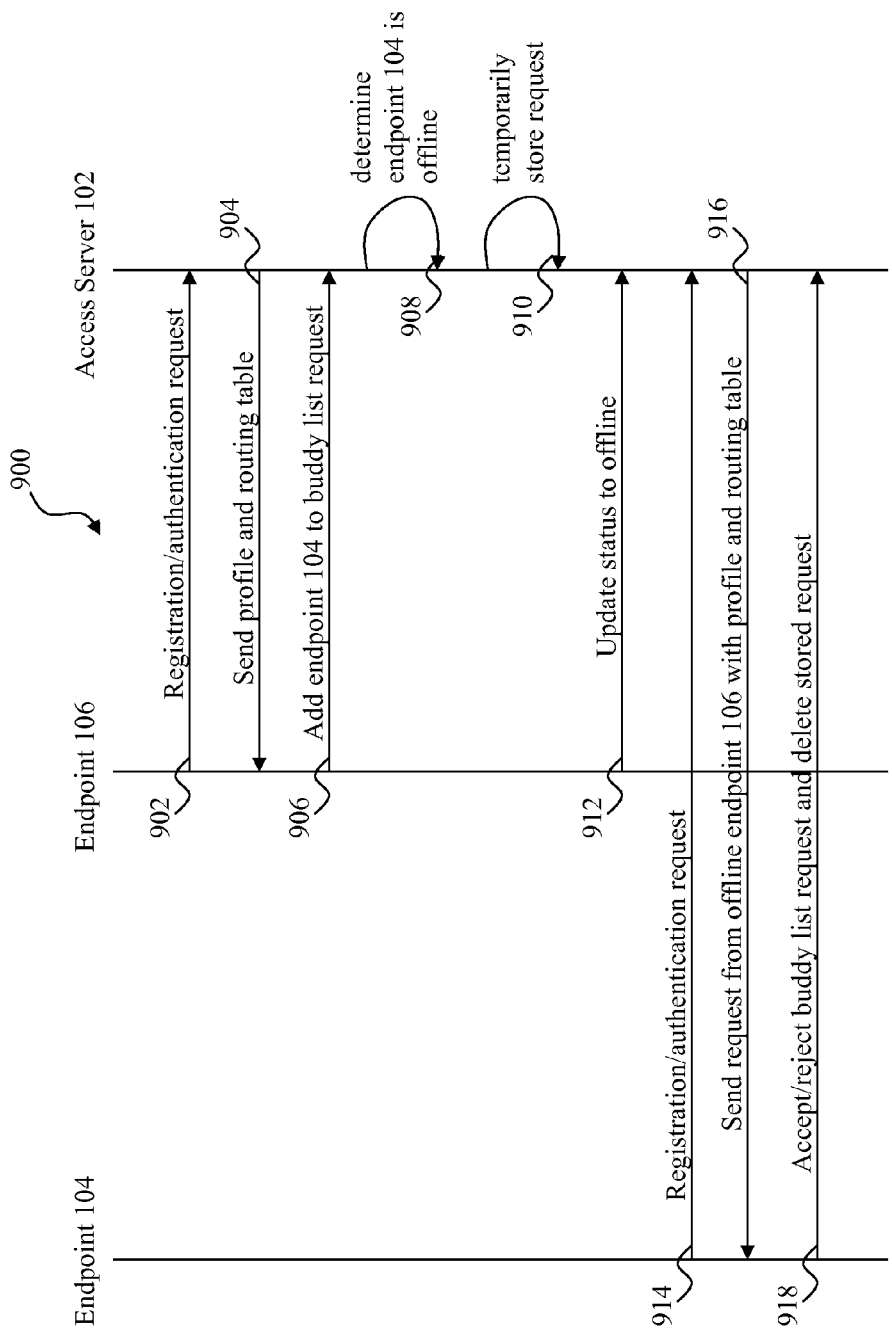
FIG. 9 is a sequence diagram illustrating an exemplary process by which an endpoint of FIG. 1 may request that it be added to the buddy list of another endpoint that is currently offline before it too goes offline.

Referring to FIG. 9, a sequence diagram 900 illustrates an exemplary process by which the endpoint 106 may request that it be added to the endpoint 104's buddy list. In the present example, the endpoint 104 is not online until after the endpoint 106 has made its request, and the endpoint 106 is not online to receive the response by endpoint 104.

In step 902, the endpoint 106 sends a registration and/or authentication request message to the access server 102 as described previously. Upon authentication, the access server 102 updates a session table residing on the server to indicate that the user ID currently associated with the endpoint 106 is online. The access server 102 also retrieves a buddy list associated with the user ID currently used by the endpoint 106 and identifies which of the buddies (if any) are online using the session table. The access server 102 then sends the profile information and a routing table to the endpoint 106 in step 904.

In step 906, the endpoint 106 sends a message to the access server 102 requesting that the endpoint 104 be added to its buddy list. The access server 102 determines that the endpoint 104 is offline in step 908 and temporarily stores the request message in step 910. In step 912, the endpoint 106 notifies the access server 102 that it is going offline.

In steps 914 and 916, the endpoint 104 and access server 102 repeat steps 902 and 904 as described for the endpoint 106. However, when the access server 102 sends the profile information and routing table to the endpoint 104, it also sends the request by the endpoint 106. Endpoint 104 sends its response to the access server 102 in step 918 and also instructs the access server to delete the temporarily stored request. After the endpoint 106's next authentication process, its profile information will include endpoint 104 as a buddy (assuming the endpoint 104 granted permission).

Figure 10:
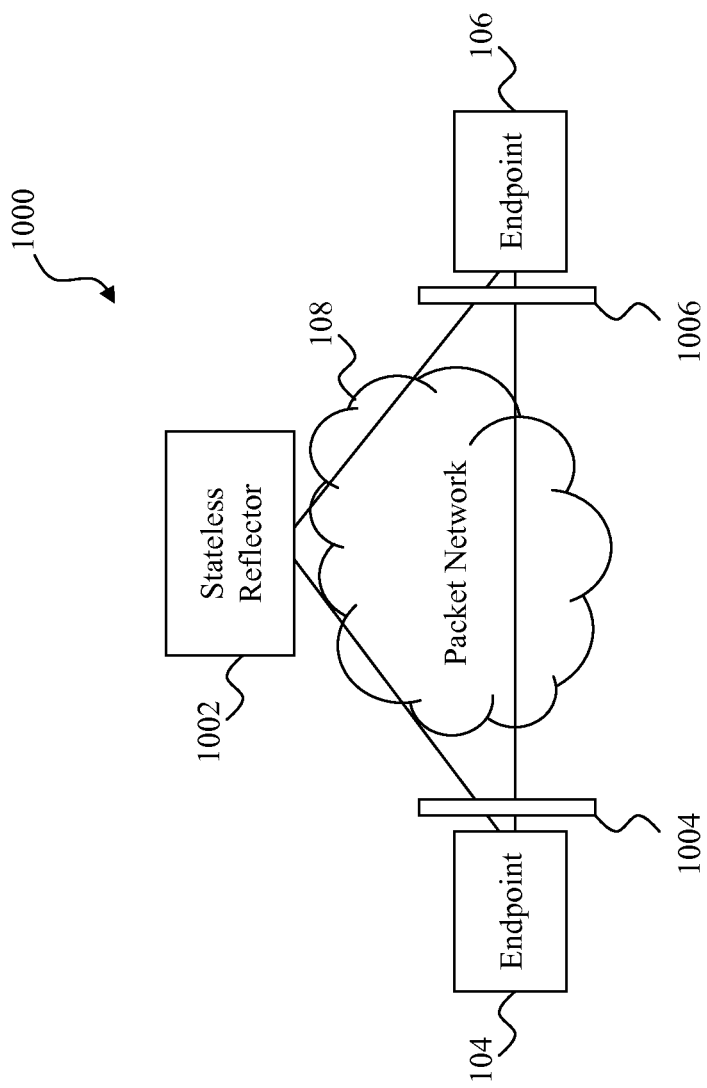
FIG. 10 is a simplified diagram of another embodiment of a peer-to-peer system that includes a stateless reflector that may aid an endpoint in traversing a NAT device to communicate with another endpoint.

Referring to FIG. 10, in one embodiment, a system 1000 includes a stateless reflector 1002 and two endpoints 104 and 106, such as the endpoints 104 and 106 described with respect to the preceding figures. In the present example, each of the endpoints 104 and 106 are behind a device 1004, 1006, respectively, that monitors and regulates communication with its respective endpoint. Each device 1004, 1006 in the present example is a firewall having NAT technology. As described previously, a NAT device may present an obstacle in establishing a peer-to-peer connection because it may not allow unsolicited messages (e.g., it may require a packet to be sent out through the NAT device before allowing a packet in). For example, the NAT device 1006 positioned between the endpoint 106 and network 108 may only let a message in (towards the endpoint 106) if the endpoint 106 has sent a message out. Unless the NAT device's status is shifted from not soliciting messages from the endpoint 104 to soliciting messages from the endpoint 104, the endpoint 104 will be unable to connect to the endpoint 106. For example, the endpoint 104 will be unable to notify the endpoint 106 that it is now online.

As will be described below in greater detail, the stateless reflector 1002 is configured to receive one or more packets from an endpoint and reflect the packet to another endpoint after modifying information within the packet. This reflection process enables the endpoints 104 and 106 to communicate regardless of the presence and type of the NAT devices 1004 and 1006. The stateless reflector 1002 is stateless because state information (e.g., information relating to how an endpoint is to connect with other endpoints) is stored by the endpoints, as described previously. Accordingly, the stateless reflector 1002 processes header information contained within a packet without access to other information about the network or endpoints, such as the database 206 of FIG. 2a. Although only one stateless reflector 1002 is illustrated in FIG. 10, it is understood that multiple stateless reflectors may be provided, and that the endpoints 104 and 106 may each use a different stateless reflector. For example, an endpoint may be configured to use a particular stateless reflector or may select a stateless reflector based on location, NAT type, etc.

Although each endpoint 104, 106 is shown with a separate NAT device 1004, 1006, it is understood that multiple endpoints may be connected to the network 108 via a single NAT device. For example, a LAN may access the network 108 via a single NAT device, and all communications between the endpoints connected to the LAN and the network 108 must pass through the NAT device. However, communications between the endpoints within the LAN itself may occur directly, as previously described, because the endpoints are not communicating through the NAT device. Furthermore, if one of the endpoints 104 or 106 does not have a NAT device, then communications with that endpoint may occur directly as described above even if the endpoints are not in the same network.

Each NAT device 1004 and 1006 includes an internal IP address (on the side coupled to the endpoint 104 for the NAT device 1004 and the side coupled to the endpoint 106 for the NAT device 1006) and an external IP address (on the side coupled to the network 108 for both NAT devices). Each connection is also associated with an internal port and an external port. Therefore, each connection includes both internal IP address/port information and external IP address/port information.

Generally, a NAT device may be defined as full cone, restricted cone, port restricted cone, or symmetric. A full cone NAT is one where all requests from the same internal IP address and port are mapped to the same external IP address and port. Therefore, any external host can send a packet to the internal host by sending a packet to the mapped external address.

A restricted cone NAT is one where all requests from the same internal IP address and port are mapped to the same external IP address and port. Unlike a full cone NAT, an external host can send a packet to the internal host only if the internal host has previously sent a packet to the external host's IP address.

A port restricted cone NAT is like a restricted cone NAT, but the restriction includes port numbers. More specifically, an external host can send a packet with source IP address X and source port P to the internal host only if the internal host has previously sent a packet to the external host at IP address X and port P.

A symmetric NAT is one where all requests from the same internal IP address and port to a specific destination IP address and port are mapped to the same external IP address and port. If the same host sends a packet with the same source address and port, but to a different destination, a different mapping is used. Only the external host that receives a packet can send a UDP packet back to the internal host.

Figure 11:
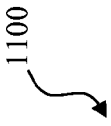
FIG. 11 is a table illustrating various NAT types and illustrative embodiments of processes that may be used to traverse each NAT type within the system of FIG. 10.

Referring to FIG. 11, a table 1100 illustrates one embodiment of a communication structure that may be used to traverse one or both of the NAT devices 1004 and 1006 of FIG. 10. The table 1100 provides five possible types for the NAT devices 1004 and 1006: no NAT, full cone, restricted cone, port restricted cone, and symmetric. It is understood that "no NAT" may indicate that no device is there, that a device is there but does not include NAT functionality, or that a device is there and any NAT functionality within the device has been disabled. Either of the NAT devices 1004 and 1006 may be on the originating side of the communication or on the terminating side. For purposes of convenience, the endpoint 104 is the originating endpoint and the endpoint 106 is the terminating endpoint, and the NAT device 1004 is the originating NAT device and the NAT device 1006 is the terminating NAT device. It is understood that the terms "endpoint" and "NAT device" may be used interchangeably in some situations. For example, sending a packet to the endpoint 106 generally involves sending a packet to the NAT device 1006, which then forwards the packet to the endpoint 106 after performing the network address translation. However, the following discussion may simply refer to sending a packet to the endpoint 106 and it will be understood that the packet must traverse the NAT device 1006.

As illustrated by the table 1100, there are twenty-five possible pairings of NAT types and establishing communication between different NAT types may require different steps. For purposes of convenience, these twenty-five pairings may be grouped based on the required steps. For example, if the originating NAT type is no NAT, full cone, restricted cone, or port restricted cone, then the originating NAT can establish communication directly with a terminating NAT type of either no NAT or full cone.

If the originating NAT type is no NAT or full cone, then the originating NAT can establish communications with a terminating NAT type of either restricted cone or port restricted cone only after using the stateless reflector 1002 to reflect a packet. This process is described below with respect to FIG. 12.

Figure 12:
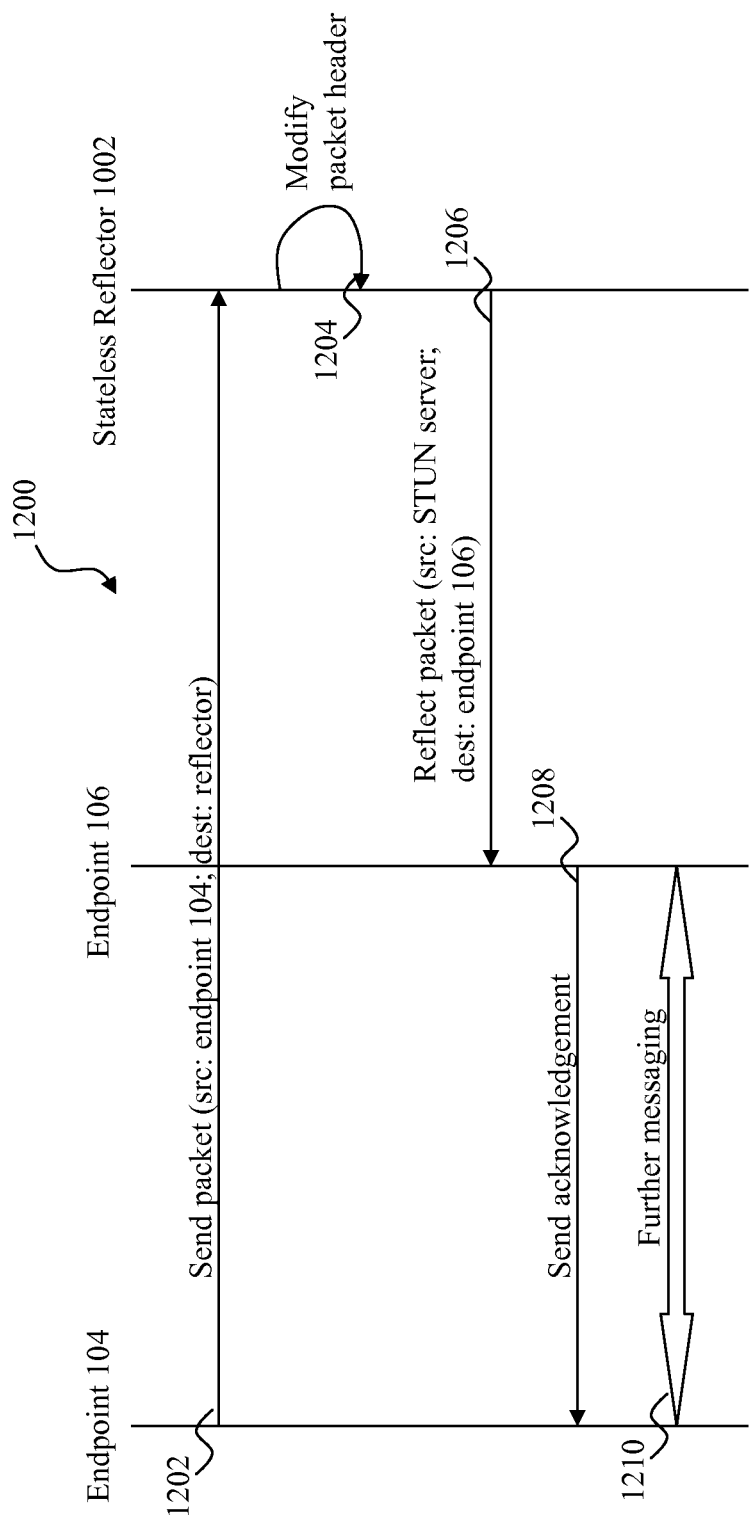
FIG. 12 is a sequence diagram illustrating one embodiment of a process from the table of FIG. 11 in greater detail.

Referring to FIG. 12, the endpoint 104 wants to inform the endpoint 106, which is already logged on, that the endpoint 104 has logged on. The NAT device 1004 is either a no NAT or a full cone type and the NAT device 1006 is either a restricted cone or a port restricted cone type. Accordingly, the endpoint 104 wants to send a message to the endpoint 106, but has not received a message from the endpoint 106 that would allow the endpoint 104 to traverse the NAT device 1006.

Although not shown in FIG. 12, prior to or during authentication, the endpoints 104 and 106 both sent a request to a STUN server (e.g., the STUN server 214 of FIG. 2) (not shown in FIG. 10). The STUN server determined an outbound IP address, an external port, and a type of NAT for the endpoints 104 and 106 (in this example, for the NAT devices 1004 and 1006). The STUN server 214 then sent a STUN response back to the endpoints 104 and 106 with the collected information. The endpoints 104 and 106 then sent an authentication request to an access server (e.g., the access server 102 of FIG. 1) (not shown in FIG. 10). The request contains the information about endpoints 104 and 106 received from the STUN server 214. The access server 102 responds to the requests by sending the relevant profile and routing table to the endpoints 104 and 106. In addition, each NAT device 1004 and 1006 may have a pinhole to the STUN server 214.

In the present example, the NAT device 1004 has an external address/port of 1.1.1.1:1111 and the NAT device 1006 has an external address/port of 2.2.2.2:2222. The STUN server 214 has an address/port of 3.3.3.3:3333 and the stateless reflector has an address/port of 4.4.4.4:4444. It is understood that the STUN server and/or stateless reflector 1002 may have multiple addresses/ports.

Figure 13:
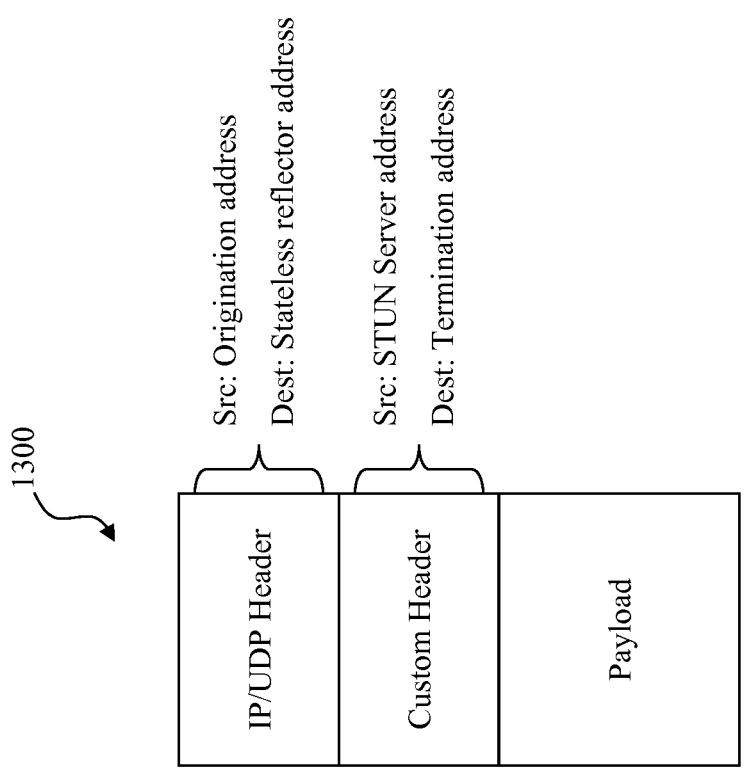
FIG. 13 illustrates one embodiment of a modified packet that may be used within the process of FIG. 12.

Referring to FIG. 12 and with additional reference to FIG. 13, in step 1202, the endpoint 104 sends a packet to the stateless reflector 1002. The packet contains header information identifying the source as the endpoint 104 (or rather, the external IP address of the NAT device 1004) and the destination as the stateless reflector 1002. The packet also contains custom or supplemental header information identifying the source as the STUN server 214 and the destination as the endpoint 106. Accordingly, the IP/UDP header of the packet sent from the endpoint 104 (via the NAT device 1004) identifies its source as 1.1.1.1:1111 and its destination as 4.4.4.4:4444.

In step 1204, the stateless reflector 1002 modifies the packet header by replacing the IP/UDP header with the source and destination from the custom header. In the present example, the stateless reflector 1002 will modify the IP/UDP header to identify the packet's source as 3.3.3.3:3333 and its destination as 2.2.2.2:2222. Identifying the packet's source as the STUN server 214 enables the stateless reflector 1002 to send the packet through the pinhole in the NAT device 1006 that was created when the endpoint 106 logged on. After modifying the header, the stateless reflector 1002 sends the packet to the endpoint 106 via the NAT device 1006 in step 1206.

In step 1208, the endpoint 106 sends an acknowledgement (e.g., a 200 OK) directly to the endpoint 104. The address of the endpoint 104 is contained within the payload of the packet. The endpoint 106 is able to send the acknowledgement directly because the NAT device 1004 is either a no NAT or a full cone type. Because the endpoint 106 has opened a pinhole through the restricted or port restricted NAT device 1006 to the endpoint 104 by sending a message to the endpoint 104, the endpoint 104 is now able to communicate directly with the endpoint 106, as indicated by step 1210.

Referring again to table 1100 of FIG. 11, if the originating NAT type is either a no NAT type or a full cone type, then the originating NAT can establish communications with a terminating NAT type that is symmetric only after using the stateless reflector 1002 to reflect a packet and then performing a port capture. This process is described below with respect to FIG. 14.

Figure 14:
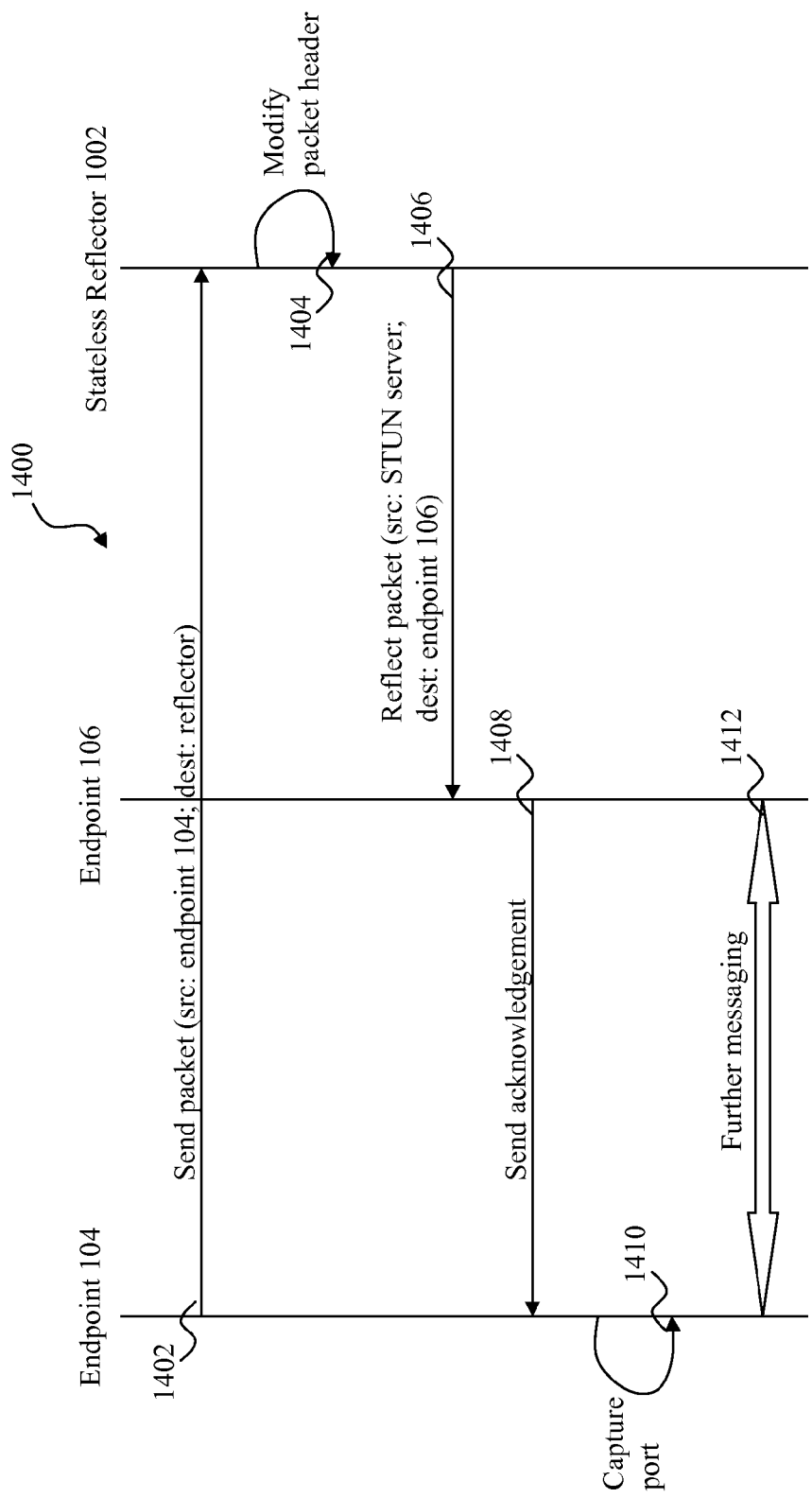
FIGS. 14-18 are sequence diagrams that each illustrate an embodiment of a process from the table of FIG. 11 in greater detail.

Referring to FIG. 14, steps 1402, 1404, 1406, and 1408 are similar to the reflection process described with respect to FIG. 12, and will not be described in detail in the present example. Because the terminating NAT type is symmetric, the originating NAT needs the port of the terminating NAT in order to send packets through the NAT device 1006. Accordingly, in step 1410, the endpoint 104 will capture the external port used by the NAT device 1006 to send the acknowledgement in step 1408. This port, along with the address of the NAT device 1006, may then be used when communicating with the endpoint 106, as indicated by step 1412.

Referring again to table 1100 of FIG. 11, if the originating NAT type is either a restricted cone type or a port restricted cone type, then the originating NAT can establish communications with a terminating NAT type that is either restricted or port restricted by using a fake packet and then using the stateless reflector 1002 to reflect a packet. This process is described below with respect to FIG. 15.

Figure 15:
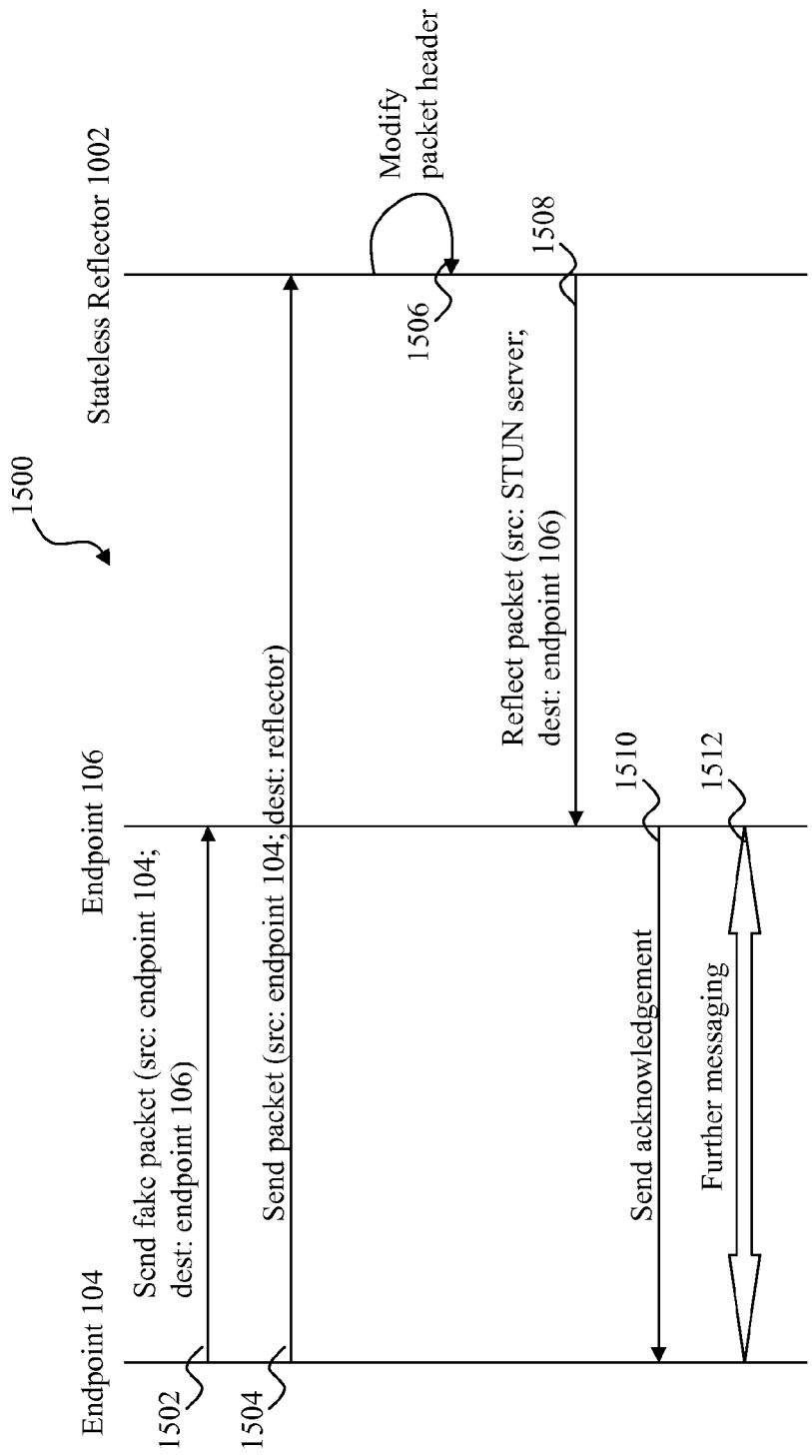

Referring to FIG. 15, in step 1502, the endpoint 104 sends a fake packet to the endpoint 106. Because the originating NAT type is a restricted cone type or a port restricted cone type, the fake packet opens a pinhole to the terminating NAT that will allow a response from the terminating NAT to penetrate the originating NAT. After sending the fake packet, the sequence 1500 proceeds with steps 1504, 1506, 1508, and 1510, which are similar to the reflection process described with respect to FIG. 12, and will not be described in detail in the present example. The endpoints 104 and 106 may then communicate directly, as indicated by step 1512.

Referring again to table 1100 of FIG. 11, if the originating NAT type is a symmetric type, then the originating NAT can establish communications with a terminating NAT type that is either no NAT or full cone after a port capture occurs. This process is described below with respect to FIG. 16.

Figure 16:
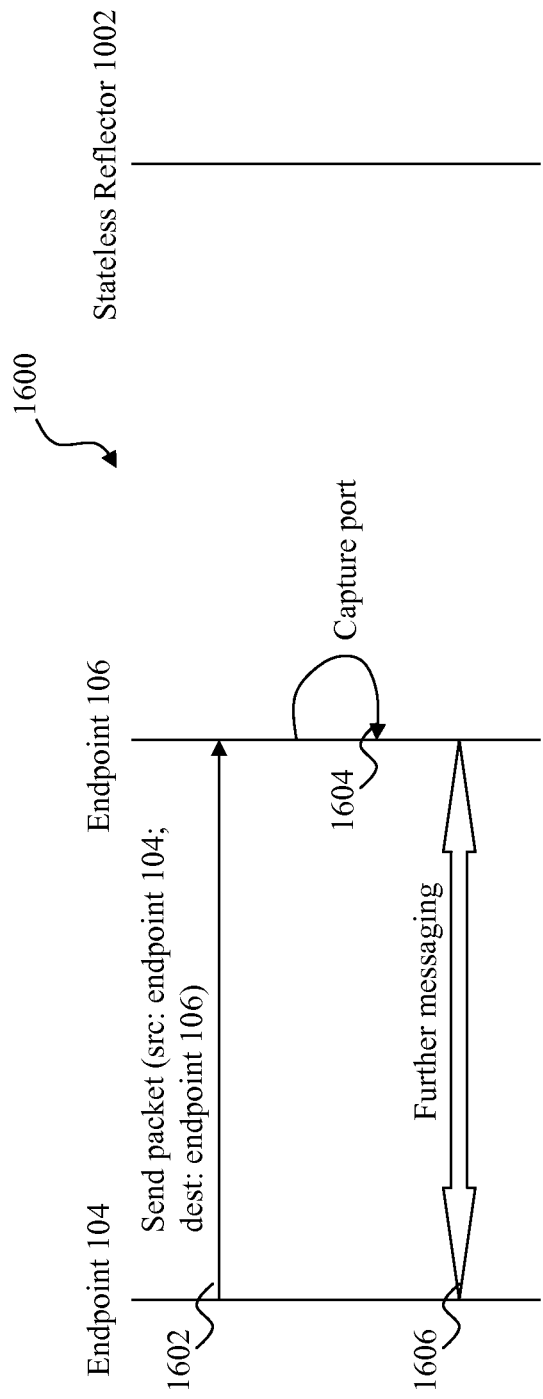

Referring to FIG. 16, in step 1602, the endpoint 104 (symmetric NAT type) sends a message to the endpoint 106. In step 1604, the endpoint 106 captures the external port used by the NAT device 1004 in sending the message. This port, along with the address of the NAT device 1004, may then be used when communicating with the endpoint 104 directly, as indicated by step 1606.

Referring again to table 1100 of FIG. 11, if the originating NAT type is a restricted cone type, then the originating NAT can establish communications with a terminating NAT type that is symmetric by using a fake packet, reflecting a packet using the stateless reflector 1002, and then performing a port capture. This process is described below with respect to FIG. 17.

Figure 17:
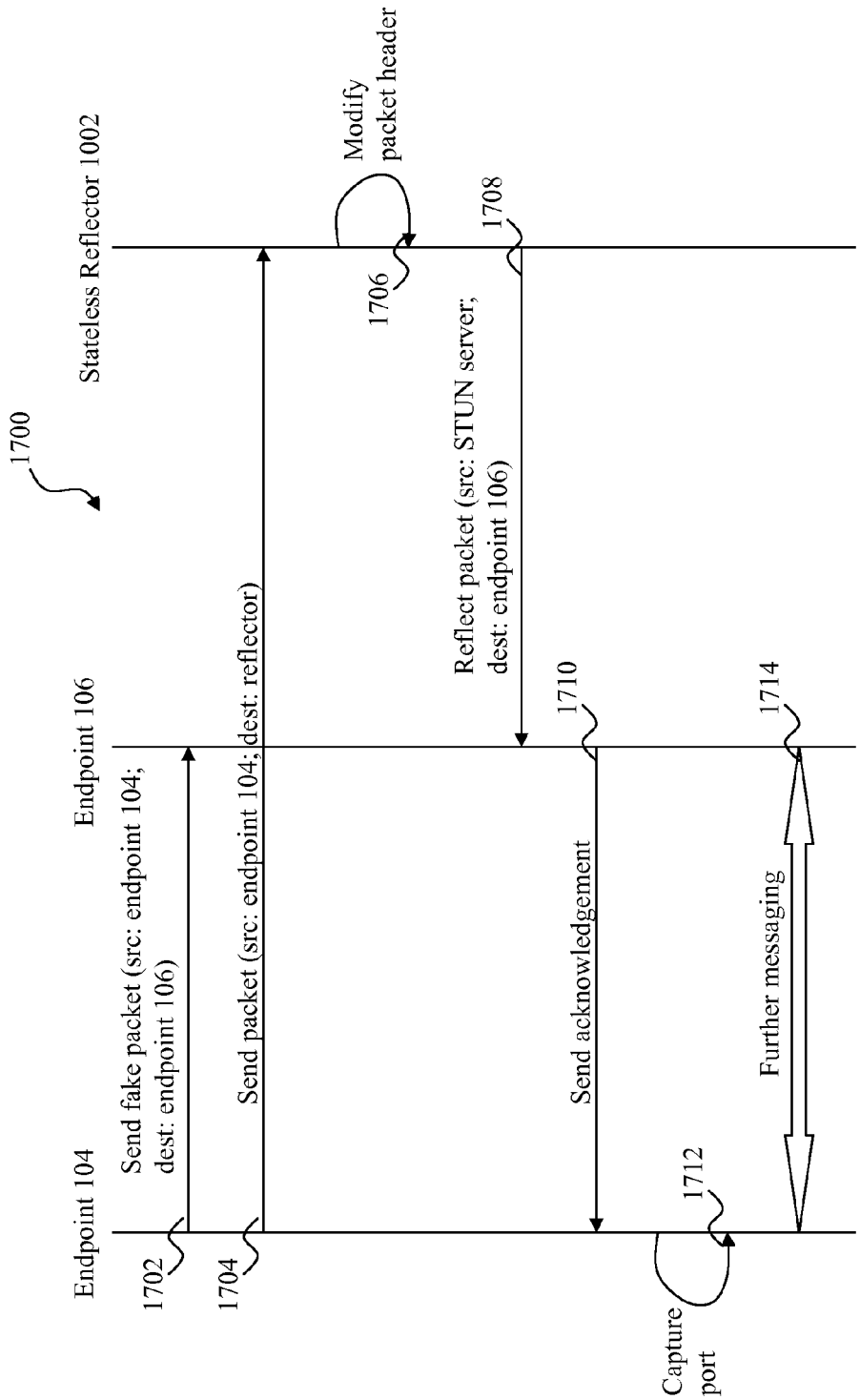

Referring to FIG. 17, in step 1702, the endpoint 104 sends a fake packet to the endpoint 106. Because the originating NAT type is a restricted cone type, the fake packet opens a pinhole to the terminating NAT that will allow a response from the terminating NAT to penetrate the originating NAT. After sending the fake packet, the sequence 1700 proceeds with steps 1704, 1706, 1708, and 1710, which are similar to the reflection process described with respect to FIG. 12, and will not be described in detail in the present example. In step 1712, the endpoint 104 captures the external port used by the NAT device 1006 in sending the acknowledgement in step 1710. This port, along with the address of the NAT device 1006, may then be used when communicating with the endpoint 106 directly, as indicated by step 1714.

Referring again to table 1100 of FIG. 11, if the originating NAT type is a symmetric type, then the originating NAT can establish communications with a terminating NAT type that is a restricted cone type by using a reflect, a fake packet, and a port capture. This process is described below with respect to FIG. 18.

Figure 18:
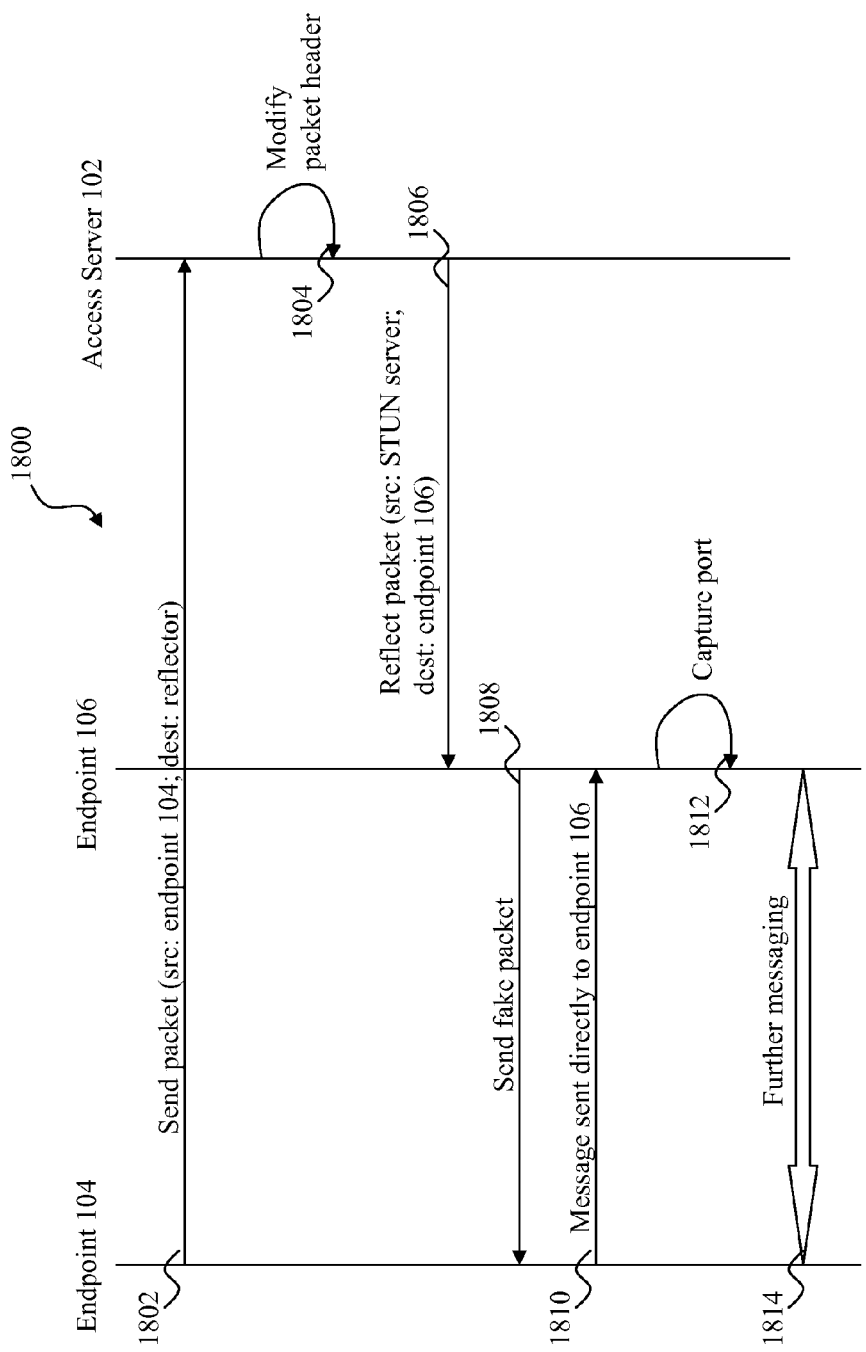

Referring to FIG. 18, steps 1802, 1804, and 1806 are similar to the reflection process described with respect to FIG. 12, and will not be described in detail in the present example. In step 1808, in response to the reflected message from the endpoint 104, the endpoint 106 sends a fake packet to the endpoint 104. Because the terminating NAT type is a restricted cone type, the fake packet opens a pinhole to the endpoint 104 to allow messages from the endpoint 104 to traverse the NAT device 1006. Accordingly, in step 1810, the endpoint 104 can send the next message directly to the endpoint 106 through the pinhole. In step 1812, the endpoint 106 captures the external port used by the NAT device 1004 to send the message in step 1810. This port, along with the address of the NAT device 1004, may then be used by the endpoint 106 when communicating directly with the endpoint 104, as indicated by step 1814.

Referring again to table 1100 of FIG. 11, if the originating NAT type is a symmetric type and the terminating NAT type is a port restricted cone, or if the originating NAT type is a port restricted cone and the terminating NAT type is symmetric, then all signaling between the two NAT devices is relayed via the stateless reflector 1002, while media is transferred via peer-to-peer, as described previously. If both the originating and terminating NAT types are symmetric, then all signaling and media are relayed via the stateless reflector 1002.

Accordingly, the peer-to-peer communications described herein may be achieved regardless of the NAT type that may be used by an endpoint. The stateless reflector 1002 need not know the information for each client, but instead reflects various packets based on information contained within the packet that is to be reflected. Both the custom header and payload may be encrypted for security purposes. However, the stateless reflector 1002 may only be able to decrypt the custom header and the payload itself may only be decrypted by the terminating endpoint. This enables the stateless reflector 1002 to perform the reflection functionality while maintaining the security of the payload itself. As described above, not all processes for traversing a NAT device may use the stateless reflector 1002.

Figure 19A:
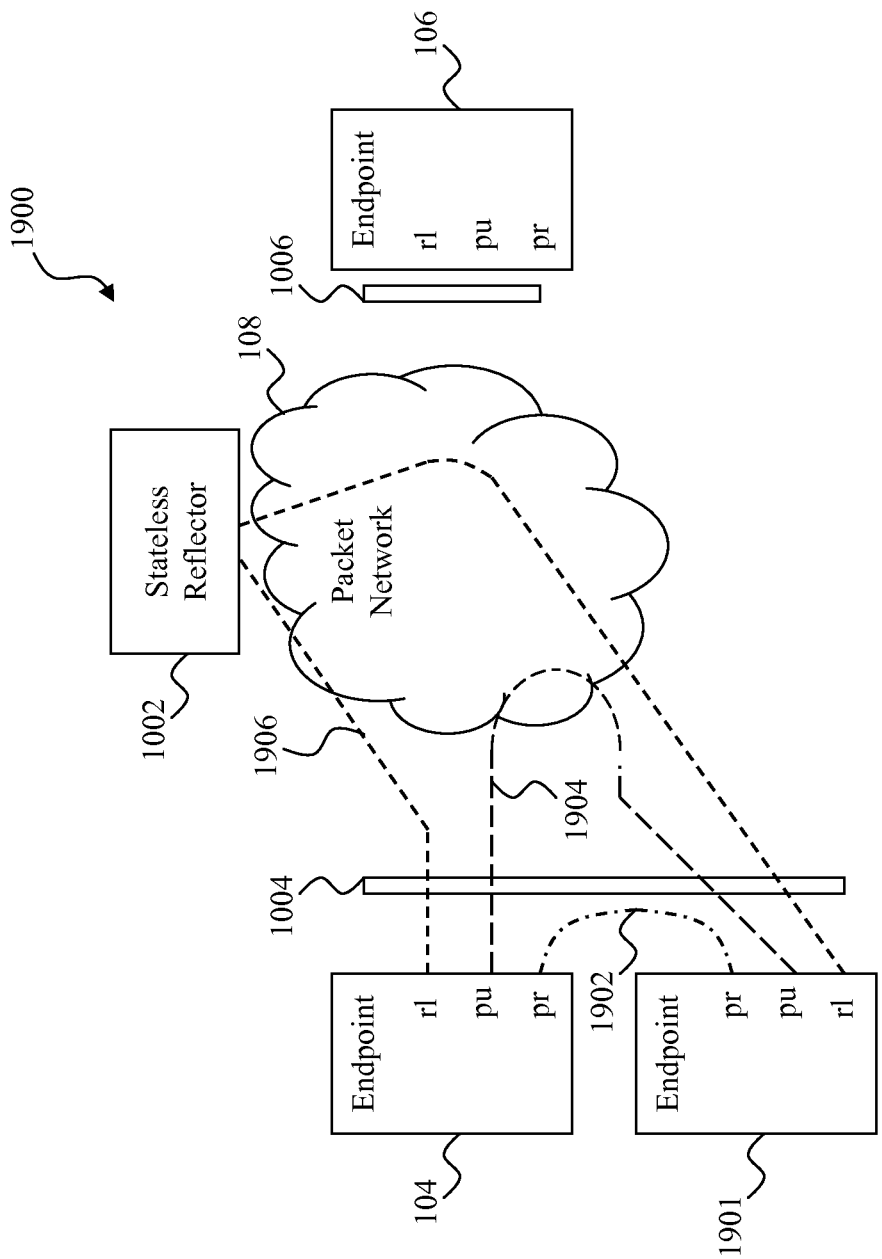
FIGS. 19A and 19B are simplified diagrams of another embodiment of a peer-to-peer system that includes multiple possible routes between endpoints.
Figure 19B:
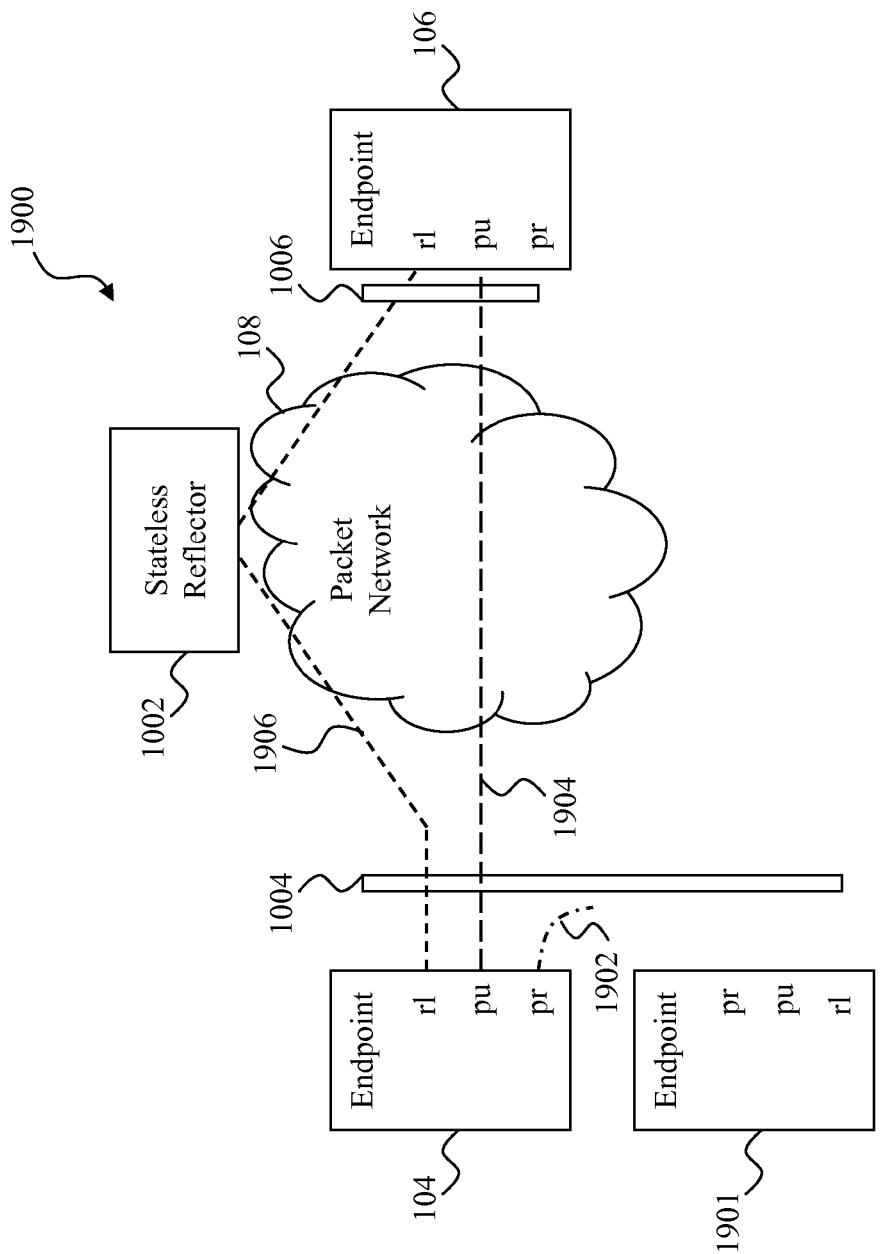

Referring to FIGS. 19A and 19B, in another embodiment, a peer-to-peer environment 1900 includes the two endpoints 104 and 106, the two NAT devices 1004 and 1006, and the stateless reflector 1002 of FIG. 10, and another endpoint 1901. Also illustrated are three possible routes between endpoints: a private (pr) route 1902, a public (pu) route 1904, and a reflected (rl) route 1906. FIG. 19A illustrates the routes 1902, 1904, and 1906 between the endpoint 104 and the endpoint 1901, and FIG. 19B illustrates the routes between the endpoint 104 and the endpoint 106. As will be discussed below in detail, the endpoints 104, 106, and 1901 may contain logic that allows one of the three routes 1902, 1904, and 1906 to be selected in a dynamic and flexible manner rather than relying on the rule-based system described above.

A rule-based system may be fairly inflexible, as such a system generally has a clear set of rules that are defined for various NAT situations and the current relationship between the two endpoints is handled according to those rules. Network configuration changes and other modifications may require revisions to the rules, which is not convenient and may prevent the endpoints from communicating until the rules are revised. Accordingly, in some embodiments, the flexibility described below may enable the endpoints 104, 106, and 1901 to adapt to new network configurations without requiring updated rules as would be required in a strictly rule-based system. In still other embodiments, the logic within the endpoints 104, 106, and 1901 may be updated to handle new network configurations, which also provides flexibility not found in strictly rule-based systems.

Each endpoint 104, 106, and 1901 may include one or more virtual interfaces for communication with other endpoints. In the present example, there are three virtual interfaces including a private virtual interface corresponding to the private route 1902, a public virtual interface corresponding to the public route 1904, and a relay virtual interface corresponding to the relay route 1906. It is understood that the term "virtual interface" is used only for purposes of description to clarify that there are multiple possible routes. Accordingly, the term "virtual interface" need not denote separate physical network interfaces on an endpoint, but may use a single physical network interface.

As described above, each endpoint 104, 106, and 1901 is generally associated with two IP address/port pairs. The first IP address/port pair may be the local (i.e., private) IP address/port information that represents each of the endpoints 104, 106, and 1901 in the network that is "inside" the corresponding NAT device 1004 or 1006. For example, the first IP address/port pair for the endpoint 104 may be the physical address assigned to the endpoint 104 by the corresponding NAT device 1004. This first IP address/port pair corresponds to the private virtual interface and may provide access via the private route to the endpoint 104 by endpoints in the same local network (e.g., the endpoint 1901). The second IP address/port pair may be the public IP address/port information that represents each of the endpoints 104, 106, and 1901 in the network that is "outside" the corresponding NAT device 1004 or 1006. For example, the second IP address/port pair for the endpoint 104 may be the address that is returned to the endpoint 104 by the STUN server as previously described (e.g., the NAT's external IP address/port pair assigned to the endpoint 104). This second IP address/port pair for the endpoint 104 corresponds to the public virtual interface and may provide access via the public route to the endpoint 104 by endpoints both inside and outside the endpoint 104's local network. Each endpoint 104, 106, and 1901 is also aware of the address information of the reflector 1002 as described in previous embodiments, which corresponds to the relay virtual interface of the endpoints. The relay route may be used in (5,4), (4,5), and/or (5,5) conditions according to the table of FIG. 11, where one endpoint must send a packet first, but is unable to do so because the other endpoint must send a packet first.

Figure 20:
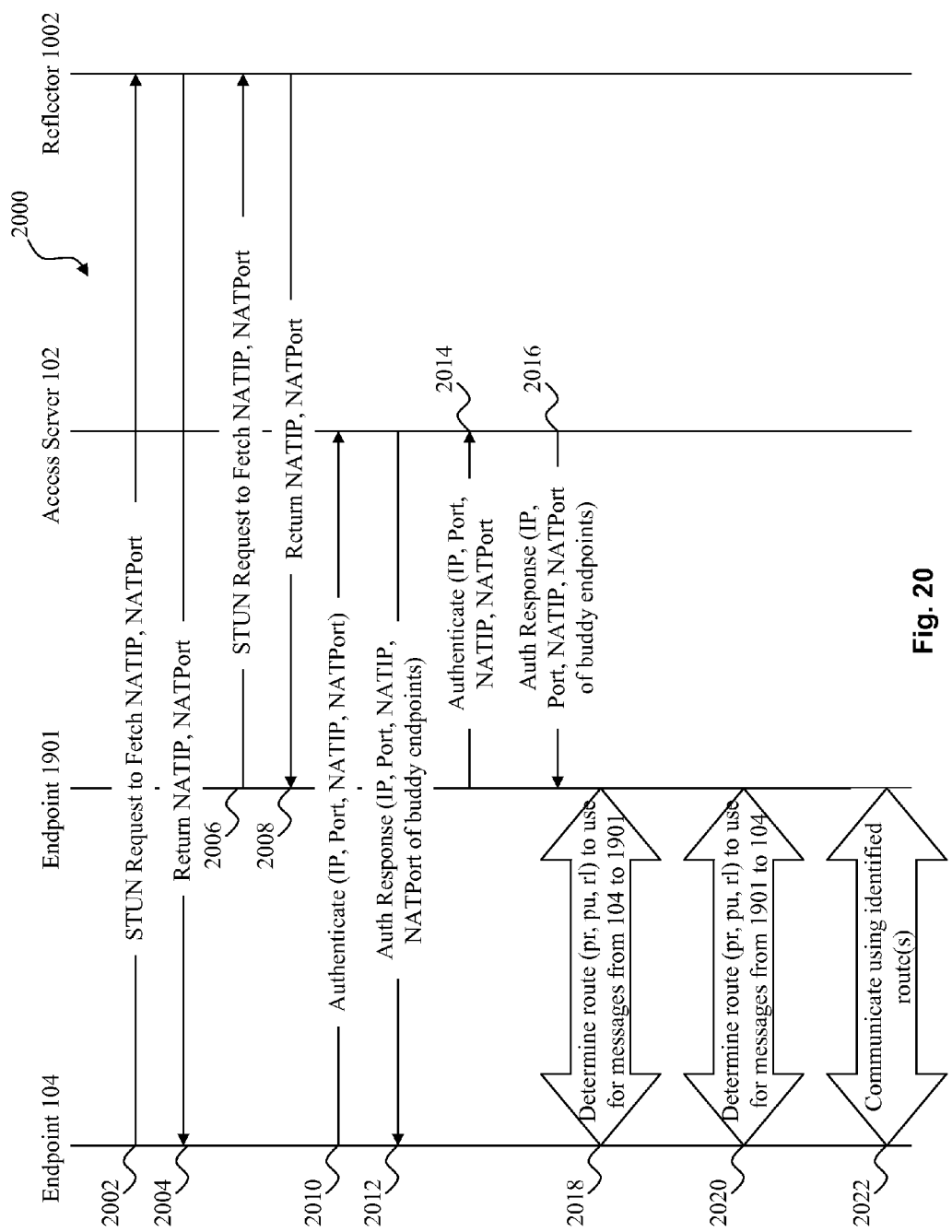
FIG. 20 is a sequence diagram illustrating one embodiment of a process that may be executed by endpoints within the system of FIGS. 19A and 19B.

Referring to FIG. 20, a sequence diagram illustrates one embodiment of a message sequence 2000 that may occur between the endpoints 104 and 1901 of FIG. 19A when identifying which of the routes (i.e., the private route 1902, the public route 1904, and the relay route 1906) will be used for communications. In the present example, the endpoints 104 and 1901 are in a local (i.e., private) network such as an Enterprise network, a local area network (LAN), a virtual LAN (VLAN), or a home network. This local network is isolated from the public network by the NAT device 1004 or a similar network component. Although shown as a single NAT device, it is understood that the NAT device 1004 may be a separate NAT device for each of the endpoints 104 and 1901. In contrast, the endpoint 106 is in a separate network that is only accessible by the endpoints 104 and 1901 via a public network that forms all or part of the packet network 108.

The present example uses a SIP messaging model over UDP, and so accommodates the transaction-based SIP model within connection-less UDP messaging. Because UDP is not transaction based, certain message handling processes may be used to conform to SIP standards, such as discarding multiple messages when the SIP model expects a message belonging to a specific transaction. However, it is understood that the sequence 2000 may be implemented using many different messaging models. In the present example, neither endpoint is online at the beginning of the sequence and the endpoints 104 and 1901 are "buddies." As described above, buddies are endpoints that have both previously agreed to communicate with one another.

In steps 2002 and 2006, the endpoints 104 and 1901, respectively, send STUN requests to obtain their corresponding public IP address/port pairs (NATIP, NATPort). In the present example, the reflector 1002 is serving as a STUN server, but it is understood that the STUN server may be separate from the reflector. The reflector 1002 responds to the STUN requests with the public IP address and port information for each of the endpoints 104 and 1901 in steps 2004 and 2008, respectively.

As the two endpoints 104 and 1901 are not logged in when the present example begins, they must both authenticate with the access server 102. In step 2010, the endpoint 104 sends an authentication request to the access server 102 with its private and public IP address/port pairs. In step 2012, the access server 102 responds to the authentication request and, as described previously, returns information that includes the private and public IP addresses of any buddy endpoints that are currently logged in. However, as the endpoint 1901 has not yet logged in, the information received by the endpoint 104 from the access server 102 will not include any address information for the endpoint 1901.

In step 2014, the endpoint 1901 sends an authentication request to the access server 102 with its private and public IP address/port pairs. In step 2016, the access server 102 responds to the authentication request and, as described previously, returns information that includes the private and public IP addresses of any buddy endpoints that are currently logged in. As the endpoint 104 is currently logged in, the information received by the endpoint 1901 from the access server 102 will include the private and public address information for the endpoint 104. Although not shown, the endpoint 1901 may then send a message to the endpoint 104 informing the endpoint 104 that the endpoint 1901 is currently online. This message may contain the private and public address information of the endpoint 1901. The message may be sent via the three different routes as described below with respect to later messaging, or may be sent via one or more selected routes. For example, the message may only be relayed (i.e., sent via the relay route) due to the high chance of success of that route.

At this point, the endpoint 104 wants to establish a communication session with the endpoint 1901, but does not know which of the three routes (i.e., pr, pu, and rl) should be used. In the previously described rule-based system, the endpoint 1901 would publish its NAT information, which enables the endpoint 104 to determine how to establish a connection. However, in the present example, such information is not published and the endpoint 104 does not know whether the endpoint 1901 is in the same private network as the endpoint 104, whether the endpoint 1901 is only accessible via a public network, whether the endpoint 1901 is behind a NAT device, or, if the endpoint 1901 is behind a NAT device, the settings of the NAT device (full cone, port restricted, etc.). Accordingly, the endpoint 104 needs to dynamically determine which of the three routes to use with the endpoint 1901.

Accordingly, in step 2018, the endpoint 104 interacts with the endpoint 1901 to determine which of the three routes should be used to send messages to the endpoint 1901. Similarly, in step 2020, the endpoint 1901 interacts with the endpoint 104 to determine which of the three routes should be used to send messages to the endpoint 104, which may not be the same route as that used by the endpoint 104 to send messages to the endpoint 1901. Steps 2018 and 2020 are illustrated in greater detail below with respect to FIG. 21. In step 2022, the two endpoints communicate via the determined route(s).

Figure 21:
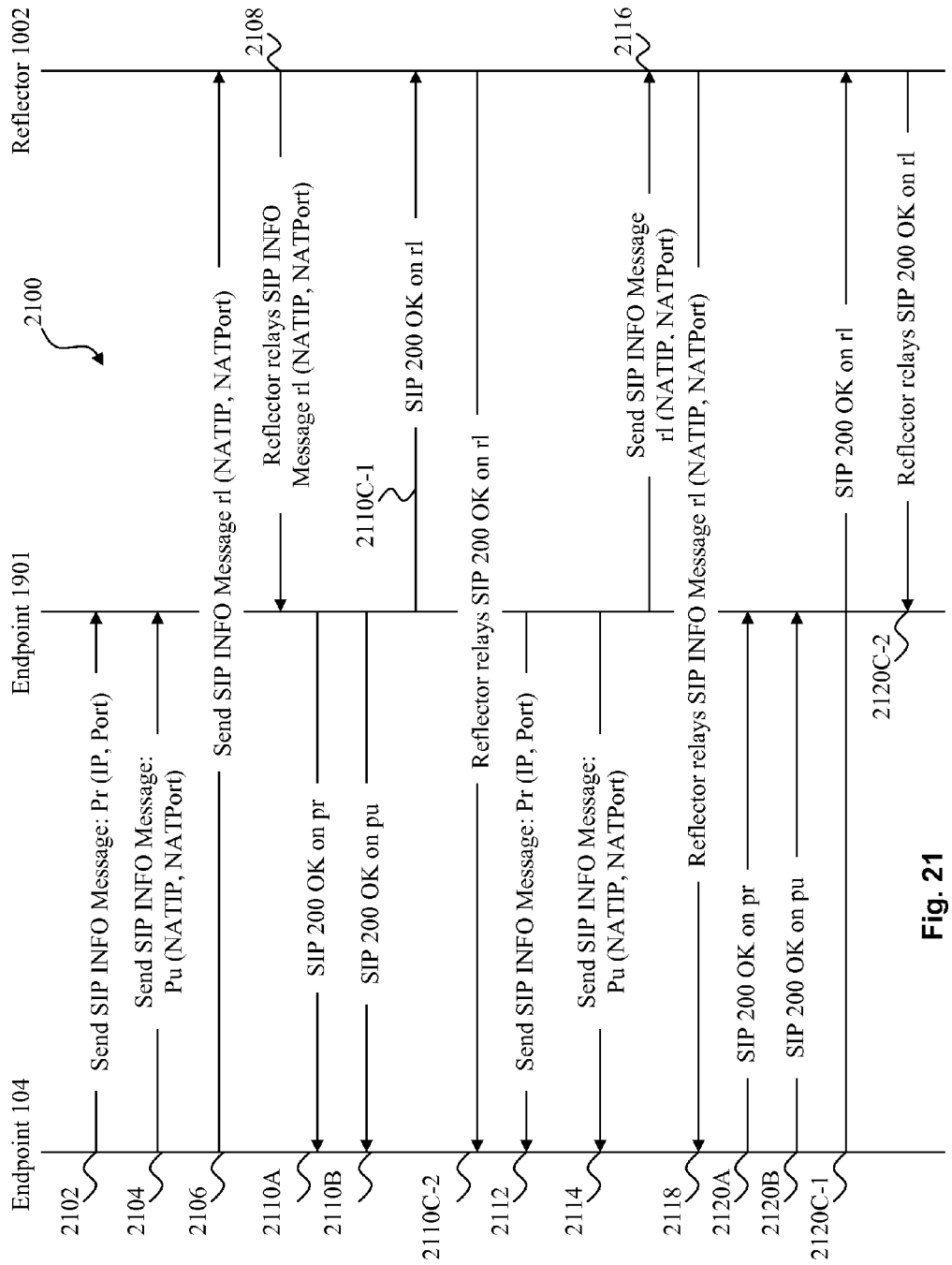
FIG. 21 is a sequence diagram illustrating one embodiment of steps from the sequence diagram of FIG. 20 in greater detail.

Referring to FIG. 21, a sequence diagram illustrates one embodiment of a message sequence 2100 that may occur during steps 2018 and 2020 of FIG. 20 in order to determine which of the routes are to be used. The endpoint 104 may keep a table containing each buddy that is online and the route to be used for that buddy. For example, when the route is unknown, the table may have the information shown in Table 1 below:

TABLE 1

| Buddy Endpoint | Route (send-receive) |
|---|---|
| 1901 | unk-unk |
| X | X |
| X | X |

The endpoint 104 (which is the originating endpoint in the present example) sends out three presence messages in steps 2102, 2104, and 2106. As the current example uses SIP messaging transported via UDP, the message is a SIP INFO message. More specifically, in step 2102, the endpoint 104 sends a SIP INFO message to the private IP address/port pair of the endpoint 1901 (i.e., via the private route) with an identifier such as a 'pr' tag to indicate the route. In step 2104, the endpoint 104 sends a SIP INFO message to the public (NAT) IP address/port pair of the endpoint 1901 (i.e., via the public route) with an identifier such as a 'pu' tag to indicate the route. In step 2106, the endpoint 104 sends a SIP INFO message to the endpoint 1901 via the reflector 1002 (i.e., via the relay route) with an identifier such as an 'rl' tag to indicate the route, which is reflected to the endpoint 1901 in step 2108.

The order in which the messages are sent may vary, but the order follows a hierarchy of desired routes in the present embodiment that places the private route first (i.e., most desirable), the public route next, and the relay route last (i.e., least desirable). However, it is understood that the order in which the messages are sent may vary or, if the endpoint 104 is capable of sending multiple messages simultaneously, the messages may be sent at the same time.

The present example assumes that the endpoint 1901 receives one or more of the messages sent in steps 2102, 2104, and 2106. If more than one message is received, the endpoint 1901 may respond only to the first one received. So, for example, if the message sent via the private route is received before the messages sent via the public and relay routes, the endpoint 1901 will respond only to the private route message and the later messages will be ignored. This reduces network traffic and provides for SIP compliance as the endpoint 104 (from a SIP perspective) expects to receive a single 200 OK message in response to its SIP INFO message. Furthermore, the response message may be sent back along the same route as the presence message to which the response is directed. So a response to the private route message will be sent back along the private route. Accordingly, only one of steps 2110A, 2110B, and 2110C-1 may occur in the present example. Step 2110C-2 is dependent on the occurrence of step 2110C-1 because the response message will not be reflected unless the relay route is used.

The response message returned by the endpoint 1901 is a SIP 200 OK message that may include the tag extracted from the received INFO message to identify which of the routes was successful (e.g., which route carried the message that was received first). For purposes of example, the private route was successful and the table may then be updated as shown in Table 2 below:

TABLE 2

| Buddy Endpoint | Route (send-receive) |
|---|---|
| 1901 | pr-unk |
| X | X |
| X | X |

It is noted that since the private route is successful, the two endpoints 104 and 1901 are in the same private network.

It is understood that the response message (e.g., the SIP 200 OK) may never be received by the endpoint 104. For example, the private route may not be available from the endpoint 1901 to the endpoint 104 due to network configuration settings. Accordingly, if the SIP 200 OK is not received by the endpoint 104, the endpoint 104 may execute a retransmission process that resends the presence messages along the three routes. The resending may occur a set number of times, for a set period of time, or until some other limit is reached. For example, the first set of presence messages may be sent 0.5 seconds after the initial messages are sent, the second set of messages may be sent one second after that, and each additional set of messages may be sent at time periods that are double the previous delay until a total of seven sets of messages are sent. At this time, the endpoint 104 may stop sending messages. If a response is received during the retransmission process, the endpoint 104 will stop retransmitting. However, the response message will generally be received by the endpoint 104.

The outbound SIP INFO messages and the received SIP 200 OK message inform the endpoint 104 of which route to use when sending communications to the endpoint 1901. However, this route may not work in reverse. In other words, just because the endpoint 104 can reach the endpoint 1901 via the private route (to continue the example), it does not necessarily follow that the endpoint 1901 can reach the endpoint 104 using the same route. For example, differences in the configurations of NAT devices or other network differences may mean one endpoint can be reached via a particular route even if the reverse route is not available.

Accordingly, the endpoint 1901 sends out three presence messages in steps 2112, 2114, and 2116. As the current example uses SIP messaging transported via UDP, the message is a SIP INFO message. More specifically, in step 2112, the endpoint 1901 sends a SIP INFO message to the private IP address/port pair of the endpoint 104 (i.e., via the private route). In step 2114, the endpoint 1901 sends a SIP INFO message to the public (NAT) IP address/port pair of the endpoint 104 (i.e., via the public route). In step 2116, the endpoint 1901 sends a SIP INFO message to the endpoint 104 via the reflector 1002 (i.e., via the relay route), which is reflected to the endpoint 104 in step 2118.

The present example assumes that the endpoint 104 receives one or more of the messages sent in steps 2112, 2114, and 2116. If more than one message is received, the endpoint 104 may respond only to the first one received. Accordingly, only one of steps 2120A, 2120B, and 2120C-1 may occur in the present example. Step 2120C-2 is dependent on the occurrence of step 2120C-1 because the response message will not be reflected unless the relay route is used. The response message returned by the endpoint 104 is a SIP 200 OK message that identifies which of the routes was successful (e.g., was received first).

If the first (or only) SIP INFO message received by the endpoint 104 from the endpoint 1901 is received via the same route as that used by the endpoint 104 to send messages to the endpoint 1901 (e.g., the private route), then the communication session is established with messages going both ways on that route. At this point, the table may then be updated as shown in Table 3 below:

TABLE 3

| Buddy Endpoint | Route (send-receive) |
|---|---|
| 1901 | pr-pr |
| X | X |
| X | X |

However, the first (or only) SIP INFO message received by the endpoint 104 from the endpoint 1901 may be received on a different route than that used by the endpoint 104 to send messages to the endpoint 1901. When this occurs, the endpoint 104 flags this as the endpoint 1901 responded to the INFO message via one route but is now communicating via another route. For example, the endpoint 1901 responded on the private route, but is now using the public route. One possibility for this discrepancy is that there is a router or other network device interfering with the return path (i.e., the path used by the endpoint 1901 to send messages to the endpoint 104). Another possibility is that a message went faster one way than another way. For example, while the endpoint 1901 may have received the private message from the endpoint 104 (i.e., the message of step 2102 of FIG. 21) before the other messages, the endpoint 104 may have received the public message from the endpoint 1901 (i.e., the message of step 2114 of FIG. 21) before the public and relay messages.

When this occurs, the endpoint 104 may transition from the private route to the public route. This results in sending and receiving routes of pu-pu as illustrated by Table 4 below:

TABLE 4

| Buddy Endpoint | Route (send-receive) |
|---|---|
| 1901 | pu-pu |
| X | X |
| X | X |

The endpoint 104 may also be configured to confirm that this transition is correct. To confirm the transition, the endpoint 104 executes a confirmation process and sends a confirmation message to the endpoint 1901 on the private route (i.e., the route that the endpoint 104 thinks it should be using to send messages to the endpoint 1901). In the present example, the confirmation message may include a SIP field named MAX_FORWARDS that defines a maximum number of hops that a packet can take before being dropped. The MAX_FORWARDS field has a standard default value of seventy, but the endpoint 104 may set the value to one (i.e., MAX_FORWARDS=1). If the response message from the endpoint 1901 is received by the endpoint 104 and has set the MAX_FORWARDS field to 0, then the endpoint 104 transitions back to the private route and uses that route for sending future messages. This results in different sending and receiving routes as illustrated by Table 5 below:

TABLE 5

| Buddy Endpoint | Route (send-receive) |
|---|---|
| 1901 | pr-pu |
| X | X |
| X | X |

However, if the endpoint 104 does not receive a response message to its confirmation message, it continues using the public route. This results in sending and receiving routes of pu-pu as illustrated by Table 4 above.

Communications between the endpoints 104 and 106 as illustrated in FIG. 19B may follow the same sequence of presence messages and responses as that described above with respect to FIGS. 20 and 21. However, since the endpoints 104 and 106 are in separate networks (i.e., not the same local network), the private route 1902 is not available and the private presence messages will fail to reach their destination. The presence messages may still be sent each way on the private route as the endpoints 104 and 106 do not know the location of the other endpoint, but the messages will be dropped. For example, the NAT devices 1004 and 1006 may both be routers that have an address of 192.168.1.1 in their respective home networks. The NAT device 1004 may assign a private address of 192.168.1.10 to the endpoint 104 and the NAT device 1006 may assign a private address of 192.168.1.15 to the endpoint 106. Although these addresses appear to be in the same local network, they are not. However, as the endpoints 104 and 106 have no way of knowing whether the private addresses are in the same local network until they perform their strategic routing sequences, they may both send their private presence messages along the private route, even though the messages will both fail. Accordingly, the endpoints 104 and 106 will use the public route 1904 and/or the relay route 1906 when communicating.

Figure 22:
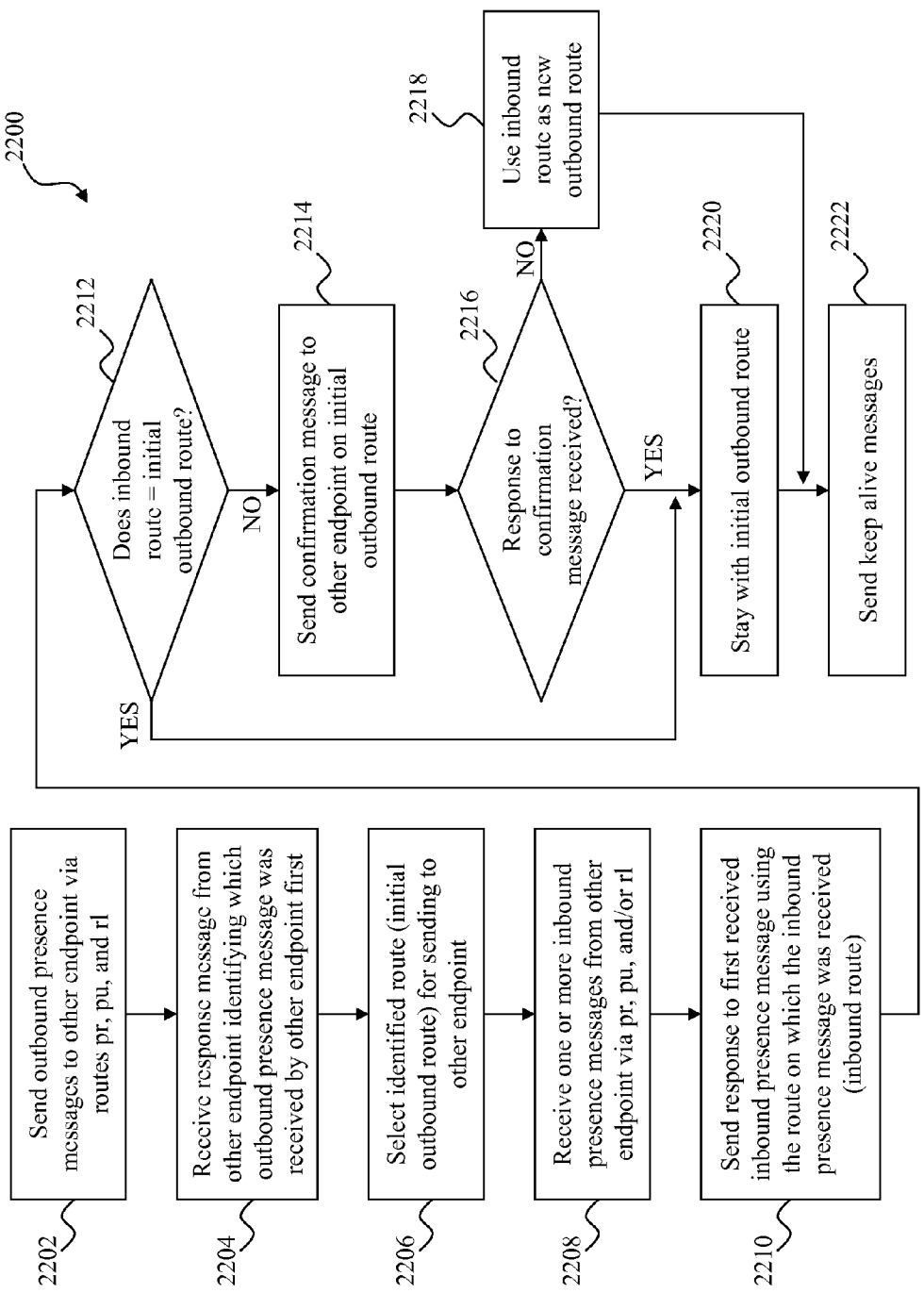
FIG. 22 is a flow chart illustrating one embodiment of a method that may be executed by an endpoint within the system of FIGS. 19A and 19B.

Referring to FIG. 22, a flowchart illustrates one embodiment of a method 2200 that may represent a process by which an endpoint such as the endpoint 104 of FIGS. 19A and 19B establishes a connection with another endpoint as described with respect to FIGS. 20 and 21 above.

In step 2202, the endpoint 104 sends outbound presence messages on the private, public, and relay routes. The presence messages may contain identifiers such as tags or other route indicators, or the receiving endpoint may simply note which virtual interface (i.e., pr, pu, or rl) received a particular presence message and correlate the message with the route upon receipt. In step 2204, the endpoint 104 receives a response message that indicates which of the presence messages was received first. For example, the response message may include the tag from the presence message to identify the route corresponding to the received presence message. In step 2206, the endpoint 104 selects the identified route as the initial outbound route for messages being sent to the other endpoint.

In step 2208, the endpoint receives one or more inbound presence messages from the other endpoint. In step 2210, the endpoint 104 sends a response to the first received inbound presence message.

In step 2212, the endpoint 104 determines whether the inbound route of the message received in step 2210 is the same route as the initial outbound route selected in step 2206. If the routes are the same, the method 2200 continues to step 2220 and uses the initial outbound route to send messages to the other endpoint. If the routes are not the same, the method 2200 moves to step 2214 and sends a confirmation message to the other endpoint using only the initial outbound route. In step 2216, the endpoint 104 determines whether a response to the confirmation message has been received. If no response to the confirmation message has been received, the method 2200 moves to step 2218 and transitions to the inbound route as the new outbound route for messages being sent to the other endpoint. If a response to the confirmation message has been received, the method 2200 continues to step 2220 and uses the initial outbound route to send messages to the other endpoint.

In step 2222, the endpoint 104 may begin sending keep-alive messages to the other endpoint to ensure that the outbound route remains open. For example, one of the networks or NAT devices involved in the established session may undergo a configuration change or a failure while the two endpoints are online, and so an existing route may become unusable. In such a case, the endpoint may detect that the keep-alive messages are failing and so may return to step 2202 to re-establish a valid route. It is noted that the other endpoint may not need to re-establish its outbound route. For example, if the inbound and outbound routes for the endpoint 104 are different, the inbound route may remain valid even though the outbound route is invalid. Accordingly, some steps of the method 2200 may be skipped in some scenarios.

It is noted that many different variations of the method 2200 may exist. For example, the endpoint 104 may transition to the inbound route as the new outbound route if it is determined in step 2212 that the routes are not the same, rather than remaining on the initial outbound route. Then, if a response is received to the confirmation message, the endpoint 104 may transition back to the initial outbound virtual interface. Furthermore, as stated previously, the response message may never be received by the endpoint 104 and so some steps of the method 2200 may not occur or may occur in a different order as there may be no response message available to determine the initial outbound route. It is also noted that some steps of the method 2200 may be performed in a different order than shown. For example, step 2208 may occur before step 2204 depending on network latency and other factors.

Figure 23A:
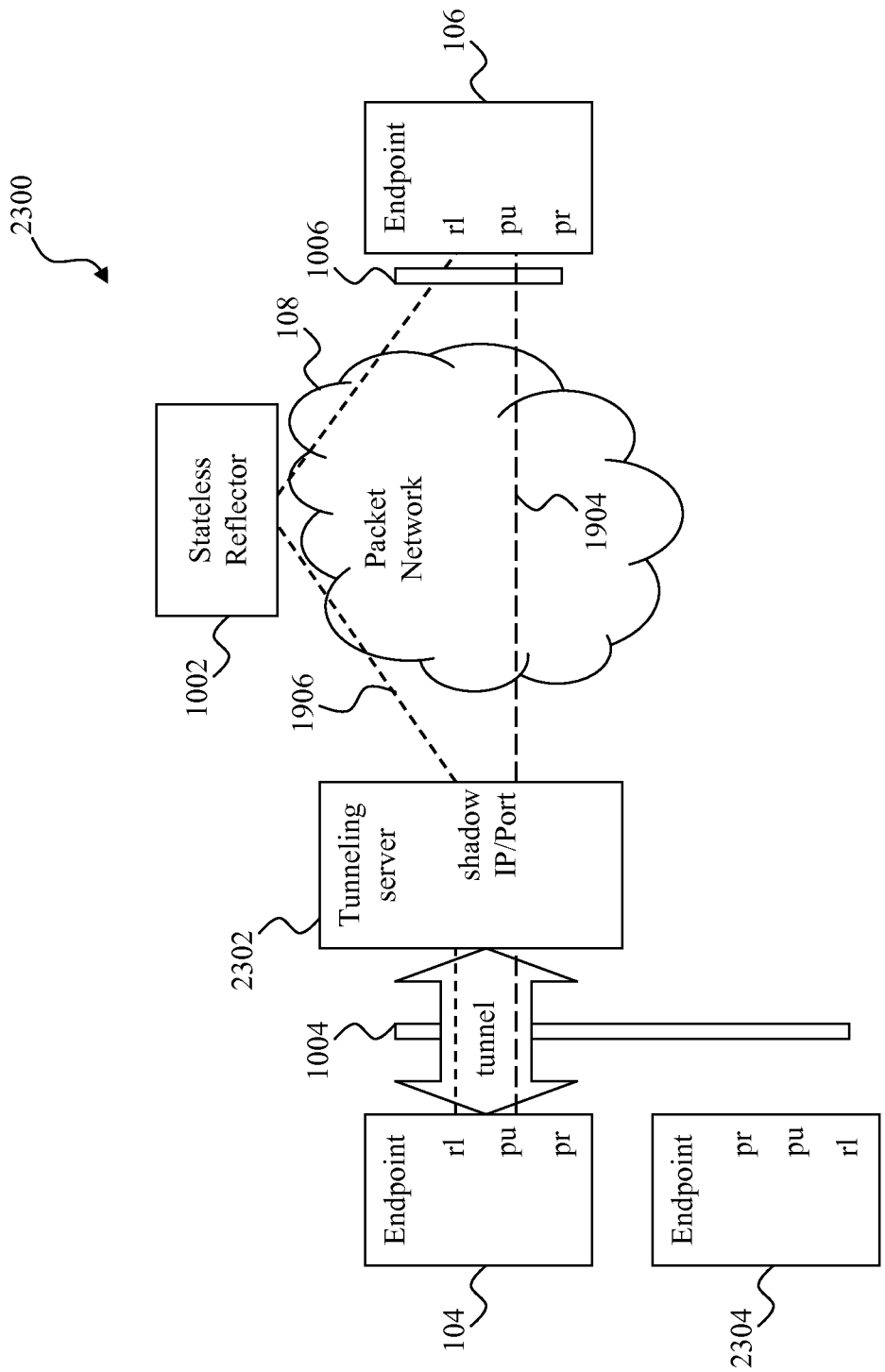
FIGS. 23A and 23B are simplified diagrams of another embodiment of a peer-to-peer system that includes a tunneling server and multiple possible routes between endpoints.
Figure 23B:
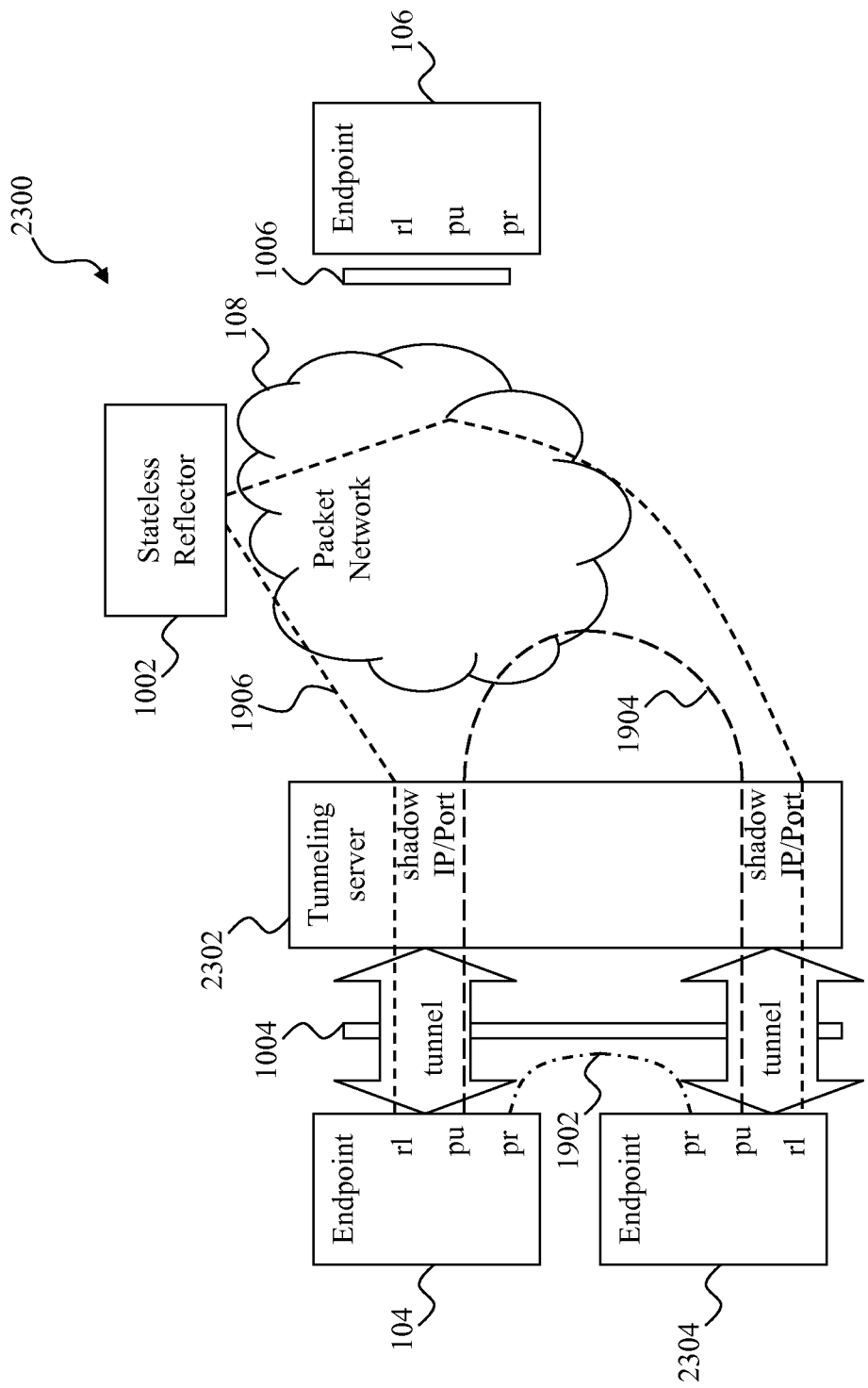

Referring to FIGS. 23A and 23B, in another embodiment, the endpoints 104 and 106, the two NAT devices 1004 and 1006, and the stateless reflector 1002 of FIGS. 19A and 19B are illustrated with a tunneling server or other access device 2302 and another endpoint 2304. The tunneling server 2402 may provide access to other endpoints for an endpoint that does not have UDP access or access to another expected protocol. For example, if the endpoint 104 performs a STUN request and the request fails, the network within which the endpoint 104 is positioned may not support UDP (e.g., the network may be an Enterprise network that has disabled UDP). For purposes of illustration, the endpoints 104 and 2304 are in a private network and not separated by the NAT device 1004, and the endpoint 106 is separated from the endpoint 104 by the NAT devices 1004 and 1006.

Figure 24:
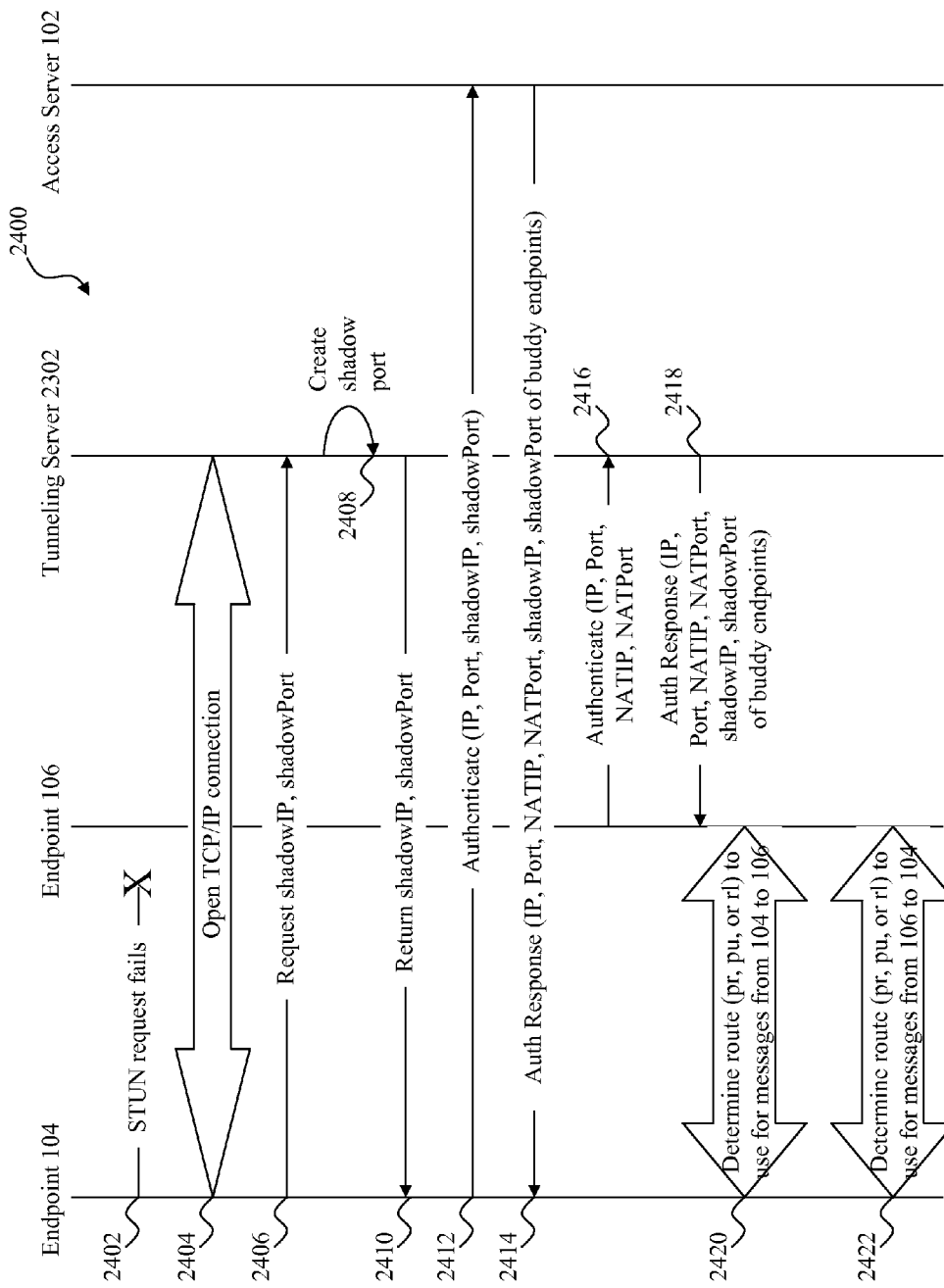
FIG. 24 is a sequence diagram illustrating one embodiment of a process that may be executed by endpoints within the system of FIGS. 23A and 23B.

Referring to FIG. 24, a sequence diagram illustrates one embodiment of a message sequence 2400 that may occur in the environment of FIGS. 23A and 23B to establish a connection between the endpoints 104 and 106. As with the previous discussion of FIG. 20, the endpoints 104 and 106 may each maintain a table, although this is not shown in the present example.

In step 2402, the endpoint 104 sends a STUN request that fails. Based on the failure of the STUN request, the endpoint 104 determines that the network (e.g., the NAT device 1004) has disabled UDP. It is understood that other indicators may be used to determine that UDP is not available. In step 2404, based on the unavailability of UDP, the endpoint 104 opens a TCP/IP connection (i.e., a tunnel) with the tunneling server 2302. This connection may use a port such as port 443 of the NAT device 1004, which is the default TCP port for HTTP Secure (HTTPS) connections using the Transport Layer Security (TLS) or Secure Socket Layer (SSL) protocols. However, it is understood that port 443 is only an example and that other available ports may be used. In step 2406, the endpoint 104 requests a shadow IP address and shadow port on the tunneling server 2302. In step 2408, the tunneling server 2302 creates the shadow IP address and port and returns this information to the endpoint 104 in step 2410.

The shadow IP address and shadow port serve as the public address and port of the endpoint 104 for other endpoints. In other words, the shadow IP address/port replace the NAT IP address/port that would serve as the public contact information for the endpoint 104 in an environment in which UDP is available to the endpoint 104 (e.g., as in FIGS. 19A and 19B). In some embodiments, the shadow IP address/port pairs may be placed on a shadow list as they are provisioned and the shadow list may be available to the access server 102 and/or endpoints. In other embodiments, the access server 102 and/or endpoints may have a list or range of IP addresses/ports that are known to be shadows. In still other embodiments, the knowledge of whether an IP address/port is a shadow is not available to the access server 102 and/or endpoints.

In step 2412, the endpoint 104 authenticates with the access server 102 via the tunnel using its local IP address/port and shadow address/port information. In step 2414, the access server 102 authenticates the endpoint 104 and sends the endpoint 104 the contact information of online buddies, including corresponding private, public, and shadow IP address/port information.

Although not shown in FIG. 24, the endpoint 106 sends a request to a STUN server and receives its public IP address/port information as described with respect to the endpoints 104 and 1901 in FIG. 20. Since the endpoint 106 is successful with its STUN request, it does not need to use the tunneling server 2302. In steps 2416 and 2418, the endpoint 106 authenticates with the access server and receives the private IP address/port and shadow IP address/port of the endpoint 104. As discussed above, the endpoint 106 may or may not know that the endpoint 104 is using a shadow, depending on the particular implementation of the shadow list.

In steps 2420 and 2422, the endpoints 104 and 106 may establish a communication session as described previously with respect to FIGS. 20 and 21. However, the communications between the two endpoints 104 and 106 will use the tunnel between the endpoint 104 and the tunneling server 2302 and the corresponding shadow IP address and port for the endpoint 104.

In embodiments where the endpoint 106 knows that the endpoint 104 is using a shadow, the endpoint 106 may not send a presence message via the private route as the endpoint 106 knows that the private route is not available. In other embodiments, the endpoint 106 may send a presence message via the private route even though the route is not available.

Communications between the endpoints 104 and 2304 as illustrated in FIG. 23B may follow a similar sequence of presence messages and responses as that described above with respect to FIG. 24. However, since the endpoints 104 and 2304 are in the same local network, the private route 1902 is available and the private presence messages may reach their destinations. The endpoint 2304 may not use a relay message to try to reach the endpoint 104, since its failed STUN request will inform the endpoint 2304 that UDP is not available. In order to use the public and relay routes, the endpoint 2304 will create a tunnel with the tunneling server 2303 as described above with respect to the endpoint 104. The public and relay messages may still work via the respective tunnels of the endpoints 104 and 2304.

Figure 25:
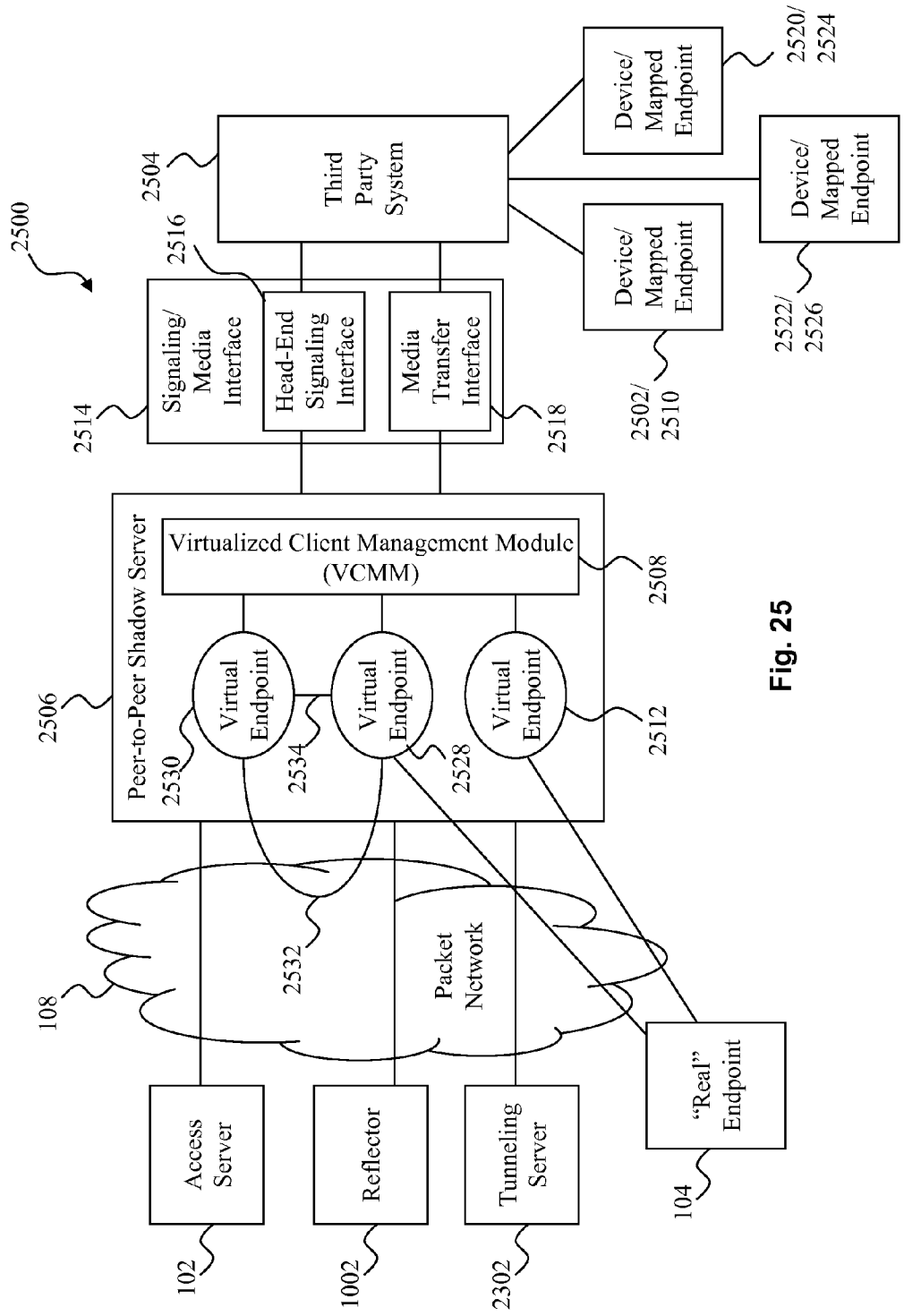
FIG. 25 is a simplified diagram of another embodiment of a peer-to-peer environment that may use a virtual endpoint to represent a device in a peer-to-peer network.

Referring to FIG. 25, in another embodiment, an environment 2500 is illustrated in which an endpoint (e.g., the endpoint 104 of FIG. 1) may communicate with a device 2502 that is not an endpoint. For example, the device 2502 may not contain the endpoint engine 252 described with respect to FIG. 2b and may be unable to login to a peer-to-peer network associated with the access server 102 (FIG. 1) and/or may be unable to communicate directly with the endpoint 104 due to the lack of required endpoint functionality. In some embodiments, the device 2502 may be in a restricted environment, in which case it may not be possible to provide the endpoint engine 252 to the device due to the restrictions. For example, the device 2502 may be a television set-top box and such boxes are generally restricted environments that are closed to applications such as are needed for endpoint functionality. In other embodiments, the device 2502 may not be capable of supporting the endpoint engine 252. For example, the device 2502 may lack sufficient memory and/or processing power for the endpoint engine 252 and/or may not have a suitable communications link. For example, the device 2502 may be a television that is not capable of providing the needed environment for the endpoint engine 252.

In the present example, a third party system 2504 handles communications to and from the device 2502. The third party system 2504 may be any type of system and need not be ordinarily configured for communications with a device such as the endpoint 104. For example, the device 2502 may be a television or a television set-top box, a tablet such as those commonly used by delivery services, a cellular telephone, or any other device capable of interacting with a user to receive input data from the user and/or send output data to the user. The device 2502 may also represent a combination of other devices, such as a television and television set-top box combination, with the television providing display and audio output for the set-top box and input occurring via a remote control or other input device. It is understood that if the device 2502 does not have an output component (e.g., a screen and/or speaker) and/or some type of input device, then the third party system 2504 may provide such functionality to the device.

The third party system 2504 may be a "black box" from the perspective of the peer-to-peer network components such as the endpoint 104 and the access server 102. However, although the third party system 2504 may be a black box in terms of its internal operation, it may provide an Application Programming Interface (API) that enables an exterior system to communicate with the third party system. In some embodiments, the third party system 2504 may be a proprietary system, in which case the API may be provided by an operator of the third party system 2504.

As is described below in greater detail, the API of the third party system 2504 enables external systems and devices (e.g., the endpoint 104) to communicate with the third party system 2504 and devices internal to the third party system, such as the device 2502. Because the API is known, communications between the endpoint 104 and the device 2502 may be converted (i.e., reformatted) as needed. The third party system 2504 and/or components within the peer-to-peer network may handle such conversions. This allows the device 2502 to behave as an endpoint without actually having the endpoint functionality that is on an endpoint such as the endpoint 104.

To facilitate communications between the endpoint 104 and the device 2502, a peer-to-peer shadow server 2506 is provided. Although the shadow server 2506 may be configured in many different ways, in the present example the shadow server 2506 may include a virtualized endpoint management module (VEMM) 2508. The VEMM 2508 may maintain a list of "mapped endpoints" that represent devices that are not themselves endpoints, such as the device 2502. The mapped endpoints may be controlled in many different ways. For example, the mapped endpoints may only include devices that are registered with the VEMM 2508. In another example, the mapped devices may be any devices that are accessible via the third party system 2504. In still another example, the mapped devices may be any devices that are accessible via the third party system 2504 that meet certain criteria (e.g., have defined input and output capabilities or are subscribers of a service).

Each of the mapped endpoints represents a device that is able to interact with a "real endpoint" (e.g., the endpoint 104 that contains the needed functionality to perform as an endpoint, such as the endpoint engine 252) via the VEMM 2508. For each of the mapped endpoints, the VEMM 2508 provides a "virtual endpoint" that represents the mapped endpoint in the peer-to-peer network. Accordingly, in the present example, the device 2502 is a mapped endpoint 2510 that is represented by a virtual endpoint 2512. It is understood that, in the present embodiment, the device 2502 may exist without a corresponding mapped endpoint 2510, but the mapped endpoint may not exist without the device 2502. As the device 2502 may be one of many different devices or combinations of devices as described above, it will frequently be referred to as the mapped endpoint 2510 in the following examples. From an operational perspective, the VEMM 2508 may deal with the mapped endpoint 2510, rather than with the device 2502.

The shadow server 2506 may be coupled to other components of a peer-to-peer environment, such as the access server 102 of FIG. 1, a reflector/STUN server such as the reflector 1002 of FIG. 10, and a tunneling server such as the tunneling server 2302 of FIG. 23. As these are described in detail above and/or in the text as incorporated by reference, they are not described further in the present example. It is understood that the shadow server 2506 has access to servers just as the endpoint 104 has access to such servers, and the shadow server 2506 may use these servers when needed (e.g., to authenticate a user or to perform NAT traversal functions).

In the present example, the shadow server 2506 (e.g., via the VEMM 2508) is coupled to the third party system 2504 via a signaling/media interface 2514 that provides a head-end signaling interface 2516 for handling signaling and a media transfer interface 2518 for handling media (e.g., video, audio, and/or data). Although shown as a separate component of the environment 2500, the signaling/media interface 2514 may be part of the shadow server 2506 or part of the third party system 2504. It is understood that the signaling/media interface 2514 may not be configured as shown, but provides the functionality needed to handle the signaling and media traffic of an endpoint as described previously.

In some embodiments, the media/signaling interface 2514 may not be needed and may be bypassed for some or all communications. In this case, the following embodiments may be similar except that the media/signaling interface 2514 may be removed. In still other embodiments, the VEMM 2508 may only instantiate the virtual endpoint 2512 and may not be part of the communications after the instantiation is complete. In this case, the following embodiments may be similar except that the VEMM 2508 may be removed except for virtual endpoint instantiation.

The VEMM 2508 may handle virtual client instantiation and management and may also handle traffic to and from the mapped endpoint 2510. In some embodiments, all signaling and media traffic may pass through the VEMM 2508 to and from the signaling/media interface 2514, while in other embodiments one or both of the signaling and media traffic may pass directly between the virtual endpoint 2512 and the signaling/media interface 2514 without passing through the VEMM 2508. For example, signaling traffic between the virtual endpoint 2512 and the signaling/media interface 2514 may pass through the VEMM 2508, while media traffic may bypass the VEMM 2508 and go directly between the virtual endpoint 2512 and the signaling/media interface 2514.

In the following examples, the peer-to-peer network may be based on a SIP messaging model over UDP while the third party system 2504 may use an entirely different proprietary or non-proprietary protocol or set of protocols that is incompatible with the SIP/UDP model. For example, if the device 2502 is a television and is responsive only to satellite or cable television signals provided by the third party system 2504, then the device 2502 is not compatible with messaging using the SIP/UDP model. Accordingly, the signaling/media interface or another component of the peer-to-peer network and/or the third party system 2504 may handle the conversions and formatting needed in order for the peer-to-peer network and the third party system 2504 to communicate despite the differing protocols.

Although single components of the peer-to-peer network are illustrated in FIG. 25, it is understood that multiple components may be used. For example, multiple shadow servers may be used for load balancing and/or other purposes and so the present disclosure is not limited to the configuration shown.

Figure 26:
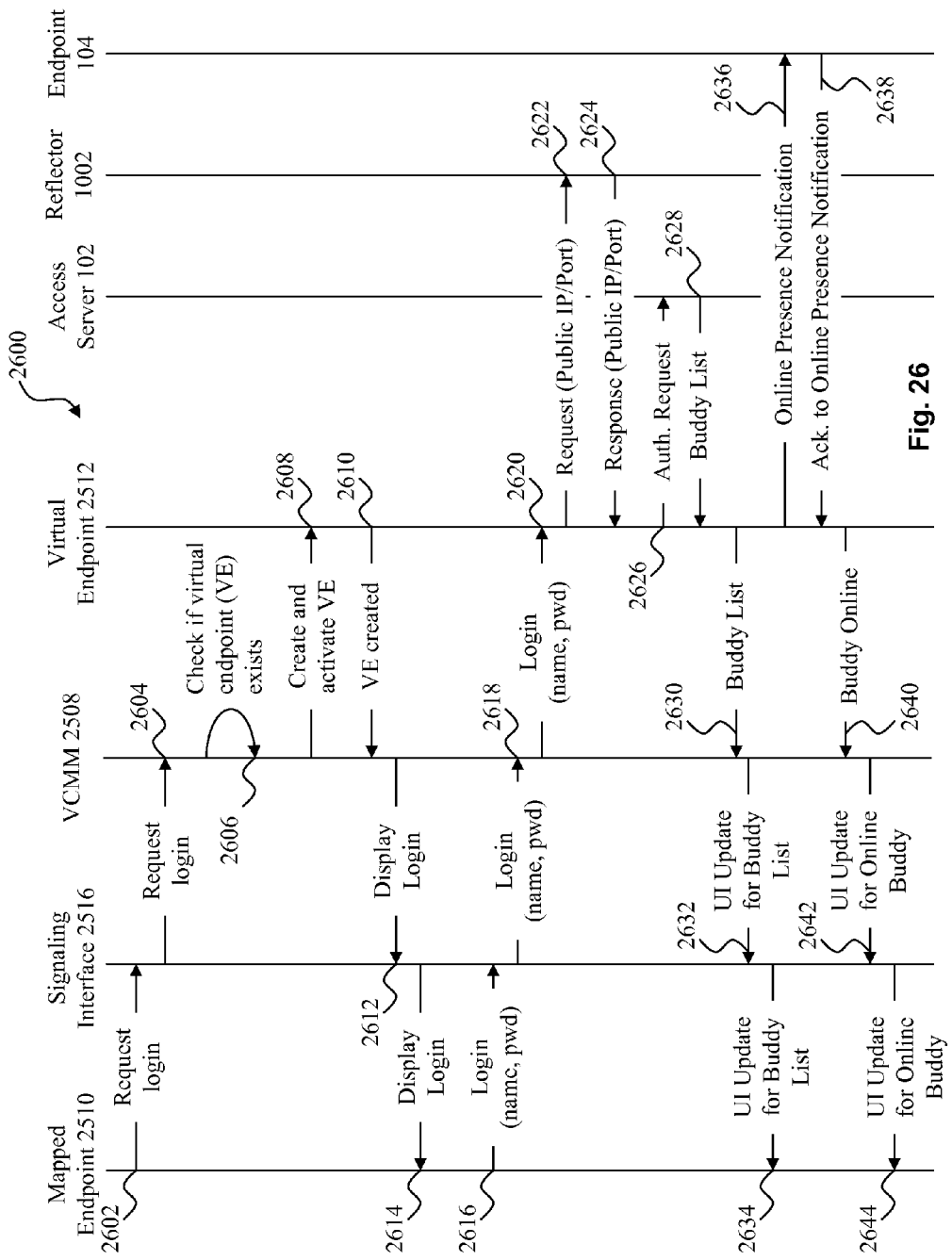
FIGS. 26-29 are sequence diagrams illustrating embodiments of various processes that may be executed within the environment of FIG. 25.

Referring to FIG. 26, a sequence diagram illustrates one embodiment of a message sequence 2600 that may occur in the environment 2500 of FIG. 25 when the device 2502 logs into the peer-to-peer network. In the present example, the endpoint 104 is a buddy to the mapped endpoint 2510 and/or the virtual endpoint 2512 and so each has already authorized communications from the other buddy as described in previous embodiments. Furthermore, the endpoint 104 has already logged into the peer-to-peer network and is online prior to the initial step of the message sequence 2600 or at least prior to step 2626. It is understood that all of the communications between the VEMM 2508 and the mapped endpoint 2510 may go through the third party system 2504, although the third party system is not explicitly shown in FIG. 26. Accordingly, the communications may be converted or otherwise manipulated as needed in order to provide output to and to receive input from the device 2502.

In step 2602, the mapped endpoint 2510 sends a login request to the signaling interface 2516. In step 2604, the signaling interface 2516 passes the request to the VEMM 2508. The signaling interface 2516 may simply pass the request on to the VEMM 2508 or may reformat the request as needed. It is understood that, in some embodiments, the mapped endpoint 2510 may not actually be mapped until the request is received by the VEMM 2508. For example, the device 2502 may send the request and, when the request is received by the VEMM 2508, the VEMM 2508 may then map the device 2502. Alternatively, the mapping may exist prior to the request and the VEMM 2508 may view the request as being received from the mapped endpoint 2510.

In step 2606, the VEMM 2508 determines whether a virtual endpoint already exists for the mapped endpoint 2510. For example, the mapped endpoint 2510 may have lost communication and may log in after restoring communication. If the virtual endpoint has remained alive during this time, the VEMM 2508 may associate the current login request with the existing virtual endpoint and not create a new endpoint. If no virtual endpoint exists as determined in step 2606, the VEMM 2508 creates the virtual endpoint 2512 (assuming sufficient memory and other technical requirements are met) in step 2608 and receives confirmation of its creation in step 2610. In the present example, the virtual endpoint 2512 is an instanced endpoint that exists in the memory of the server 2506 once instantiated by the VEMM 2508.

The virtual endpoint 2512 may return a value or other indicator to the VEMM 2508 indicating that it was successfully instantiated and is ready for use. If the instantiation fails, a message may be returned to the device 2502 that the virtual endpoint cannot be created. This message may indicate simply that the login failed or may provide more detailed information. The instance may be destroyed when the mapped endpoint 2510 logs off or may be maintained based on settings of the VEMM 2508. In the present example, the virtual endpoint 2512 has the same capabilities as a real endpoint and so may perform the same functions as the endpoints described in previous embodiments. It is understood, however, that in some embodiments the functionality of the virtual endpoint 2512 may be limited by configuration or security settings of the shadow server 2502 and/or the third party system 2510.

In steps 2612 and 2614, the VEMM 2508 may send a message to the mapped endpoint 2510 to display a login screen. For example, the message from the VEMM 2508 may notify the third party system 2504 that it needs to provide a particular display to the mapped endpoint 2510. The third party system 2504 may then provide the needed display. This may happen in environments where the device 2502 is a device such as a television, where the login window may be a video overlay that appears on the television screen. The instructions may prompt the cable or satellite operator to provide the video overlay using the cable or television equipment coupled to the television and controlled by the operator. In other embodiments, the VEMM 2508 may send instructions to the mapped endpoint 2510 instructing the mapped endpoint to display the login screen. Accordingly, the actual display process and the particular instructions may depend on the implementation of the device 2502 and the third party system 2504.

In steps 2616 and 2618, the mapped endpoint 2510 provides login information (e.g., user name and authentication information as previously described) to the VEMM 2508. In step 2620, the VEMM 2508 provides the login information to the virtual endpoint 2512.

In step 2622, the virtual endpoint 2512 contacts the reflector 1002 and requests the public IP address and port information of the virtual endpoint. The process of obtaining this information and possible uses for this information are described in previous embodiments and are not described in detail in the present example. It is noted that step 2622 may occur without input from mapped endpoint 2510, as this step may rely on endpoint functionality of which the mapped endpoint 2510 is unaware. In step 2624, the virtual endpoint 2512 receives the public IP address and port information from the reflector 1002.

In step 2626, the virtual endpoint 2512 logs into the access server 102 by providing its username, password, local (NAT) IP address and port information, and public IP address and port information to the access server. If the authentication fails, a message may be sent by the virtual endpoint 2512 to the mapped endpoint 2510 indicating that the login has failed. In step 2628, the access server 102 sends the buddy list associated with the login information to the virtual endpoint 2512 as described previously. In step 2630, the virtual endpoint 2512 sends the buddy list to the VEMM 2508.

In steps 2632 and 2634, the VEMM 2508 sends a message to the mapped endpoint 2510 via the signaling interface 2516 to display the buddy list. For example, the message from the VEMM 2508 may be used by the third party system 2504 to display the buddy list based on user interface elements provided or controlled by the third party system or the mapped endpoint 2510.

In step 2636, the virtual endpoint 2512 sends a presence message to the endpoint 104 to inform the endpoint 104 that the mapped endpoint 2510 is online. In the present example, the message is a SIP presence message and, in step 2638, the endpoint 104 responds with a 200 OK to the virtual endpoint 2512. Although SIP is used for purposes of example, it is understood that many different types of messaging may be used and the presence message and reply may not be SIP messages. In step 2640, the virtual endpoint 2512 informs the VEMM 2508 that the endpoint 104 is online and, in steps 2642 and 2644, the VEMM 2508 sends a message to the mapped endpoint 2510 via the signaling interface 2516 to indicate that the endpoint 104 is online. In some embodiments, steps 2638, 2640, 2642, and 2644 may not occur as the endpoint 104 is online prior to the login of the mapped endpoint 2510 and will be in the buddy list with an online status when the buddy list is returned to the mapped endpoint.

Figure 27:
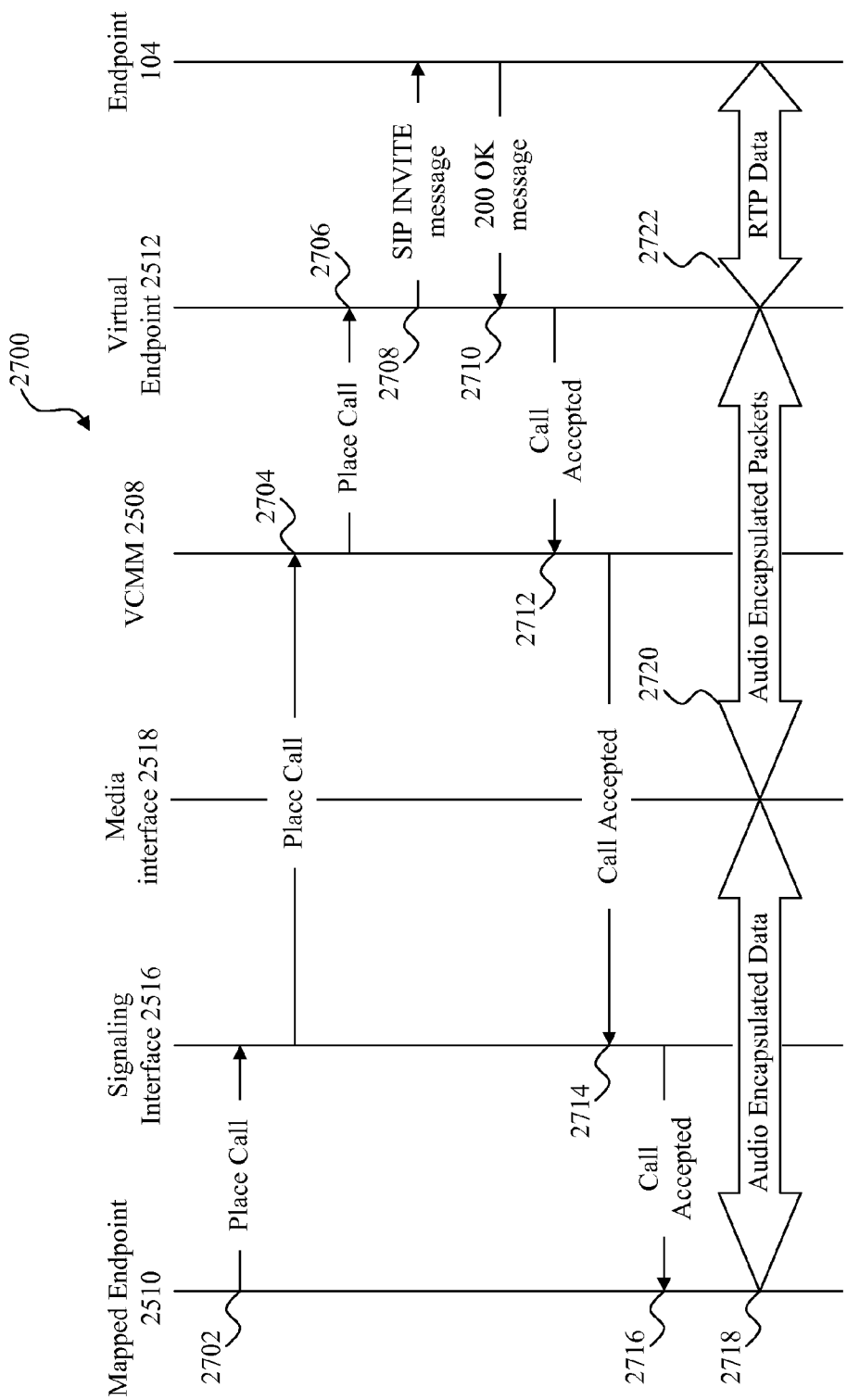

Referring to FIG. 27, a sequence diagram illustrates one embodiment of a message sequence 2700 that may occur in the environment 2500 of FIG. 25 after the mapped endpoint 2510 is logged into the peer-to-peer network via the virtual endpoint 2512. In the present example, the mapped endpoint 2510 and the endpoint 104 are buddies and have already approved communications as described in previous embodiments. In the present example, the mapped endpoint 2510 is to place an audio call to the endpoint 104.

In steps 2702 and 2704, the mapped endpoint 2510 sends a message to the VEMM 2508 via the signaling interface 2516 to place the call. In step 2706, the VEMM 2508 forwards the message (with or without additional formatting) to the virtual endpoint 2512. In step 2708, the virtual endpoint 2512 places the call by sending a message to the endpoint 104. In the present example, the message is a SIP INVITE message. In step 2710, the endpoint 104 responds to the virtual endpoint 2512 with a 200 OK message (or another type of response message depending on the messaging type used) to accept the call. If the call were to be rejected by the endpoint 104, the following steps would denote rejection rather than acceptance.

In step 2712, the virtual endpoint 2512 sends a message to the VEMM 2508 notifying the VEMM that the call has been accepted by the endpoint 104. The message sent by the virtual endpoint 2512 may be the 200 OK message itself or may be another message. In steps 2714 and 2716, the VEMM 2508 sends a message to the mapped endpoint 2510 via the signaling interface 2516 that the call has been accepted and this is displayed on a user interface of the mapped endpoint.

In the present example, the call may then proceed with audio encapsulated data passing between the mapped endpoint 2510 and the media interface 2518 as shown by arrow 2718, audio encapsulated packets passing between the media interface 2518 and the virtual endpoint 2512 as shown by arrow 2720, and data based on the real-time transport protocol (RTP) or another suitable protocol passing between the virtual endpoint 2512 and the endpoint 104 as shown by arrow 2722. In some embodiments, the audio encapsulated data may be in packet format depending on the messaging system used by the third party system 2504 and the device 2502. For example, if the device 2502 is a television and the third party system 2504 is a cable television company, the messaging type for arrow 2518 would be compatible with cable television and may include overlays generated by a set-top box or other controller for display on the television. If the device 2502 is a cellular telephone (e.g., a phone based on a network protocol such as the Global System for Mobile Communications (GSM) or Code Division Multiple Access (CDMA)) or another device that uses a cellular network and the third party system 2504 is a cellular telephone provider, the messaging type would be compatible with the network type and the particular device.

Figure 28:
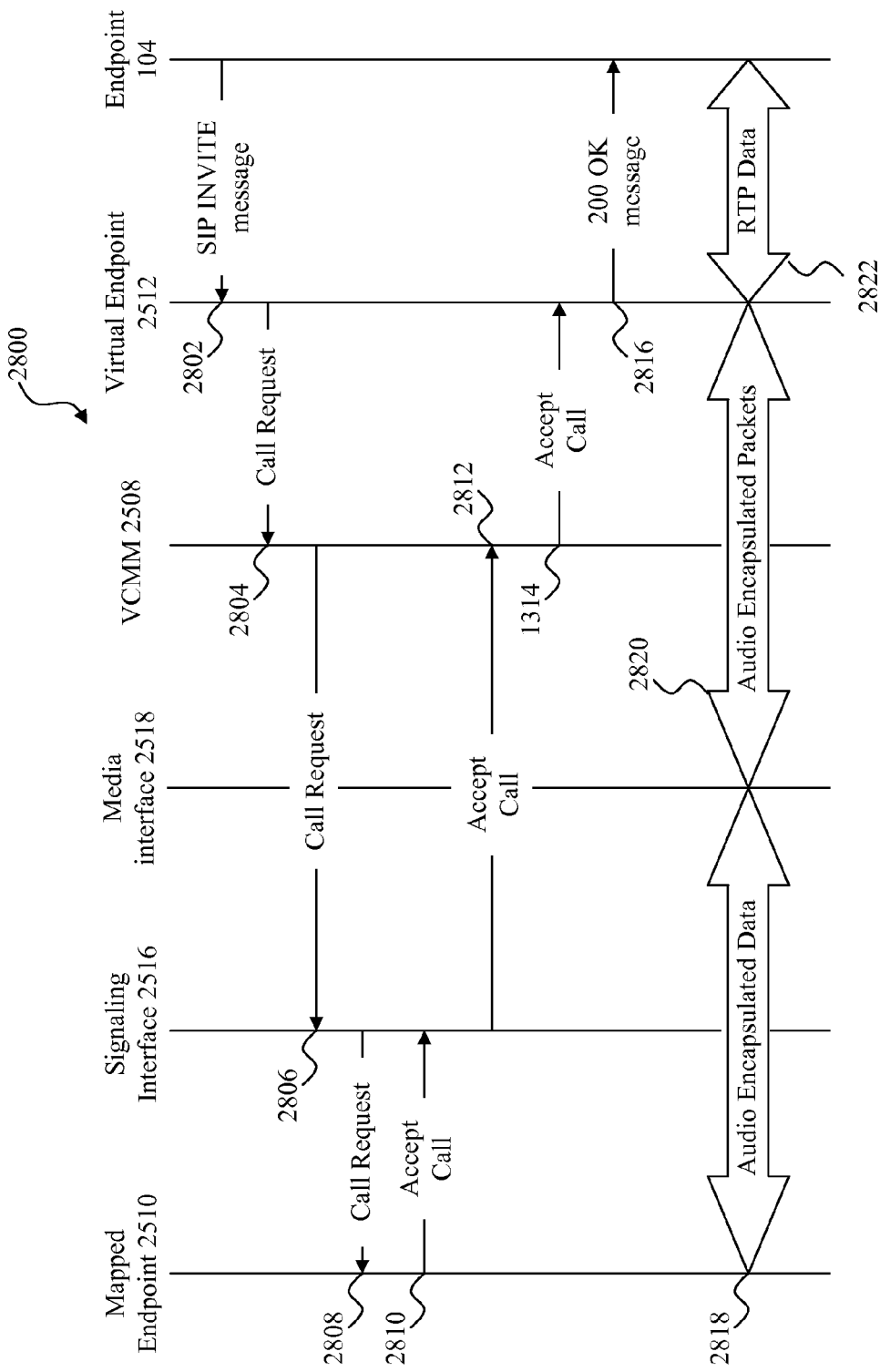

Referring to FIG. 28, a sequence diagram illustrates one embodiment of a message sequence 2800 that may occur in the environment of FIG. 25 after the mapped endpoint 2510 is logged into the peer-to-peer network. In the present example, the mapped endpoint 2510 and the endpoint 104 are buddies and have already approved communications as described in previous embodiments. In the present example, the mapped endpoint 2510 is to receive an audio call placed by the endpoint 104.

In step 2802, the endpoint 104 sends a SIP invite message (or other message depending on the messaging type being used) to the virtual endpoint 2512. In step 2804, the virtual endpoint 2512 sends the call request to the VEMM 2508. The call request may be the SIP message itself or may be another message indicating that a call request has been received from the endpoint 104. In steps 2806 and 2808, the call request is forwarded to the mapped endpoint 2510.

In step 2810, the mapped endpoint 2510 responds to the call request by rejecting or accepting the call. In the present example, the request is accepted and the acceptance is passed to the virtual endpoint 2512 via the signaling interface 2516 and VEMM 2508 in steps 2810, 2812, and 2814. In step 2816, the virtual endpoint 2512 sends a 200 OK message to the endpoint 104 indicating that the mapped endpoint 2510 has accepted the call.

In the present example, the call may then proceed with audio encapsulated data passing between the mapped endpoint 2510 and the media interface 2518 as shown by arrow 2818, audio encapsulated packets passing between the media interface 2518 and the virtual endpoint 2512 as shown by arrow 2820, and data based on RTP or another suitable protocol passing between the virtual endpoint 2512 and the endpoint 104 as shown by arrow 2822.

Referring again to FIG. 25, in another embodiment, three devices 2502, 2520, and 2522 correspond to mapped endpoints 2510, 2524, and 2526, respectively. The mapped endpoints are associated with virtual endpoints 2512, 2528, and 2530, respectively. As illustrated in FIG. 25, the mapped endpoints 2524 and 2526 may communicate with one another via their respective virtual endpoints 2528 and 2530. This enables the devices 2520 and 2522, which are not real endpoints, to communicate via the peer-to-peer network in a manner similar to that of the device 2502. The connection between the virtual endpoints 2528 and 2530 may route out of and back into the shadow server 2506 as illustrated by line 2532 or may occur internally as illustrated by line 2534. It is understood that generally only one of lines 2532 or 2534 would exist. In the environment 2500 of FIG. 25, the virtual endpoint 2528 is also coupled to the endpoint 104. For example, the virtual endpoint 2528 may be anchoring a conference call with the virtual endpoint 2530 and the endpoint 104. Accordingly, a virtual endpoint may behave like a real endpoint and have many different connections to other virtual and real endpoints.

Figure 29:
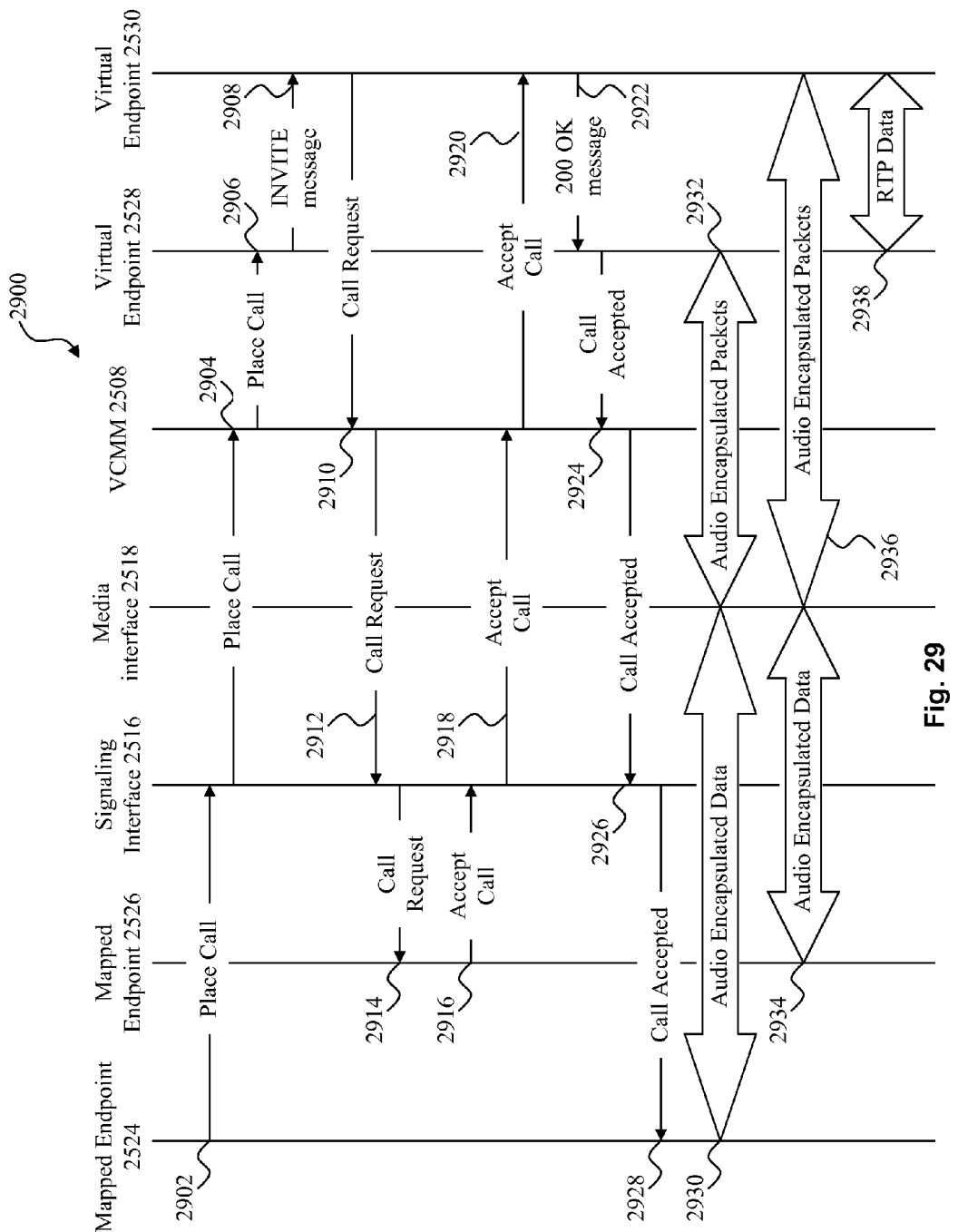

Referring to FIG. 29, a sequence diagram illustrates one embodiment of a message sequence 2900 that may occur in the environment of FIG. 25 after the mapped endpoints 2524 and 2526 are logged into the peer-to-peer network. In the present example, the mapped endpoints 2524 and 2526 are buddies and have already approved communications as described in previous embodiments. In the present example, the mapped endpoint 2524 is to place a call to the mapped endpoint 2526.

In steps 2902 and 2904, the mapped endpoint 2524 sends a message to the VEMM 2508 via the signaling interface 2516 to place the call. In step 2906, the VEMM 2508 forwards the message (with or without additional formatting) to the virtual endpoint 2528. In step 2908, the virtual endpoint 2528 places the call by sending a message to the virtual endpoint 2530. In the present example, the message is a SIP INVITE message.

In step 2910, the virtual endpoint 2530 sends the call request to the VEMM 2508. The call request may be the SIP message itself or may be another message indicating that a call request has been received from the virtual endpoint 2528. In steps 2912 and 2914, the call request is forwarded to the mapped endpoint 2526.

In step 2910, the mapped endpoint 2526 responds to the call request by rejecting or accepting the call. In the present example, the request is accepted and the acceptance is passed to the virtual endpoint 2530 via the signaling interface 2516 and VEMM 2508 in steps 2916, 2918, and 2920. In step 2922, the virtual endpoint 2530 sends a 200 OK message to the virtual endpoint 2528 indicating that the mapped endpoint 2526 has accepted the call.

In step 2924, the virtual endpoint 2528 sends a message to the VEMM 2508 notifying the VEMM that the call has been accepted by the virtual endpoint 2530. The message sent by the virtual endpoint 2528 may be the 200 OK message itself or may be another message. In steps 2926 and 2928, the VEMM 2508 sends a message to the mapped endpoint 2524 via the signaling interface 2516 that the call has been accepted and this is displayed on a user interface of the mapped endpoint.

In the present example, the call may then proceed with audio encapsulated data passing between the mapped endpoint 2524 and the media interface 2518 as shown by arrow 2930 and audio encapsulated packets passing between the media interface 2518 and the virtual endpoint 2528 as shown by arrow 2932. Similarly, audio encapsulated data passes between the mapped endpoint 2526 and the media interface 2518 as shown by arrow 2934 and audio encapsulated packets pass between the media interface 2518 and the virtual endpoint 2530 as shown by arrow 2936. Data based on RTP or another suitable protocol passes between the virtual endpoint 2528 and the virtual endpoint 2530 as shown by arrow 2938.

Although not shown in FIG. 29, the virtual endpoint 2528 may add the endpoint 104 to the call as described with respect to FIG. 27. This enables the virtual endpoint 2528 to establish a conference call with both virtual and/or real endpoints.

Accordingly, described above are embodiments illustrating how one or more virtual endpoints can be provided in a peer-to-peer network so that devices that are not themselves endpoints can communicate as peers within the network. Each virtual endpoint may have the same capabilities as a real endpoint and so may perform the same functions described in previous embodiments. Examples of such endpoint functions are described herein and in previously incorporated U.S. Pat. No. 7,570,636 and U.S. patent application Ser. No. 12/705,925. A mapped endpoint may send messages to the virtual endpoint that are to be passed to other endpoints, but the virtual endpoint generally handles all endpoint functionality. In such embodiments, the mapped endpoint may be viewed as a "dumb terminal" from the perspective of the peer-to-peer network that provides a user interface but provides no actual endpoint functionality.

Figure 30:
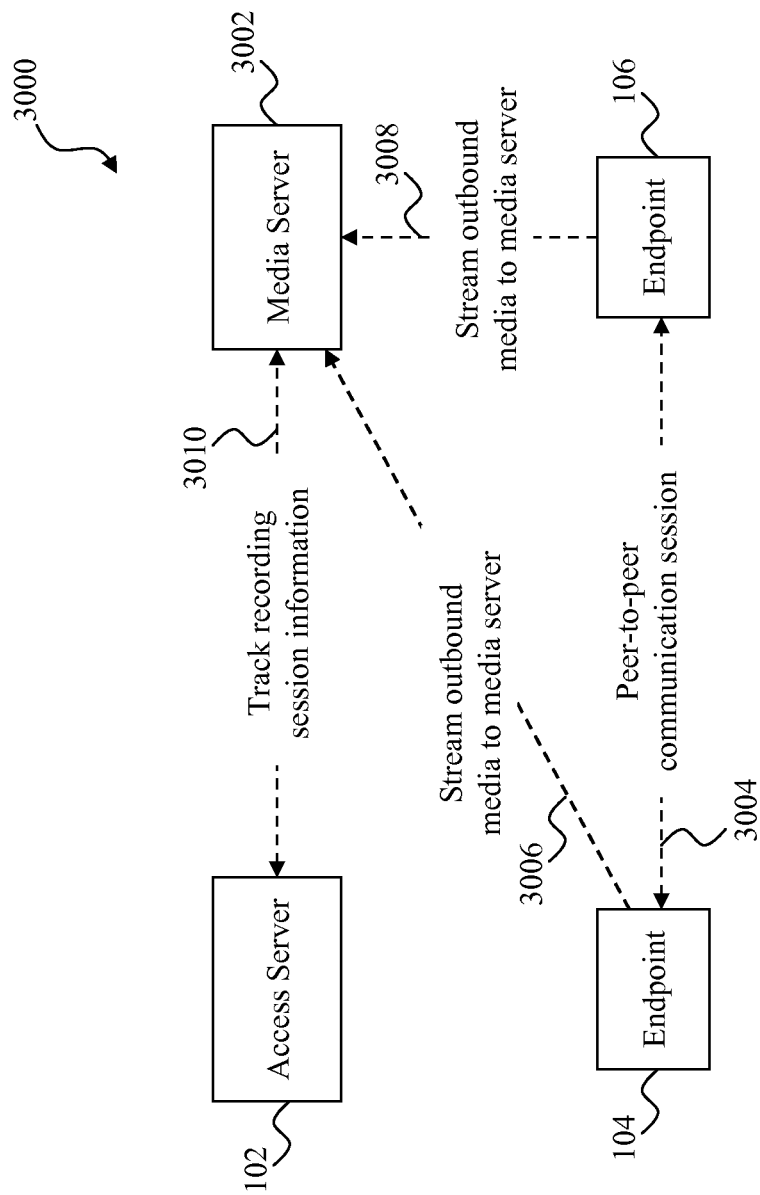
FIG. 30 is a simplified diagram of an embodiment of a peer-to-peer environment in which communications between endpoints may be recorded in real time.

Referring to FIG. 30, in another embodiment, an environment 3000 is illustrated in which communications between an endpoint 104 (e.g., the endpoint 104 of FIG. 1) and an endpoint 106 (e.g., the endpoint 106 of FIG. 1) may be recorded in real time. In the present example, the environment 3000 includes the access server 102 (FIG. 1) and a media server 3002. Although shown as separate network components in FIG. 30, it is understood that some or all of the functionality of the access server 102 and media server 3002 may be combined in a single network component or may be further distributed. Although not shown, one or more networks such as the packet network 108 (FIG. 1) may be used to transfer data between the endpoint 104, endpoint 106, access server 102, and media server 3002.

In the present embodiment, the endpoint 104 and the endpoint 106 are in a peer-to-peer communication session 3004 as is described in preceding embodiments. For purposes of example, the communication session is an audio/video session, but it is understood that a communication session as described herein may include audio only, video only, data (e.g., files such as documents and/or images), and/or any other type of information that may be communicated between the endpoints 104 and 106.

During the recording, the endpoint 104 sends (e.g., streams) all outbound media (e.g., outbound information other than signaling information) to the media server 3002 as indicated by arrow 3006 as well as sending it to the endpoint 106 as part of the communication session 3004. Similarly, the endpoint 106 sends (e.g., streams) all outbound media to the media server 3002 as indicated by arrow 3008 as well as sending it to the endpoint 104 as part of the communication session 3004. It is understood that streaming is used as an example in the present embodiment and the sending may not involve streaming in some embodiments. The access server 102 tracks the recording session information on the media server 3002 and provides management capabilities for endpoints and/or other network components to access the recording session information as indicated by arrow 3010.

Although shown as one-way arrows, it is understood that the arrows 3006 and 3008 may represent two-way communications. For example, signaling messages for setting up and controlling the recording between each endpoint 104 and 106 and the media server 3002 may involve two-way messaging in a request/acknowledgement environment. Accordingly, while the direction of the arrows 3006 and 3008 indicates the primary path for media (i.e., streaming from each endpoint 104 and 106 to the media server 3002), some messages may be sent from the media server 3002 to one or both endpoints 104 and 106. Similarly, the two-way arrows 3004 and 3010 may represent a substantially one-way flow in some embodiments with most messages going one way but at least some messages going in the opposite direction. Arrows in similar figures in the following description represent information flows in the same manner.

Figure 31:
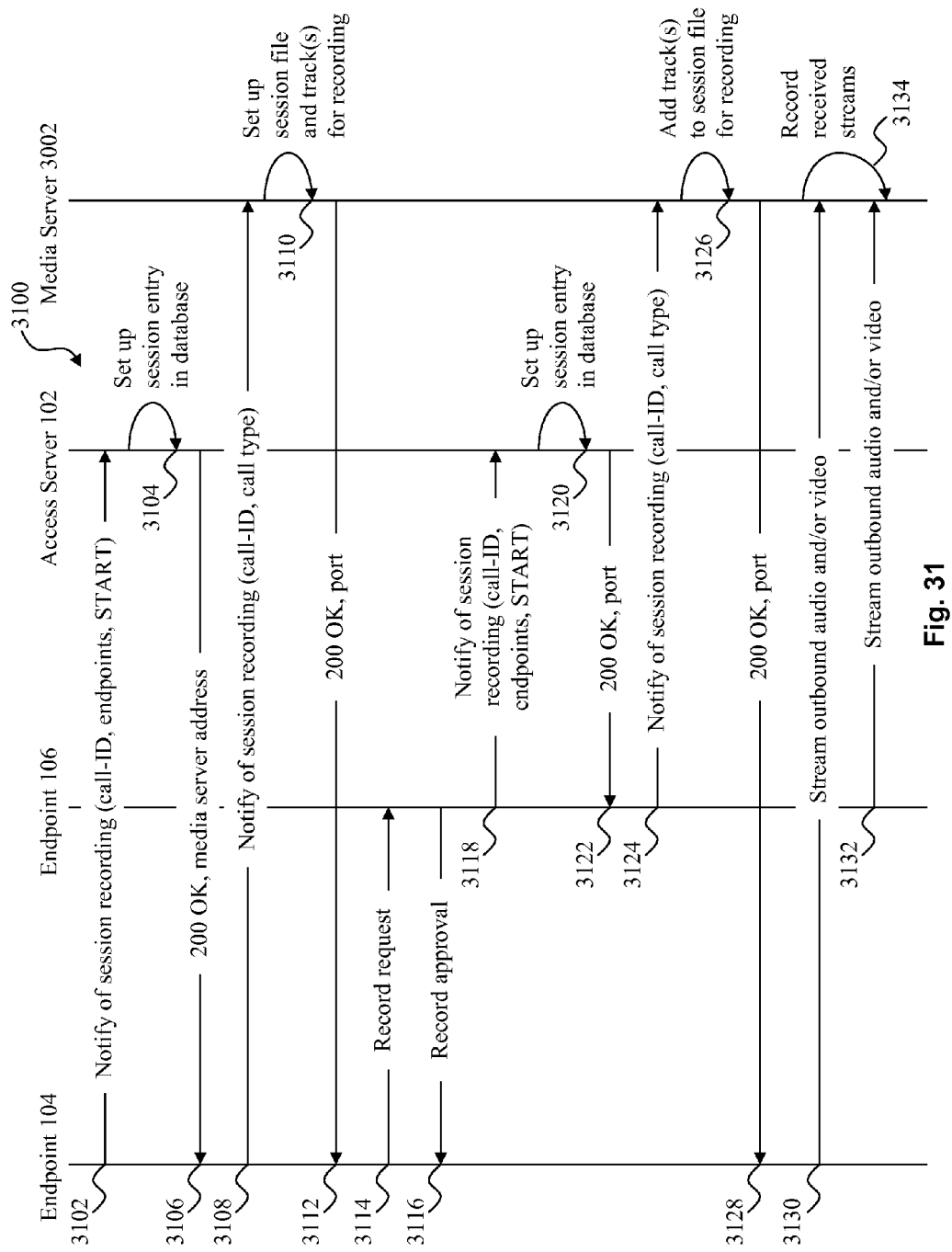
FIG. 31 is a sequence diagram illustrating one embodiment of a process that may be executed by endpoints within the environment of FIG. 30.

Referring to FIG. 31, a sequence diagram illustrates one embodiment of a message sequence 3100 that may occur in the environment of FIG. 30 to record the communication session between the endpoint 104 and the endpoint 106. In the present example, the endpoints 104 and 106 are buddies and have already approved communications as described in previous embodiments. Furthermore, the communication session 3004 between the endpoints 104 and 106 is ongoing at the beginning of the message sequence 3100.

In step 3102, the endpoint 104 notifies the access server 102 that the endpoint 104 is going to record the communication session 3004. Although not shown, the recording may be initiated by user input. For example, the user of the endpoint 104 may press a record button or otherwise notify the endpoint 104 to begin recording. Alternatively, the recording may be initiated by the endpoint 104 or by another system component upon the occurrence of a defined event. For example, the recording may be started automatically by the endpoint 104 as soon as the communication session 3004 is established.

The notification of step 3102 may include information to be used by the access server 102 in tracking the recording of the communication session 3004. In the present example, the information may include a unique key generated or otherwise known by the endpoint 104 for the communication session 3004. For example, in a SIP environment, a unique identifier named call-ID may be used when the endpoint 104 establishes the communication session with the endpoint 106. This identifier enables the endpoints 104 and 106 and other network components such as the access server 102 and media server 3002 to uniquely identify the communication session and to group communications that are related to that session. Accordingly, although call-ID is used for purposes of example, it is understood that any unique identifier may be used to identify the communication session 3004 to the access server 102. The information may also include the endpoints involved in the call (e.g., the endpoint 104 to the endpoint 106) and one or more commands such as START to indicate that recording is to begin.

In step 3104, the access server 102 sets up an entry for the endpoint 104 and the communication session 3004. As described previously, the access server 102 is not generally involved in an ongoing communication session such as the communication session 3004 except for authentication procedures and other described processes such as those needed to add and delete a buddy. Accordingly, in the present example, the access server 102 is not aware of the communication session 3004 until notified by the endpoint 104. In order to track the recording session, the access server 102 sets up the entry in the database 206 of FIG. 2a or in another memory. For example, the access server 102 may create an entry containing information such as the originating endpoint (e.g., endpoint 104) and destination endpoint(s) (e.g., the endpoint 106), the start time of the recording session (e.g., 1800 GMT on Aug. 10, 2010), and an end time of the session when applicable. The end time may be set to zero or another placeholder until the recording is ended or may be updated by the access server 102 periodically. An example entry is shown below with respect to Table 6:

TABLE 6

| Originating endpoint | Destination endpoint(s) | Call-ID | Start time | End time |
|---|---|---|---|---|
| Endpoint 104 | Endpoint 106 | 1j9GpLxk5uxtm9pr@damaka.example.com | 1800 GMT Aug. 10, 2010 | 0 |
| X | X | X | X | X |

In step 3106, the access server 102 responds to the endpoint 104. In the present example, the signaling occurs via SIP and so the access server 102 responds with a 200 OK message. In addition, the access server 102 may send other information needed by the endpoint 104 in starting the recording process, such as an IP address of the media server 3002.

In step 3108, the endpoint 104 notifies the media server 3002 that a recording session is to begin and sends information such as the call-ID and call type (e.g., audio, video, or audio/video). In step 3110, the media server 3002 sets up a session file to be used to store media information received for the communication session 3004 from the endpoint 104. In the present example, the media server 3002 creates one or more tracks for the endpoint 104 in the file. For example, the media server 3002 may create an audio track and a video track for storing audio information and video information, respectively. An example is illustrated in Table 7 below:

TABLE 7

| Call-ID | Tracks | | Start time | End time |
|---|---|---|---|---|
| 1j9GpLxk5uxtm9pr@damaka.example.com | Track #0 (audio for endpoint 104) | Track #1 (video for endpoint 104) | 1800 GMT Aug. 10, 2010 | 0 |
| X | X | X | X | X |

In step 3112, the media server 3002 sends the endpoint 104 a 200 OK message (or another message if the environment is not a SIP environment) and a port on the media server 3002 to be used by the endpoint 104 for the streaming media.

In step 3114, the endpoint 104 sends a recording request to the endpoint 106. The present example provides for consultation, which allows the endpoint 106 to reject or accept the recording. For example, a notification may be provided to a user of the endpoint 106 that the endpoint 104 is requesting to record the communication session and the user of the endpoint 106 may then press a button to accept or reject the request. Although not shown, if the endpoint 106 rejects the recording, the endpoint 104 may notify the access server 102 and media server 3002 that the recording is not needed, and the access server 102 and media server 3002 may then remove any entries and release any resources that have been reserved for recording the communication session 3004. However, as the endpoint 106 accepts the recording request in the present example, the endpoint 106 sends a response to the endpoint 104 indicating acceptance.

In a non-consultation environment, step 3116 may be omitted because the endpoint 106 would not be allowed to deny the recording request. For example, the request of 3114 may still occur but the user of the endpoint 106 may not be informed of the recording or may be informed but not provided with an option to accept or reject it. In some embodiments in a non-consultation environment, step 3116 may occur but may be a 200 OK or other acknowledgement message rather than an acceptance.

In step 3118, the endpoint 106 notifies the access server 102 that the endpoint 106 is going to record the communication session 3004. The notification of step 3118 may include information to be used by the access server 102 such as the unique identifier (e.g., the call-ID) of the communication session 3004, the endpoints involved in the call (e.g., endpoint 106 to endpoint 104), and one or more commands such as START to indicate that recording is to begin.

In step 3120, the access server 102 sets up an entry for the endpoint 106 and the communication session 3004 in the database 206 or in another memory. As with the entry of step 3104 for the endpoint 104, the access server 102 may create an entry for the endpoint 106 containing information such as the originating endpoint (e.g., endpoint 106) and destination endpoint(s) (e.g., the endpoint 104), the start time of the recording session (e.g., 1800 GMT on Aug. 10, 2010), and an end time of the session when applicable. In other embodiments, the access server 102 may update the entry of the endpoint 104 with the information regarding the endpoint 106. An example entry is shown below with respect to Table 8:

TABLE 8

| Originating endpoint | Destination endpoint(s) | Call-ID | Start time | End time |
|---|---|---|---|---|
| Endpoint 104 | Endpoint 106 | 1j9GpLxk5uxtm9pr@damaka.example.com | 1800 GMT Aug. 10, 2010 | 0 |
| Endpoint 106 | Endpoint 104 | 1j9GpLxk5uxtm9pr@damaka.example.com | 1800 GMT Aug. 10, 2010 | 0 |
| X | X | X | X | X |

In step 3122, the access server 102 responds to the endpoint 106. In the present example, the signaling occurs via SIP and so the access server 102 responds with a 200 OK message. In addition, the access server 102 may send other information needed by the endpoint 106 in starting the recording process, such as an IP address of the media server 3002.

In step 3124, the endpoint 106 notifies the media server 3002 that a recording session is to begin and sends information such as the call-ID and call type (e.g., audio, video, or audio/video). In step 3126, in the present example, the media server 3002 checks the call-ID, identifies that a recording session already exists with that call-ID, and adds one or more additional tracks for the endpoint 106 to the session file created in step 3110. For example, the media server 3002 may create an audio track and a video track for storing audio information and video information, respectively. An example is illustrated in Table 9 below:

TABLE 9

| Call-ID | Tracks | | | | Start time | End time |
|---|---|---|---|---|---|---|
| 1j9GpLxk5uxtm9pr@damaka.example.com | Track #0 (audio for endpoint 104) | Track #1 (video for endpoint 104) | Track #2 (audio for endpoint 106) | Track #3 (video for endpoint 106) | 1800 GMT Aug. 10, 2010 | 0 |
| X | | X | | | X | X |

In other embodiments, the media server 3002 may create a new session file for the endpoint 106 that is separate from the session file created for the endpoint 104. It is understood that the recording may be stored in many different ways and the use of a single session file with multiple tracks is provided for purposes of illustration. In step 3128, the media server 3002 sends the endpoint 106 a 200 OK message (or another message if the environment is not a SIP environment) and a port on the media server 3002 to be used by the endpoint 106 for the streaming media.

In steps 3130 and 3132, the endpoints 104 and 106, respectively, stream media to the media server 3002 for recording while continuing their ongoing communication session 3004. In the present example, outbound media from each endpoint 104 and 106 is sent to the media server 3002 and stored in the appropriate track. As indicated by arrow 3134, the media server 3002 records the received media.

Accordingly, each endpoint 104 and 106 streams live audio and/or video or other media to the media server 3002 for recording. As each endpoint 104 and 106 streams only its own outbound traffic in the present example, the network load on any given endpoint is reduced. However, as described below, some embodiments may involve a single endpoint streaming both inbound and outbound traffic.

Figure 32:
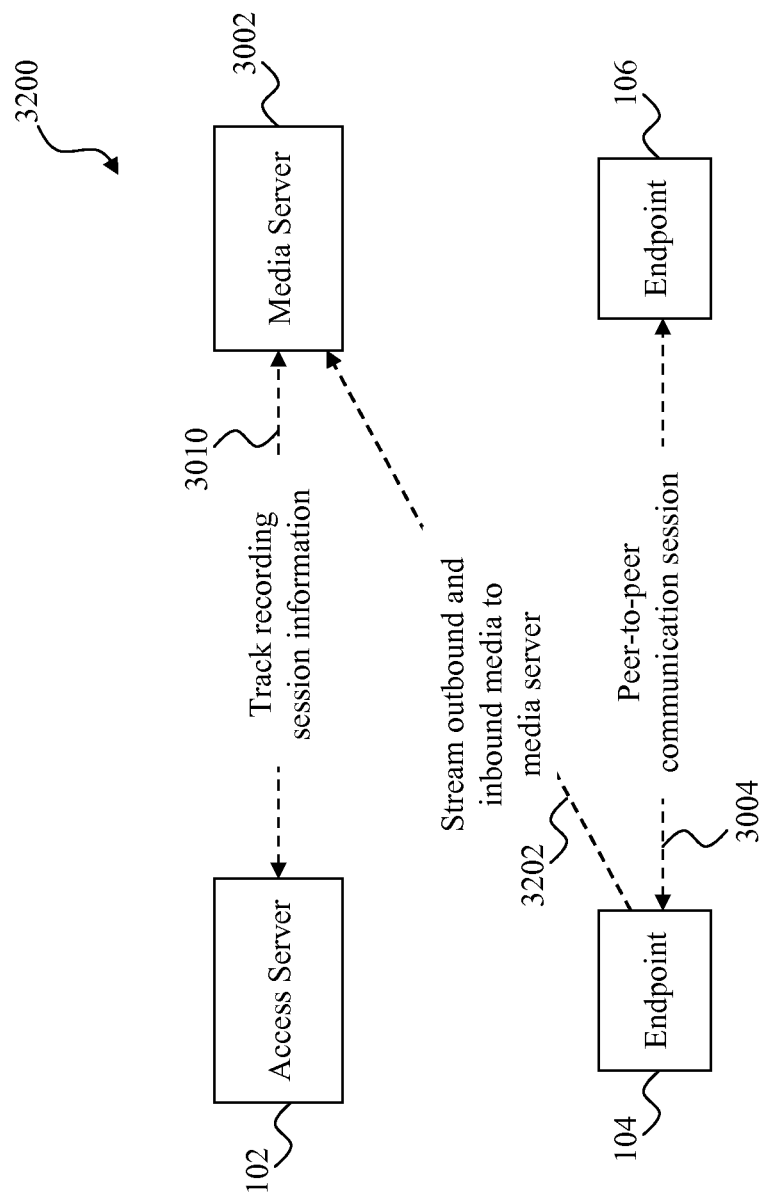
FIG. 32 is a simplified diagram of another embodiment of a peer-to-peer environment in which communications between endpoints may be recorded in real time.

Referring to FIG. 32, in another embodiment, an environment 3200 is illustrated in which communications between the endpoint 104 and endpoint 106 of FIG. 30 may be recorded in real time. In the present example, the environment 3000 includes the access server 102 and the media server 3002 of FIG. 30. In the present embodiment, the endpoint 104 and the endpoint 106 are in the peer-to-peer communication session 3004 as is described with respect to FIG. 30. However, rather than each endpoint 104 and 106 streaming its outbound media to the media server 3002, the endpoint 104 sends (e.g., streams) both inbound and outbound media to the media server 3002 as illustrated by arrow 3202. The endpoint 106 does not communicate with the media server 3002 as all recording input to the media server 3002 is provided by the endpoint 104.

In some embodiments, although not shown, it is understood that the endpoint 104 may instruct the endpoint 106 to record both inbound and outbound media. For example, the endpoint 106 may have greater bandwidth than the endpoint 104 and so may be more capable of sending the media that is to be recorded. In such embodiments, the arrow 3202 would extend from the endpoint 106 to the media server 3002 and there would be no arrow from the endpoint 104 to the media server 3002.

Figure 33:
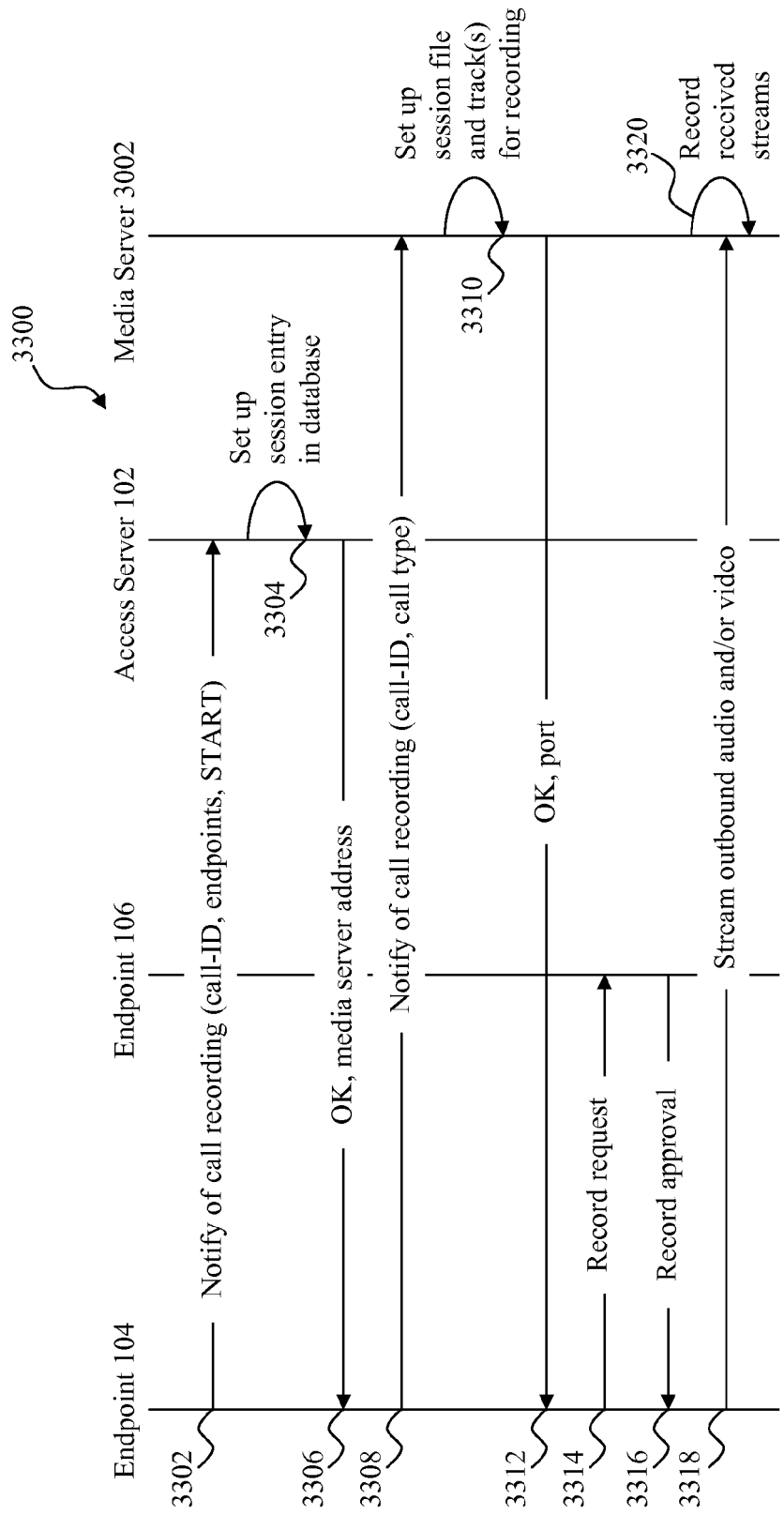
FIG. 33 is a sequence diagram illustrating one embodiment of a process that may be executed by endpoints within the environment of FIG. 32.

Referring to FIG. 33, a sequence diagram illustrates one embodiment of a message sequence 3300 that may occur in the environment of FIG. 32. In the present example, the endpoints 104 and 106 are buddies and have already approved communications as described in previous embodiments. Furthermore, the communication session 3004 between the endpoints 104 and 106 is ongoing at the beginning of the message sequence 3300.

In step 3302, the endpoint 104 notifies the access server 102 that the endpoint 104 is going to record the communication session 3004. The notification of step 3302 may include information to be used by the access server 102 in tracking the recording of the communication session 3004. Such information may include a unique key generated or otherwise known by the endpoint 104 for the communication session 3004 (e.g., the previously described call-ID), the endpoints involved in the call (e.g., endpoint 104 to endpoint 106), and one or more commands such as START to indicate that recording is to begin.

In step 3304, the access server 102 sets up an entry for the endpoint 104 and the communication session 3004. In order to track the recording session, the access server 102 sets up the entry in the database 206 of FIG. 2a or in another memory. For example, the access server 102 may create an entry containing information such as the originating endpoint (e.g., endpoint 104) and destination endpoint(s) (e.g., the endpoint 106), the start time of the recording session (e.g., 1800 GMT on Aug. 10, 2010), and an end time of the session when applicable. The end time may be set to zero or another placeholder until the recording is ended or may be updated by the access server 102 periodically. An example entry is shown below with respect to Table 10:

TABLE 10

| Originating endpoint | Destination endpoint(s) | Call-ID | Start time | End time |
|---|---|---|---|---|
| Endpoint 104 | Endpoint 106 | 1j9GpLxk5uxtm9pr@damaka.example.com | 1800 GMT Aug. 10, 2010 | 0 |
| X | X | X | X | X |

In step 3306, the access server 102 responds to the endpoint 104. In the present example, the signaling occurs via SIP and so the access server 102 responds with a 200 OK message. In addition, the access server 102 may send other information needed by the endpoint 104 in starting the recording process, such as an IP address of the media server 3002.

In step 3308, the endpoint 104 notifies the media server 3002 that a recording session is to begin and sends information such as the call-ID and call type (e.g., audio, video, or audio/video). In step 3310, the media server 3002 sets up a session file to be used to store media information received for the communication session 3004 from the endpoint 104. In the present example, the media server 3002 creates one or more tracks for the endpoint 104 in the file. For example, the media server 3002 may create an audio track and a video track for storing audio information and video information, respectively. Because the endpoint 104 is streaming both inbound and outbound traffic to the media server 3002 in the present example, the media server 3002 may also create tracks at this time for audio and/or video received at the endpoint 104 from the endpoint 106. An example is illustrated in Table 11 below:

TABLE 11

| Call-ID | Tracks | | | | Start time | End time |
|---|---|---|---|---|---|---|
| 1j9GpLxk5uxtm9pr@damaka.example.com | Track #0 (audio for endpoint 104) | Track #1 (video for endpoint 104) | Track #2 (audio for endpoint 106) | Track #3 (video for endpoint 106) | 1800 GMT Aug. 10, 2010 | 0 |
| X | | X | | | X | X |

In some embodiments, a single audio track may be recorded for both incoming and outgoing audio from the perspective of the endpoint 104. However, it may be preferable to maintain separate audio tracks as shown in Table 11. In step 3312, the media server 3002 sends the endpoint 104 a 200 OK message (or another message if the environment is not a SIP environment) and a port on the media server 3002 to be used by the endpoint 104 for the streaming media.

In step 3314, the endpoint 104 sends a recording request to the endpoint 106 and, in step 3316, the endpoint 106 responds to the request with an acceptance. As consultation and non-consultation processes are described with respect to steps 3114 and 3116 of FIG. 31, these steps are not described in detail in the present example.

In step 3318, the endpoint 104 streams both inbound and outbound media to the media server 3002 for recording while continuing the ongoing communication session 3004 with the endpoint 106. As indicated by arrow 3320, the media server 3002 records the received media.

Because the endpoint 106 does not stream media to the media server 3002 in the present example, there is no communication between the endpoint 106 and the media server 3002. Furthermore, there may or may not be communication between the endpoint 106 and the access server 102. For example, in the present embodiment, the endpoint 106 does not contact the access server 102 as is done in step 3118 of FIG. 31. Accordingly, the access server 102 does not set up a separate entry for the endpoint 106. However, in some embodiments of FIG. 33, the endpoint 106 may perform step 3118 of FIG. 31 and notify the access server 102 of the recording session. In such embodiments, the access server 102 would then set up the session entry as illustrated in step 3120 of FIG. 31 and Table 10 would be updated to include the data of Table 8 representing the entry for the endpoint 106. The access server 102 may then respond to the endpoint 106 with a 200 OK or other acknowledgement. The access server 102 may not send the media server 3002 IP address information to the endpoint 106 in such embodiments, or the access server 102 may send the IP address information and the endpoint 106 may ignore it since the endpoint 106 does not need to stream media to the media server 3002.

Figure 34:
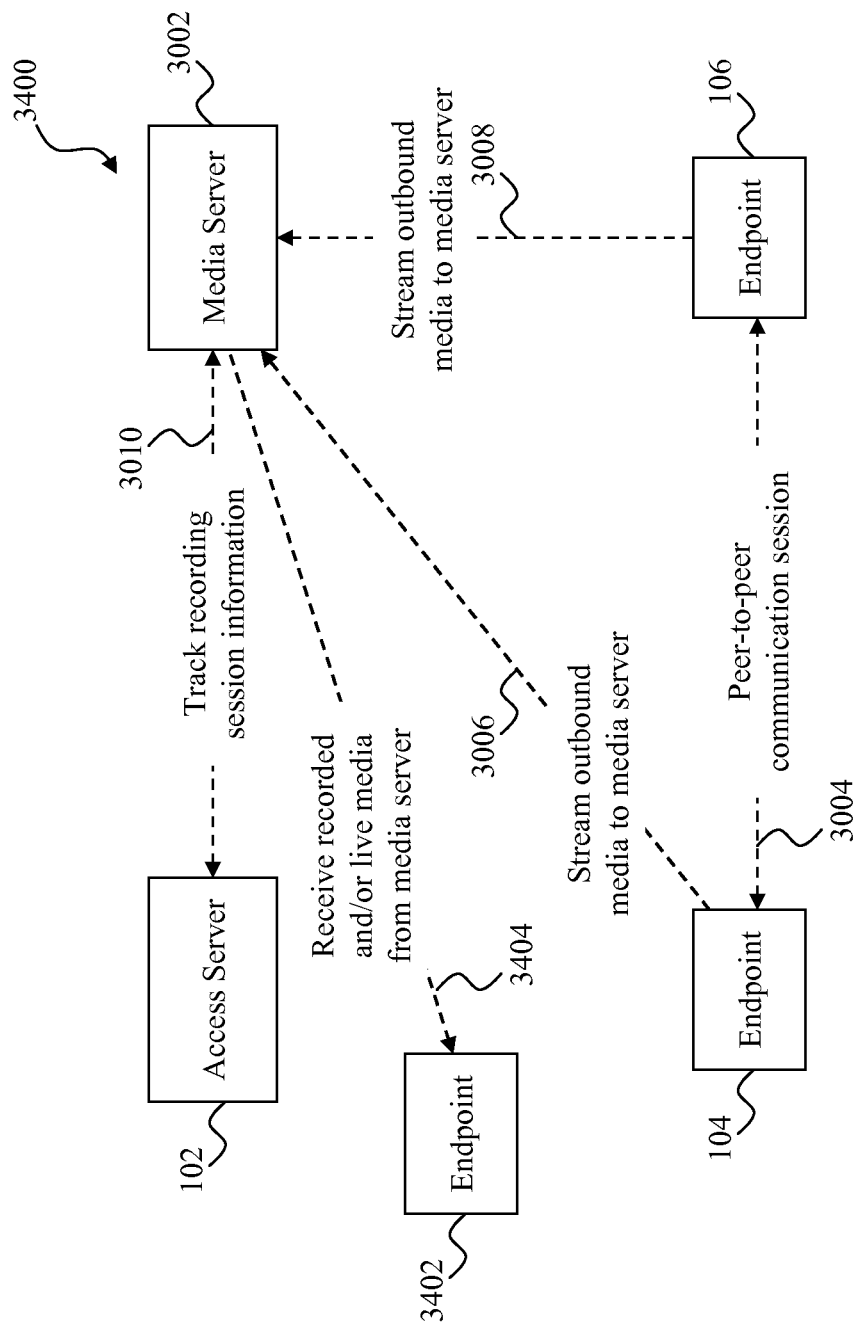
FIG. 34 is a simplified diagram of an embodiment of a peer-to-peer environment in which an endpoint may access an ongoing communication session occurring between other endpoints via a media server in real time.

Referring to FIG. 34, in another embodiment, an environment 3400 is illustrated in which an endpoint 3402 may access communications between the endpoint 104 and endpoint 106 of FIG. 30 via the media server 3002 either as a recording or in real time as illustrated by an arrow 3404. In the present example, the endpoint 3402 obtains information from the access server 102 regarding the communication session 3004 and then uses that information to receive the media from the media server 3002. Although the embodiment illustrated in FIG. 34 and the embodiments following FIG. 34 show the endpoints 104 and 106 as separately streaming their outbound media to the media server 3002, it is understood that a single endpoint 104 or 106 may stream both inbound and outbound media as described with respect to FIG. 32.

Figure 35:
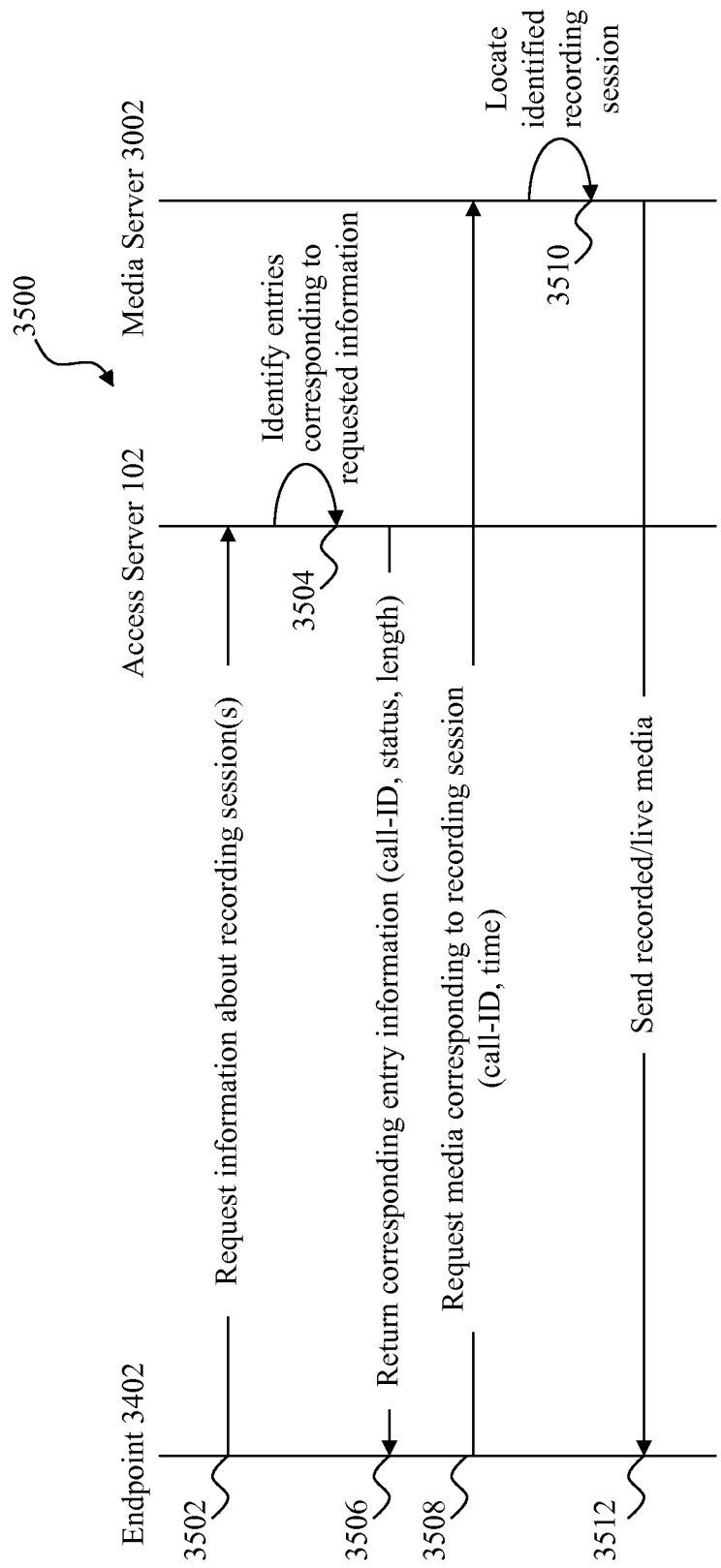
FIG. 35 is a sequence diagram illustrating one embodiment of a process that may be executed by endpoints within the environment of FIG. 34.

Referring to FIG. 35, a sequence diagram illustrates one embodiment of a message sequence 3500 that may occur in the environment of FIG. 34. The endpoint 3402 may or may not be a buddy of either of the endpoints 104 and 106. The communication session 3004 between the endpoints 104 and 106 is ongoing at the beginning of the message sequence 3500 and being recorded by the media server 3002 as streamed from each endpoint 104 and 106.

In step 3502, the endpoint 3402 sends a request for information to the access server 102. The request for information may include one or more criteria. For example, the request may be for all recording session information for a particular endpoint, such as the endpoint 104. Another example request may be for all recording session information between particular endpoints (e.g., all recording sessions involving the endpoint 104 and 106). Yet another example request may be for all recording sessions. Other criteria may also be specified, such as particular dates/times, other endpoints involved in the recording session, whether the recording session is currently ongoing, etc.

In step 3504, the access server 102 identifies entries corresponding to the requested information by accessing the database 206 or other memory and retrieving the session entries corresponding to the request. For example, if the requested information is for all recording sessions in which the endpoint 104 was involved on Aug. 10, 2010, the access server 102 would identify the call-ID 1j9 GpLxk5uxtm9pr@damaka.example.com of Table 6 and retrieve the needed information from that entry. In some embodiments, the call-ID may be sufficient, while in other embodiments the access server 102 may retrieve additional information such as the length of the recording session (or start time to present if still ongoing) and the status (e.g., finished or still ongoing). If the endpoint 104 was involved in other recorded communication sessions on Aug. 10, 2010, then the access server 102 would also retrieve the information for those entries. Although not shown, it is understood that the access server 102 may also ensure that the endpoint 3402 is authorized to access the requested information.

In step 3506, the access server 102 sends the corresponding entry information to the endpoint 3402. In the present example, the information includes the call-ID 1j9 GpLxk5uxtm9pr@damaka.example.com, the status (ongoing), and the current length of the call (e.g., fifteen minutes). The current length may also be sent as the start time, with the end time being 0 or some other identifier that indicates the call is still ongoing.

In step 3508, the endpoint 3402 requests media corresponding to the recording session(s) from the media server 3002. The request may vary based on whether the recorded session has ended or is still ongoing. For example, if the request is for a recording session that is not ongoing, the request may specify a particular start time in the recording (e.g., at the beginning, some particular time into the recording, or when a certain endpoint joined the recording if such information is stored). However, if the request is for a recording session that is ongoing, the request may be for the media server 3002 to start from a specific time or to send the most current media to the endpoint 3402. Alternatively, the request may simply be for the most current information corresponding to the recording session and the media server 3002 may handle the request appropriately by sending either recorded media or by streaming current media to the endpoint 3402. The request may also specify other information, such as audio only if both audio and video are available.

In step 3510, the media server 3002 locates the identified recording session(s) and sends them to the endpoint 3402 in step 3512. If the request is for current media corresponding to the recording session for the communication session 3004, the media server 3002 streams the received media to the endpoint 3402 in addition to recording it. If the request is for recorded media from an earlier time, the media server 3002 locates the media and begins playback at the identified time. In some embodiments, the media server 3002 may send the media to the endpoint 3402 with a delay. For example, the media server 3002 may perform processing on some or all of the tracks before sending it to the endpoint 3402.

In the present example, to provide the recorded media to the endpoint 3402, the media server 3002 identifies the call-ID and any tracks corresponding to that call-ID. For purposes of simplicity, the endpoint 3402 has requested only the audio portion of the recording session. The media server 3002 retrieves the two audio tracks #0 and #2 (Table 9) and merges them before sending them to the endpoint 3402. The merging creates a single audio stream or file that includes both tracks.

In some embodiments, the media server 3002 may provide processing of the media prior to sending it to the endpoint 3402. In the present embodiment, the media server 3002 stores the received streams in the same format in which each stream is received. For example, the stream from the endpoint 104 to the media server 3002 (e.g., the stream represented by arrow 3006) may be encoded using an audio codec such as the G.729 audio codec and the stream from the endpoint 104 to the media server 3002 (e.g., the stream represented by arrow 3008) may be encoded using another audio codec such as the G.711 audio codec. The media server 3002 will store each stream as received in G.729 or G.711. If the audio tracks are not compatible and cannot be merged when a request is received, the media server 3002 may convert one or both tracks prior to the merge.

The endpoint 3402 may request that the media sent to it from the media server 3002 is in a different codec such as the Adaptive Multi-Rate (AMR) codec. Accordingly, the media server 3002 may convert the audio tracks into AMR (if they are not already in AMR) before sending them to the endpoint 3402. The conversion may occur before or after the tracks are merged. In other embodiments, the media server 3402 may send the tracks in their stored format(s) and let the endpoint 3402 perform the conversion.

Figure 36:
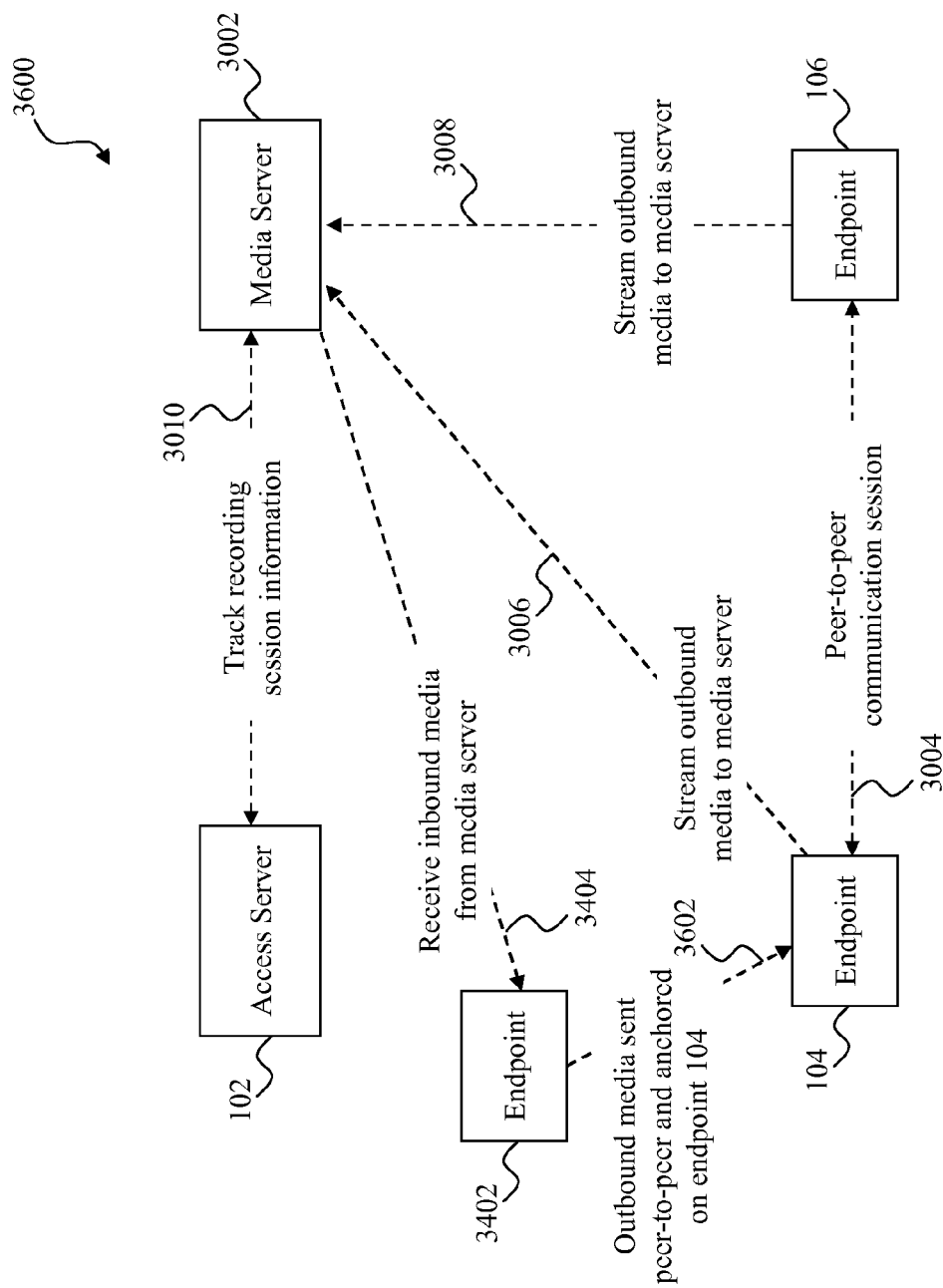
FIG. 36 is a simplified diagram of an embodiment of a peer-to-peer environment in which the endpoint of FIG. 34 may join the ongoing communication session in real time.

Referring to FIG. 36, in another embodiment, an environment 3600 is illustrated in which the endpoint 3402 (FIG. 34) may send media (e.g., audio) to the endpoint 104 as indicated by an arrow 3602 as well as access communications between the endpoint 104 and endpoint 106 of FIG. 30 via the media server 3002. Using the legs 3404 and 3602, the endpoint 3402 may participate in the communication session 3004 in a two-way manner as it can both receive media via leg 3404 and send media via leg 3602. As with FIG. 34, in the present example, the endpoint 3402 obtains information from the access server 102 regarding the communication session 3004 and then uses that information to receive the media from the media server 3002. In some embodiments, the endpoint 3402 may add itself to the communication session 3004 and 106 (FIG. 37A), and in other embodiments the endpoint 3402 may request permission or may be invited by one or both of the endpoints 104 and 106 (FIG. 37B).

Figure 37A:
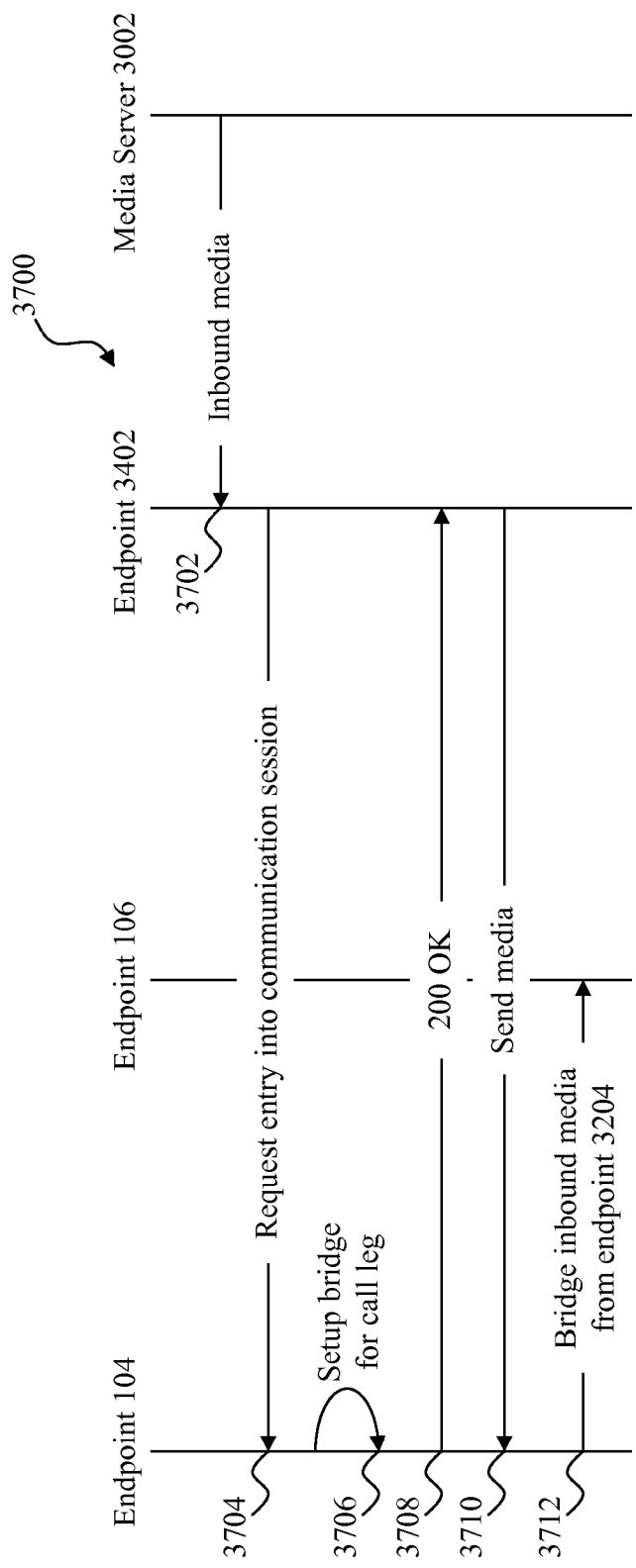
FIG. 37A is a sequence diagram illustrating one embodiment of a process that may be executed by endpoints within the environment of FIG. 36 when the endpoint invites itself into the ongoing communication session.
Figure 37B:
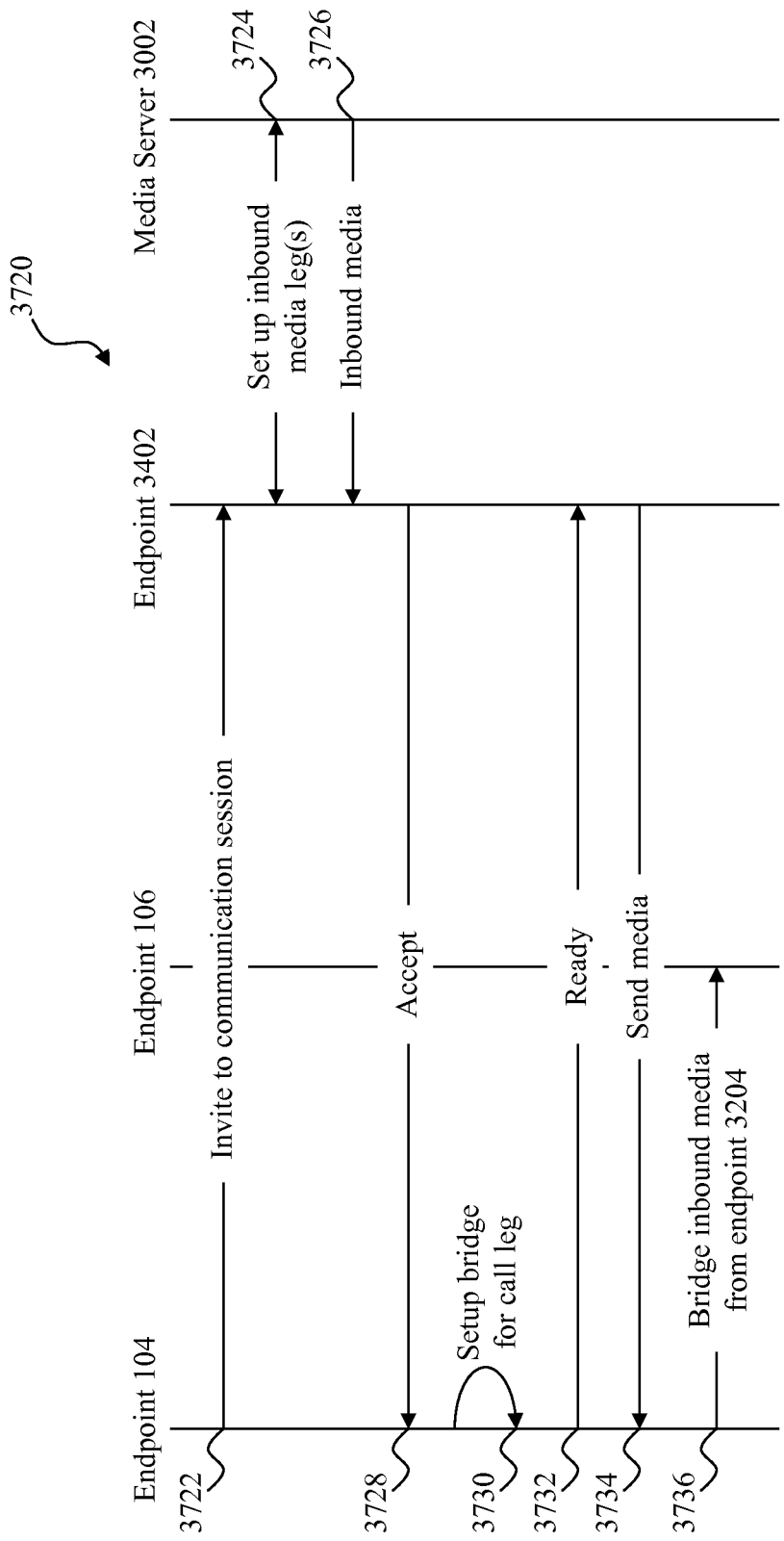
FIG. 37B is a sequence diagram illustrating one embodiment of a process that may be executed by endpoints within the environment of FIG. 36 when the endpoint is invited into the ongoing communication session.

Referring to FIG. 37A, a sequence diagram illustrates one embodiment of a message sequence 3700 that may occur in the environment of FIG. 36 in which the endpoint 3402 invites itself to the communication session 3004. For example, in an enterprise environment, the endpoint 3402 may be on a master buddy list that all endpoints must accept as buddies. In such an environment, the endpoints 104 and/or 106 may not have specifically chosen the endpoint 3402 as a buddy, but may recognize the endpoint 3402 as a buddy due to its presence on the master buddy list. In other environments, one or both of the endpoints 104 and 106 may have added the endpoint 3402 as a buddy using an invite/response process as described with respect to previous embodiments such as FIG. 7. The communication session 3004 between the endpoints 104 and 106 is ongoing at the beginning of the message sequence 3700 and being recorded by the media server 3002 as streamed from each endpoint 104 and 106.

In the present example, although not shown, the endpoint 3402 may begin receiving media corresponding to the communication session 3004 as described with respect to FIG. 35. Accordingly, inbound media is received as indicated by arrow 3404 of FIG. 36. Although illustrated as step 3702 in FIG. 37A, it is understood that the steps 3502-3512 of FIG. 35 may occur before, during, or after the steps of the message sequence 3700 of the present embodiment.

In step 3704, the endpoint 3402 sends a message to the endpoint 104 requesting that the endpoint 104 add the endpoint 3402 to the communication session. In some embodiments, the endpoint 104 may not be able to refuse the request. For example, if the endpoint 3402 corresponds to a security officer or to another individual identified as having access rights, the endpoint 104 may automatically accept the request. In other embodiments, the endpoint 104 may present an option to its user to accept or reject the request. In the present example, in step 3708, the endpoint 104 responds by sending a 200 OK to the endpoint 3402.

In step 3706, the endpoint 104 sets up a bridge to send the media received from the endpoint 3402 to the endpoint 106 as described previously and illustrated with respect to FIG. 2g. Accordingly, the endpoint 104 anchors the leg 3602 in order for the endpoint 3402 to be able to send media into the communication session 3004 without connecting directly with the endpoint 106. However, because the direct connection between the endpoint 104 and the endpoint 3402 only carries one-way media from the endpoint 3402 to the endpoint 104, the bridge may simply serve to stream or otherwise forward the incoming media to the endpoint 106.

In step 3708, the endpoint 104 sends an acknowledgement message such as a 200 OK to the endpoint 3402. In step 3710, the endpoint 3402 may begin sending media to the endpoint 104 and, in step 3712, the endpoint 104 sends the received media to the endpoint 106.

It is understood that, in some embodiments, media received by the endpoint 3402 may not be sent to the endpoint 106. For example, the user of the endpoint 3402 may wish to privately speak to the user of the endpoint 104. In such cases, the request of step 3704 may specify that the endpoint 3402 wants to send audio only to the endpoint 104. Accordingly, step 3706 may setup the call leg 3602 but not a bridge, and step 3712 would not occur since no audio would be forwarded. In some such embodiments, the presence of the endpoint 3402 may be visible to the endpoint 106, while in other embodiments the endpoint 106 may be unaware of the presence of the endpoint 3402.

Referring to FIG. 37B, a sequence diagram illustrates one embodiment of a message sequence 3720 that may occur in the environment of FIG. 36 in which the endpoint 104 invites the endpoint 3402 to the communication session 3004. For example, in an enterprise environment, the endpoint 3402 may be on a master buddy list that all endpoints must accept as buddies. In such an environment, the endpoints 104 and/or 106 may not have specifically chosen the endpoint 3402 as a buddy, but may recognize the endpoint 3402 as a buddy due to its presence on the master buddy list. In other environments, one or both of the endpoints 104 and 106 may have added the endpoint 3402 as a buddy using an invite/response process as described with respect to previous embodiments such as FIG. 7. The communication session 3004 between the endpoints 104 and 106 is ongoing at the beginning of the message sequence 3720 and being recorded by the media server 3002 as streamed from each endpoint 104 and 106.

In step 3722, the endpoint 104 sends an invitation to the endpoint 3402 to join the communication session 3004. The invitation may include such information as the call-ID, the endpoints involved in the communication session, and/or other information. In the present example, this invitation invites the endpoint 3402 into the ongoing communication session 3004 in real-time, although it is understood that some buffering or other delays may occur.

The endpoint 104 may be aware of the presence of the endpoint 3402 in various ways. For example, one or both endpoints 104 and 106 may view a list of all participants in the communication session 3004. The list may be obtained by requesting it from the access server 102 or from another source. Accordingly, if the endpoint 3402 is listening to the communication session 3004 via the media server 3002, this may be visible to the endpoint 104 and/or endpoint 106. The endpoint 104 may then invite the endpoint 3402 to join the communication session. If the endpoint 3402 is not a buddy, the endpoint 104 may establish a regular buddy relationship or a temporary buddy relationship (e.g., only for the purpose of joining the communication session 3004 corresponding to the invite) with the endpoint 3402. Alternatively, the endpoint 104 may select the endpoint 3402 from its buddy list if the endpoint 3402 is available.

In step 3724, the endpoint 3402 (assuming the endpoint 3402 is going to accept the invitation), may contact the media server 3002 to begin receiving the media sent to the media server 3002 by the endpoints 104 and 106. This may occur, for example, as described with respect to FIG. 35, although the endpoint 3402 may not need to contact the access server 102 because the endpoint 3402 may receive the information needed to access the recording session directly from the endpoint 104 in step 3722 (e.g., the endpoint 3402 may begin the message sequence 3500 at step 3508). In the present example, the endpoint 3402 may inform the media server 3002 that the endpoint 3402 wants the media in real-time. The media server 3002 then sends the next packets it receives that correspond to the recording session identified by the call-ID to the endpoint 3402. Accordingly, in step 3726, inbound media is received by the endpoint 3402 from the media server 3002.

In step 3728, the endpoint 3402 sends an acceptance message to the endpoint 104 indicating that the endpoint 3402 accepts the invitation to join the call. In some embodiments, the endpoint 104 may then send the call information (e.g., the call-ID) to the endpoint 3402 if it did not do so in step 3722.

In step 3730, the endpoint 104 sets up a bridge to send the media received from the endpoint 3402 to the endpoint 106 as described previously. However, because the direct connection between the endpoint 104 and the endpoint 3402 only carries one-way media from the endpoint 3402 to the endpoint 104, the bridge may simply serve to stream or otherwise forward the incoming media to the endpoint 106. In step 3732, the endpoint 104 sends a ready message to the endpoint 3402 to indicate that the endpoint 3402 can start sending media to the endpoint 104. In other embodiments, the endpoint 3402 may already be sending media to the endpoint 104 and the endpoint 104 may ignore the media until the bridge is established. In step 3734, the endpoint 3402 may begin sending media to the endpoint 104 and, in step 3736, the endpoint 104 sends the received media to the endpoint 106.

It is understood that, in some embodiments, media received by the endpoint 3402 may not be sent to the endpoint 106. For example, the invitation may be for the user of the endpoint 104 to privately speak to the user of the endpoint 3402. In such cases, the request of step 3722 may indicate the nature of the request. Accordingly, step 3730 may setup the call leg but not a bridge, and step 3736 would not occur since no audio would be forwarded. In some such embodiments, the presence of the endpoint 3402 may be visible to the endpoint 106, while in other embodiments the endpoint 106 may be unaware of the presence of the endpoint 3402.

Figure 38:
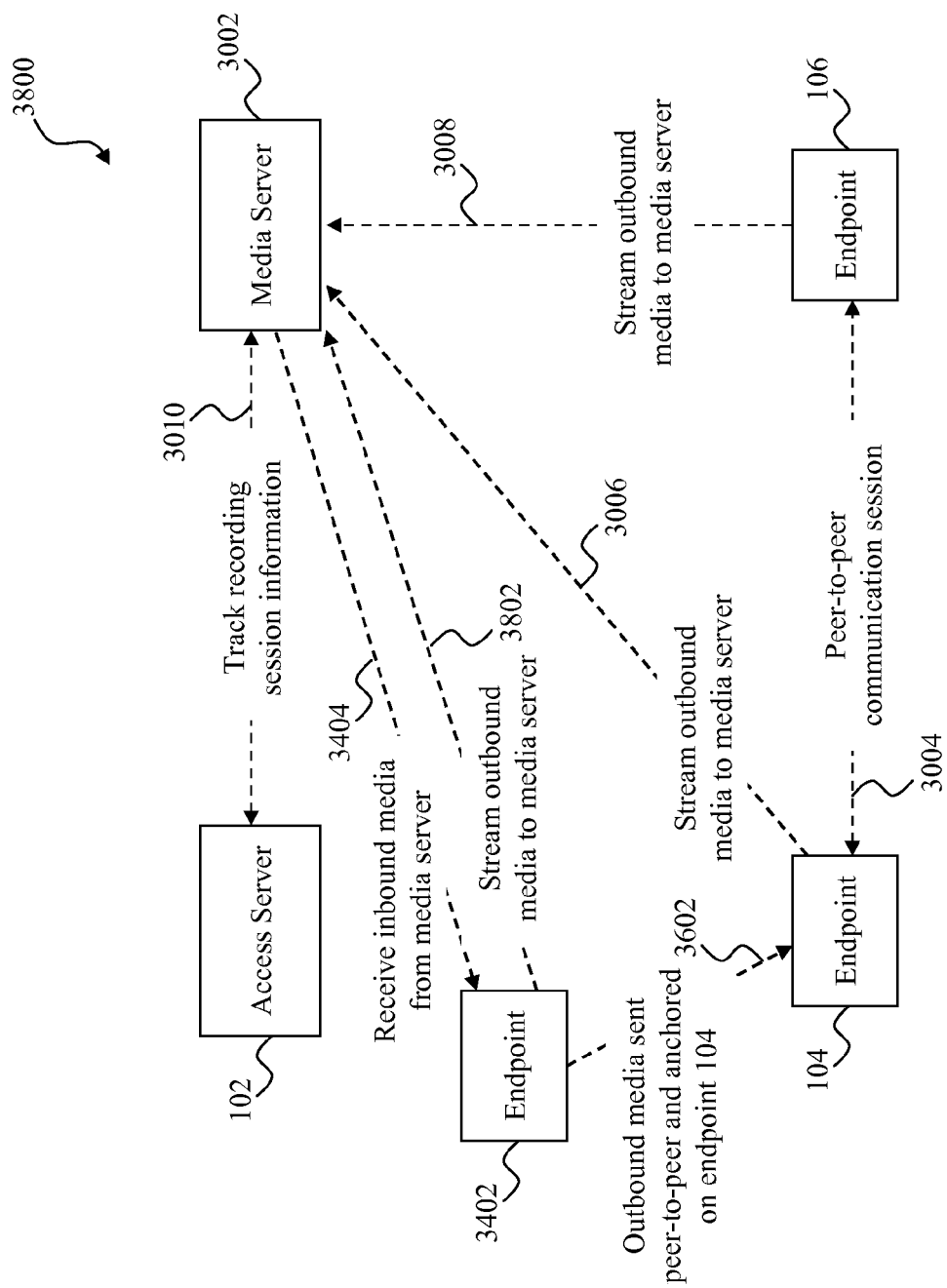
FIG. 38 is a simplified diagram of an embodiment of a peer-to-peer environment in which the communications of the endpoint of FIG. 34 may be recorded in real time.

Referring to FIG. 38, in another embodiment, an environment 3800 is illustrated in which the endpoint 3402 (FIG. 34) may send media (e.g., audio) to the endpoint 104 as indicated by an arrow 3602, send media to the media server 3002 for recording as indicated by an arrow 3802, and access communications between the endpoint 104 and endpoint 106 via the media server 3002. Using the legs 3404 and 3602, the endpoint 3402 may participate in the communication session 3004 in a two-way manner as described previously with respect to FIG. 36 as it can both receive media via leg 3404 and send media via leg 3602. As with FIG. 34, in the present example, the endpoint 3402 obtains information from the access server 102 regarding the communication session 3004 and then uses that information to receive the media from the media server 3002. In addition, the endpoint 3402 sends its outbound media to the media server 3002 to be recorded. In some embodiments, the endpoint 3402 may invite itself to the communication session 3004 as described previously with respect to FIG. 37A, and in other embodiments the endpoint 3402 may be invited by one or both of the endpoints 104 and 106 as described previously with respect to FIG. 37B.

Figure 39:
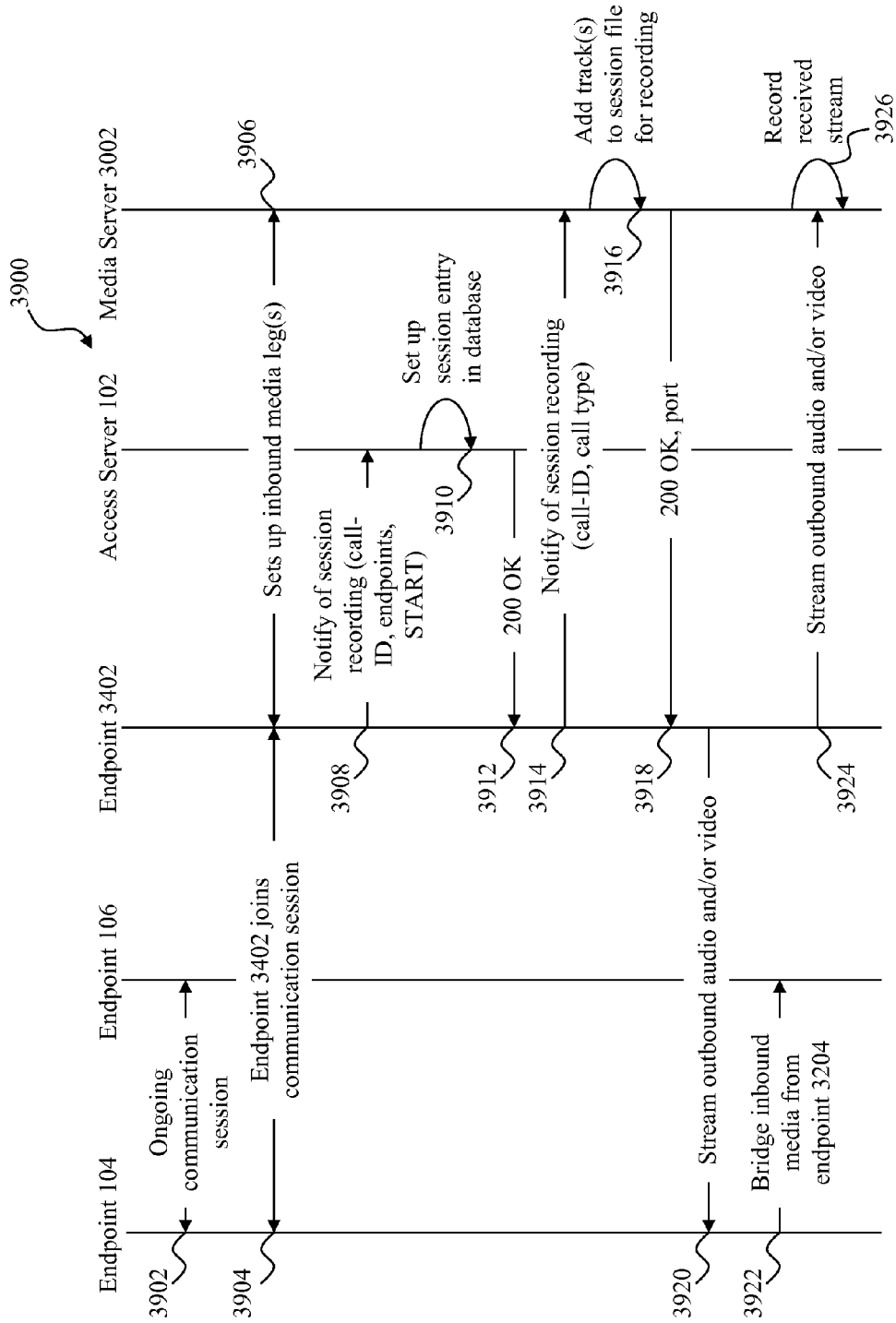
FIG. 39 is a sequence diagram illustrating one embodiment of a process that may be executed by endpoints within the environment of FIG. 38.

Referring to FIG. 39, a sequence diagram illustrates one embodiment of a message sequence 3900 that may occur in the environment of FIG. 38 in which the endpoint 3402 joins the communication session 3004, receives inbound media from the media server 3002, and sends outbound media to the endpoint 104 and to the media server 3002 to be recorded. As represented by step 3902, the communication session 3004 between the endpoints 104 and 106 is ongoing at the beginning of the message sequence 3900 and being recorded (not shown) by the media server 3002 as streamed from each endpoint 104 and 106.

In step 3904, the endpoint 3402 joins the communication session as previously described to send media to the endpoint 104. For example, the endpoint 3402 may initiate the joining (FIG. 37A) or may be invited (FIG. 37B). The endpoint 3402 also sets up a connection with the media server 3002 in order to receive audio from the endpoints 104 and 106 via the media server 3002. As the processes of steps 3904 and 3906 are described in previous embodiments, they are not described in detail in the present example.

In step 3908, the endpoint 3402 notifies the access server 102 that the endpoint 3402 is going to record its outbound media for the communication session 3004. The notification of step 3908 may include information to be used by the access server 102 such as the unique identifier (e.g., the call-ID) of the communication session 3004, the endpoints involved in the call (e.g., endpoint 3402 to endpoints 104 and 106), and one or more commands such as START to indicate that recording is to begin.

Although not shown, recording of the audio stream of the endpoint 3402 may be initiated by the endpoint 3402, by the endpoint 104 (either with or without consultation as described with respect to FIG. 33), by the endpoint 106, automatically (e.g., all communications sessions are recorded or all participants in a communications session that is being recorded are automatically recorded), or based on other criteria.

In step 3910, the access server 102 sets up an entry for the endpoint 3402 and the communication session 3004 in the database 206 or in another memory. As with the entries previously described with respect to the endpoints 104 and 106, the access server 102 may create an entry for the endpoint 3402 containing information such as the originating endpoint (e.g., endpoint 106) and destination endpoint(s) (e.g., the endpoints 104 and 106), the start time of the recording session (e.g., 1800 GMT on Aug. 10, 2010), and an end time of the session when applicable. In some embodiments, the start time for the endpoint 3402 may be the time it begins recording, rather than the start time of the initial recording. Some embodiments may track both the start time of the initial recording and the start time the endpoint 3402 joined the recording and may have an entry for the initial start time and an entry for the start time of the originating endpoint for a particular entry.

The access server 102 may also update the entries for the endpoints 104 and 106 to reflect the inclusion of the endpoint 3402 in the call. The updates may simply add the endpoint 3402 to the previous entries (as shown below in Table 12), may add the endpoint 3402 to the previous entries with additional information (e.g., a time stamp to indicate when the endpoint 3402 joined the recording session), may create new entries for the endpoints 104 and 106, or may otherwise handle the addition of the endpoint 3402. Alternatively, the access server 102 may not update the previous entries for the endpoints 104 and 106 and may rely on the new entry for the endpoint 3402 to identify the endpoint 3402 and the other endpoints with which the endpoint 3402 is engaged in the communication session 3004. An example with updated entries for the endpoints 104 and 106 and a new entry for the endpoint 3402 is shown below with respect to Table 12:

TABLE 12

| Originating endpoint | Destination endpoint(s) | Call-ID | Start time | End time |
|---|---|---|---|---|
| Endpoint 104 | Endpoints 106, 3204 | 1j9GpLxk5uxtm9pr@damaka.example.com | 1800 GMT Aug. 10, 2010 | 0 |
| Endpoint 106 | Endpoints 104, 3204 | 1j9GpLxk5uxtm9pr@damaka.example.com | 1800 GMT Aug. 10, 2010 | 0 |
| Endpoint 3402 | Endpoints 104, 106 | 1j9GpLxk5uxtm9pr@damaka.example.com | 1800 GMT Aug. 10, 2010 | 0 |
| X | X | X | X | X |

In step 3912, the access server 102 responds to the endpoint 106. In the present example, the signaling occurs via SIP and so the access server 102 responds with a 200 OK message. In addition, the access server 102 may send other information needed by the endpoint 3402 in starting the recording process, such as an IP address of the media server 3002. The endpoint 3402 may already have the IP address of the media server 3402 from step 3906, but may still receive it or may receive an IP address for a different media server 3002 (not shown).

In step 3914, the endpoint 3402 notifies the media server 3002 that a recording session is to begin and sends information such as the call-ID and call type (e.g., audio, video, or audio/video). In step 3916, in the present example, the media server 3002 checks the call-ID and adds one or more additional tracks for the endpoint 3402 to the session file created previously for the recording session corresponding to the call-ID. For example, the media server 3002 may create an audio track for the endpoint 3402. An example is illustrated in Table 13 below:

TABLE 13

| Call-ID | Tracks | | | | | Start time | End time |
|---|---|---|---|---|---|---|---|
| 1j9GpLxk5uxtm9pr@damaka.example.com | Track #0 (audio for endpoint 104) | Track #1 (video for endpoint 104) | Track #2 (audio for endpoint 106) | Track #3 (video for endpoint 106) | Track #4 (audio for endpoint 3402) | 1800 GMT Aug. 10, 2010 | 0 |
| X | | | X | | | X | X |

In step 3918, the media server 3002 sends the endpoint 3402 a 200 OK message (or another message if the environment is not a SIP environment) and a port on the media server 3002 to be used by the endpoint 3402 for sending the outbound media to the media server 3002. It is noted that this may be a different port than is being used by the media server 3002 to send the audio from endpoints 104 and 106 to the endpoint 3402.

In step 3920, the endpoint 3402 sends outbound media to the endpoint 104. As illustrated by step 3922, the endpoint 104 may bridge the media to the endpoint 106 as previously described. In step 3924, the endpoint 3402 sends outbound media to the media server 3402. As indicated by arrow 3926, the media server 3002 records the received media.

Accordingly, as with the endpoints 104 and 106, the endpoint 3402 may stream or otherwise forwards live audio and/or video or other media to the media server 3002 for recording. However, in the present example, the endpoint 3402 receives inbound media corresponding to the endpoints 104 and 106 via the media server 3002 and is not coupled directly to the endpoint 106.

Figure 40:
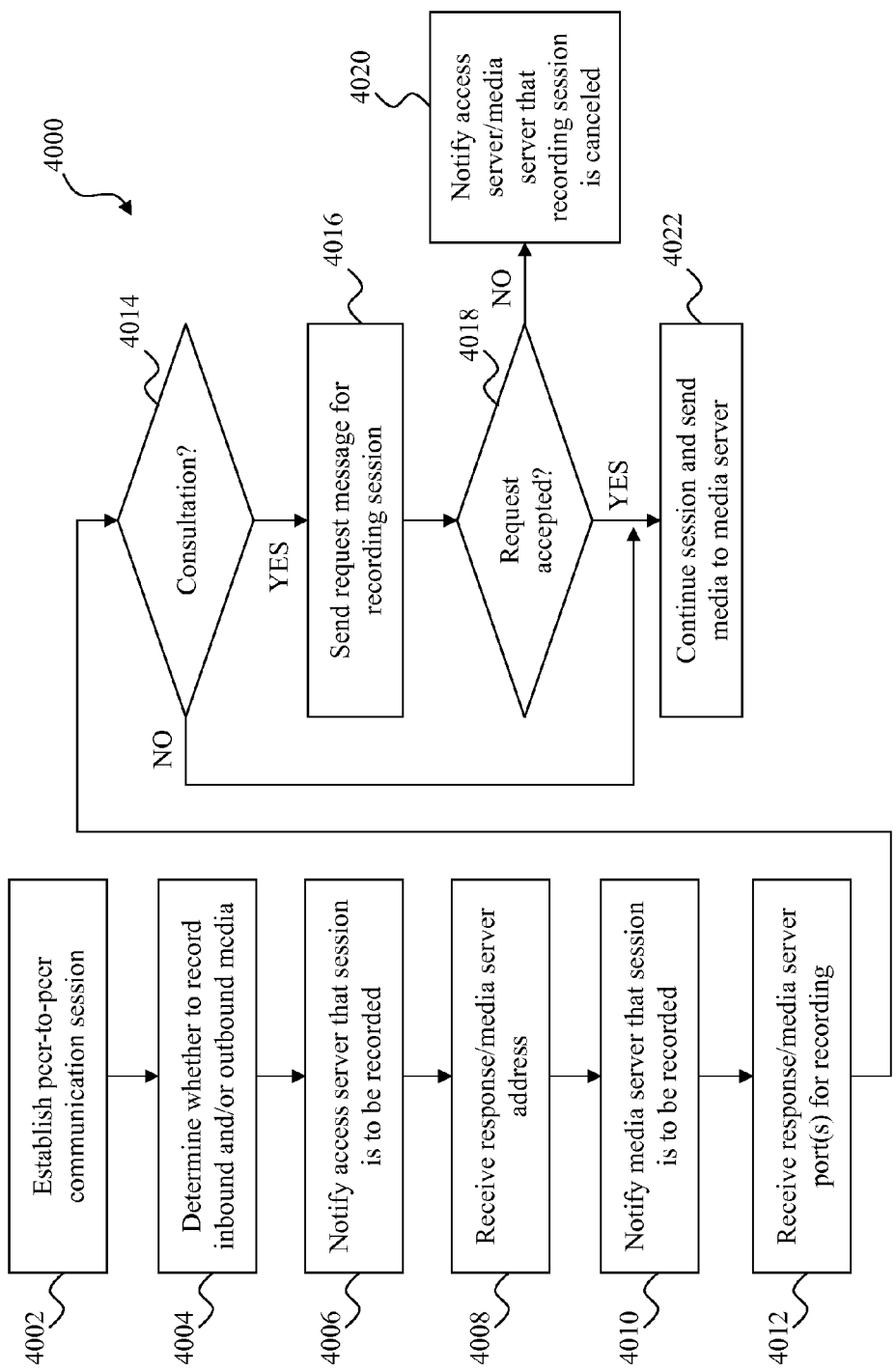
FIG. 40 is a flow chart illustrating one embodiment of a method that may be executed by an endpoint within the system of FIG. 30 to begin recording outbound and/or inbound media.

Referring to FIG. 40, in another embodiment, a flowchart illustrates one embodiment of a method 4000 that may represent a process by which an endpoint such as the endpoint 104 of FIG. 30 is involved in a communication session with the endpoint 106 and begins recording outbound and/or inbound media. Previously described FIG. 30 illustrates an example of the endpoint 104 recording only outbound media, while FIG. 32 illustrates an example of the endpoint 104 recording both outbound and inbound media.

In step 4002, the endpoint 104 establishes a peer-to-peer communication session with the endpoint 106 as described in previous embodiments. For example, the endpoint 104 logs into the access server 102, receives a profile and routing table, identifies the endpoint 106 as being available, and initiates the communication session. Alternatively, the endpoint 106 may initiate the communication session. In step 4004, the endpoint 104 determines whether only inbound media, only outbound media, or both inbound and outbound media is to be recorded. Although not shown, it is understood that a recording command may be received by the endpoint 104 prior to step 4004, whether initiated by a user, by another endpoint, by the endpoint 104 itself, or by other means.

In step 4006, the endpoint 104 notifies the access server 102 that the communication session is to be recorded. As described previously, the endpoint 104 may send a unique identifier (e.g., a call-ID) and other information to the access server 102. In step 4008, the endpoint 104 receives a response from the access server 102 that may include information such as an IP address of the media server 3002. Although not shown, it is understood that the access server 102 may deny the request and the method 4000 may end, the endpoint 104 may attempt to initiate the recording session again, or the endpoint 104 may provide additional information to the access server 102 (e.g., authentication credentials if needed for recording). In step 4010, the endpoint 104 notifies the media server 3002 that the communication session is to be recorded and, in step 4012, the endpoint 104 receives a response that may include information such as port information to which the media is to be sent.

In step 4014, the endpoint 104 may determine whether consultation is required. As previously described, consultation and non-consultation describe whether the endpoint 104 needs the permission of the endpoint 106 before the endpoint 104 can record the inbound media from the endpoint 106. If no consultation is required, the method 4000 moves to step 4022, where it continues the communication session and sends the media to be recorded to the media server 3002. In step 4016, if consultation is required, the endpoint 104 sends a request message to the endpoint 106 notifying the endpoint 106 that the endpoint 104 wants to record the media and requesting permission from the endpoint 106 to do so. A determination is made in step 4018 as to whether the request is denied or granted. If the request is denied, the method 4000 moves to step 4020 and the endpoint 104 notifies one or both of the access server 102 and media server 3002 that the recording session is canceled. If the request is granted, the method 4000 moves to step 4022, where it continues the communication session and sends the media to be recorded to the media server 3002.

In some embodiments, it is understood that the endpoint 104 may receive a message (e.g., a 200 OK) from the endpoint 106 acknowledging the recording even if consultation is not required. In other embodiments, not receiving a response from the endpoint 106 in a consultation environment may be viewed by the endpoint 104 as a denial of the recording request. In some embodiments, although not shown, it is understood that the endpoint 104 may instruct the endpoint 106 to record both inbound and outbound media. For example, the endpoint 106 may have greater bandwidth than the endpoint 104 and so may be more capable of sending the media that is to be recorded.

Figure 41:
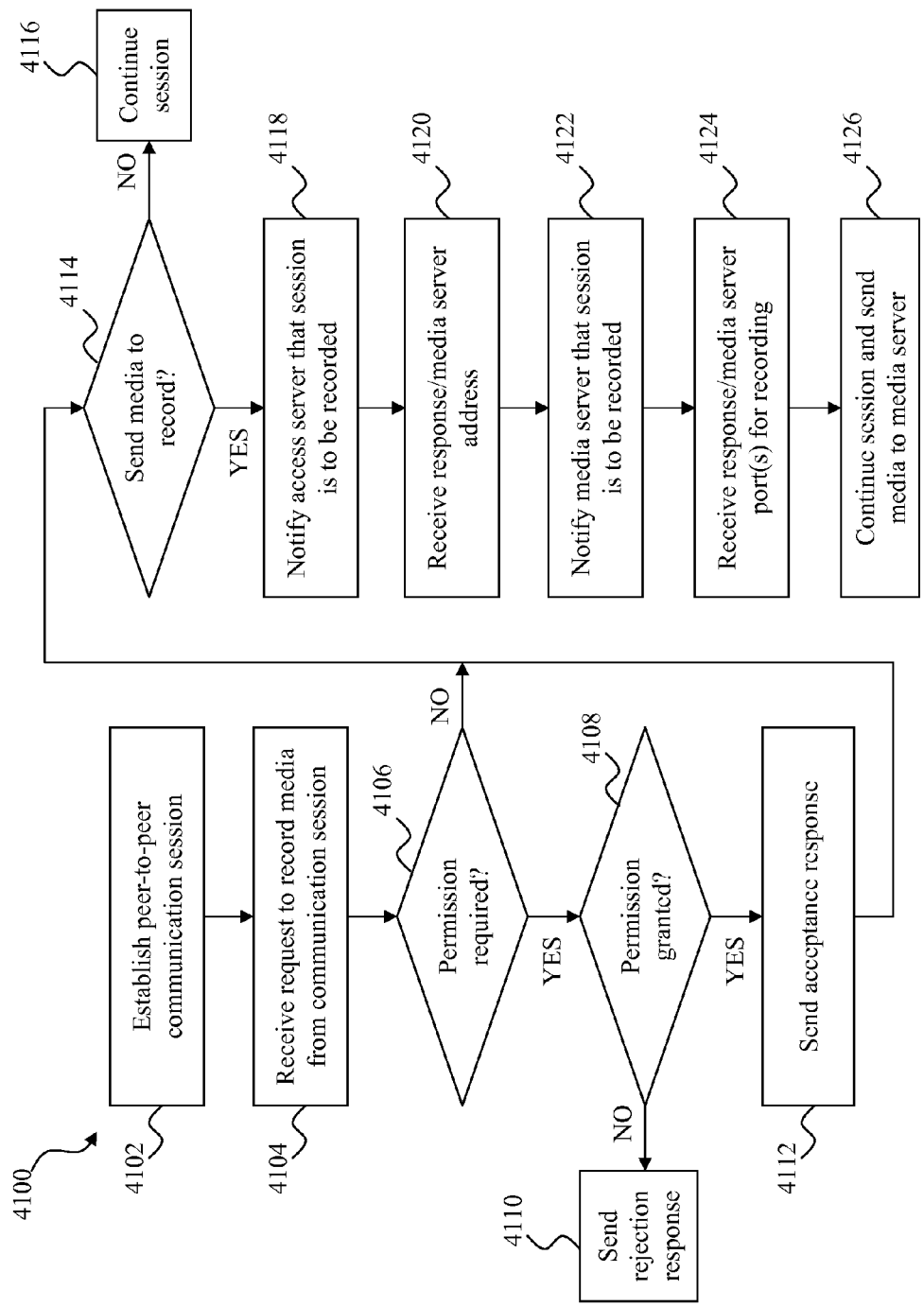
FIG. 41 is a flow chart illustrating one embodiment of a method that may be executed by an endpoint within the system of FIG. 30 to begin recording outbound media.

Referring to FIG. 41, in another embodiment, a flowchart illustrates one embodiment of a method 4100 that may represent a process by which an endpoint such as the endpoint 106 of FIG. 30 is involved in a communication session with the endpoint 104 and receives a notification to begin recording outbound media. Previously described FIGS. 30 and 32 illustrate two examples of outbound media from the endpoint 106 being recorded.

In step 4102, the endpoint 106 establishes a peer-to-peer communication session with the endpoint 104 as described in previous embodiments. For example, the endpoint 106 logs into the access server 102, receives a profile and routing table, and responds to or initiates a request for the communication session from the endpoint 104. In step 4104, the endpoint 106 receives a request from the endpoint 104 to record the media corresponding to the communication session. In step 4106, the endpoint 106 may determine whether permission is required. For example, if consultation is required, then the endpoint 106 needs to give permission to the endpoint 104 before the recording of the media from the endpoint 106 begins. If consultation is not required, then the media from the endpoint 106 may be recorded without permission.

Accordingly, if permission is required as determined in step 4106, the method 4100 moves to step 4108, where a determination is made as to whether permission is granted. If permission is not granted, the endpoint 106 sends a rejection response to the endpoint 104 in step 4110 and the method 4100 ends. If permission is granted, the endpoint 106 sends an acceptance response to the endpoint 104 in step 4112.

After sending the acceptance response in step 4112 or if permission is not required as determined in step 4106, the method 4100 moves to step 4114. In step 4114, a determination is made as to whether the endpoint 106 is to send media to the media server 3002. For example, as illustrated in FIG. 30, the endpoint 106 may send outbound media directly to the media server 3002, while FIG. 32 illustrates the endpoint 106 sending media only to the endpoint 104 for the communication session 3004 and the endpoint 104 forwarding the media to the media server 3002.

Accordingly, if the endpoint 106 is not to record media directly (as illustrated in FIG. 32), the method 4100 moves to step 4116 and the endpoint 106 remains active in the communication session but does not send outbound media to the media server 3002. If the endpoint 106 is to record media directly, the method 4100 moves to step 4118 and notifies the access server 102 that the communication session is to be recorded. As described previously, the endpoint 106 may send a unique identifier (e.g., a call-ID) and other information to the access server 102. In step 4120, the endpoint 106 receives a response from the access server 102 that may include information such as an IP address of the media server 3002. In step 4122, the endpoint 106 notifies the media server 3002 that the communication session is to be recorded and, in step 4124, the endpoint 106 receives a response that may include information such as port information to which the media is to be sent. In step 4126, the endpoint 106 continues sending outbound media to the endpoint 104 for the communication session and also sends the outbound media to the media server 3002 for recording.

Although not shown, in some embodiments, it is understood that the endpoint 106 may receive an instruction or request from the endpoint 104 to record both inbound and outbound media. In such embodiments, the endpoint 106 would also send inbound media received from the endpoint 104 to the media server 3002.

Referring to FIG. 42, in another embodiment, a flowchart illustrates one embodiment of a method 4200 that may represent a process by which an access server such as the access server 102 of FIG. 30 handles a notification from an endpoint such as the endpoint 104 that a recording session is to begin. It is understood that the functionality provided by the access server 102 in the current example may be provided by other components of a peer-to-peer hybrid system, such as the media server 3002. The access server 102 may be that same access server that authenticated the endpoint 104 when the endpoint 104 logged into the peer-to-peer network or may be a different access server.

In step 4202, the access server 102 is notified by the endpoint 104 that the endpoint 104 wants to begin recording. Although illustrated as a notification, it is understood that the notification may represent a request to the access server 102. As previously described, the notification or a later message may include information such as a unique identifier (e.g., a call-ID) and the endpoints to be involved in the call. In step 4204, the access server 102 sets up a session entry, such as that described previously with respect to Table 6. The session entry may include the endpoints involved in the recording session, the call-ID, a start time, an end time, and/or other information.

In step 4206, the access server 102 responds to the notification request. The response may include information such as an IP address of the media server 3002. As illustrated in step 4208, the access server 102 may communicate with the media server 3002 after setting up the session entry. For example, the access server 102 may communicate with the media server 3002 to obtain an end time, length of recording, and/or other information. It is understood that such communications with respect to a particular recording session may occur during and/or after the recording has ended. For example, the access server 102 may receive a request for a particular session entry and may communicate with the media server 102 to ensure that the session entry on the access server 102 is current. The access server 102 may also communicate with the media server 3002 to ensure that the media server 3002 is available for the request. If the media server 3002 is not available, the access server 102 may identify an available media server and provide that media server's IP address to the requesting endpoint. In other embodiments, the communications between the access server 102 and the media server 3002 with respect to a particular recording session may end after the recording is ended and the access server 102 is updated with the end time and/or other information. In still other embodiments, the endpoints 104 and 106 may update the access server 102 when recording is ended instead of or in addition to the media server 3002.

Referring to FIG. 43, in another embodiment, a flowchart illustrates one embodiment of a method 4300 that may represent a process by which an access server such as the access server 102 of FIG. 30 handles a request from an endpoint such as the endpoint 3402 for accessing recording session information. It is understood that the functionality provided by the access server 102 in the current example may be provided by other components of a peer-to-peer hybrid system, such as the media server 3002. For example, the endpoint 3402 may query the media server 3002 directly. The access server 102 may be that same access server that authenticated the endpoint 3402 when the endpoint 3402 logged into the peer-to-peer network or may be a different access server.

In step 4302, the access server 102 receives a request for recording session information. As previously described, the request may include one or more criteria. For example, the request may be for all recording session information corresponding to a particular endpoint (e.g., the endpoint 104), may be for all recording session information between particular endpoints (e.g., all recording sessions involving the endpoints 104 and 106), or may be for all recording sessions (e.g., for a list of recording sessions). Other criteria may also be specified, such as particular dates/times, whether the recording session is currently ongoing, etc.

In step 4304, the access server 102 identifies entries corresponding to the requested information by accessing the database 206 or other memory and retrieving the session entry or entries corresponding to the request. For example, if the requested information is for all recording sessions in which the endpoint 104 was involved on a particular date, the access server 102 may search the database for calls corresponding to the endpoint 104 on that date and retrieve the needed information from the applicable entry or entries. In step 4306, the access server 102 sends the corresponding entry information to the endpoint 3402.

Figure 44:
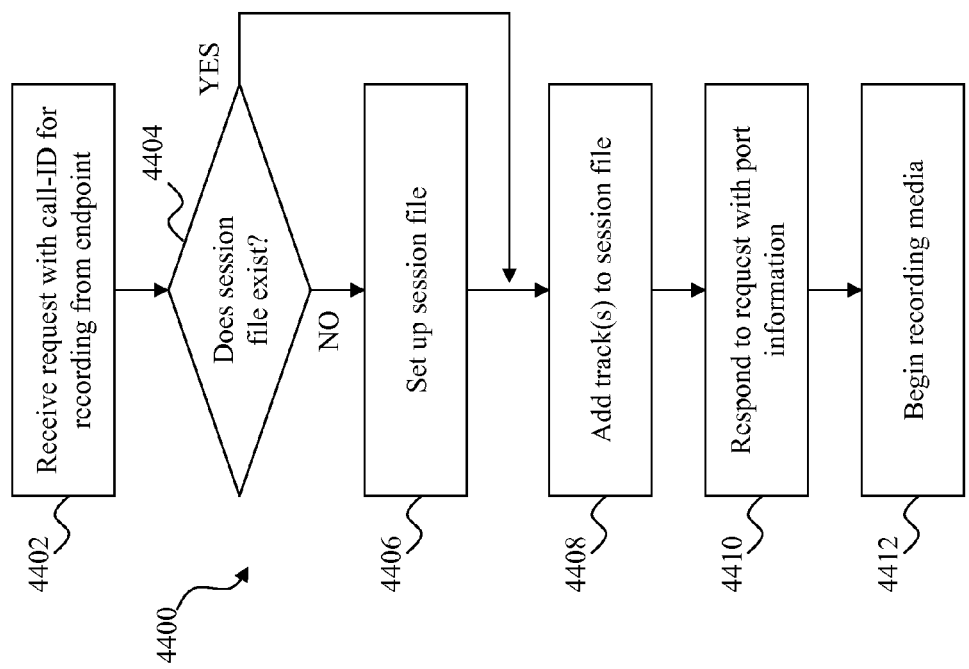
FIG. 44 is a flow chart illustrating one embodiment of a method that may be executed by a media server within the system of FIG. 30 to handle a request from an endpoint for beginning a recording session.

Referring to FIG. 44, in another embodiment, a flowchart illustrates one embodiment of a method 4400 that may represent a process by which a media server such as the media server 3002 of FIG. 30 handles a request from an endpoint such as the endpoint 104 for beginning a recording session. It is understood that at least some of the functionality provided by the media server 3002 in the current example may be provided by other components of a peer-to-peer hybrid system, such as the access server 102. For example, the endpoint 104 may request the recording session from the access server 102 and the access server 102 may then communicate with the media server 3002 to establish the session. In such cases, step 4402 and/or step 4410 would involve communication with the access server 102 rather than the endpoint 104. In the case of the endpoint 3402 of FIG. 34 requesting the recording, the media server 3002 may be that same media server from which the endpoint 3402 is receiving media corresponding to the communication session 3004 or may be a different media server.

In step 4402, the media server 3002 receives a request for beginning a recording session. The request may include such information as a unique identifier (e.g., a call-ID) of the communication session, the originating endpoint of the recording (e.g., the endpoint 104), other endpoints involved in the communication session (e.g., the endpoint 106), and other information.

It is understood that the media server 3002 may be configured to handle the storage of recording sessions in many different ways. For example, a recording session may be stored as a single file with multiple tracks as previously described. In other examples, a recording session may be stored as one or more files for each endpoint involved in the recording (e.g., a single file for an endpoint with combined audio and video, or a single file for each of the audio and video media from a single endpoint). Accordingly, the actual manner of storage may vary depending on the configuration of the media server 3002. For purposes of illustration, the recording session is stored as a single session file with multiple tracks.

Accordingly, in step 4404, a determination is made as to whether a session file already exists for the call-ID corresponding to the request. The session file would exist if, for example, another endpoint had already requested a recording session corresponding to the same call-ID. If the session file does not exist, the session file is created in step 4406 and the method 4400 then moves to step 4408. If the session file does exist, the method 4400 moves to step 4408 without executing step 4406.

In step 4408, continuing the present example of a single session file with tracks, one or more tracks are added to the session file. For example, the method 4400 may add one audio track and one video track corresponding to the endpoint 104 to the session file. In step 4410, the media server 3002 responds to the request of step 4402 with information such as port information needed by the endpoint 104 to send media to the media server 3002 for recording. In some embodiments, if the endpoint 104 already has the port information, step 4410 may be an acknowledgement that the media server 3002 is ready for recording but may not include the port information. In step 4412, the media server 3002 receives media from the endpoint 104 and stores the media in the appropriate track of the session file. As described previously, the media may be stored in the format in which it is received or it may be converted by the media server 3002 prior to storage.

Figure 45:
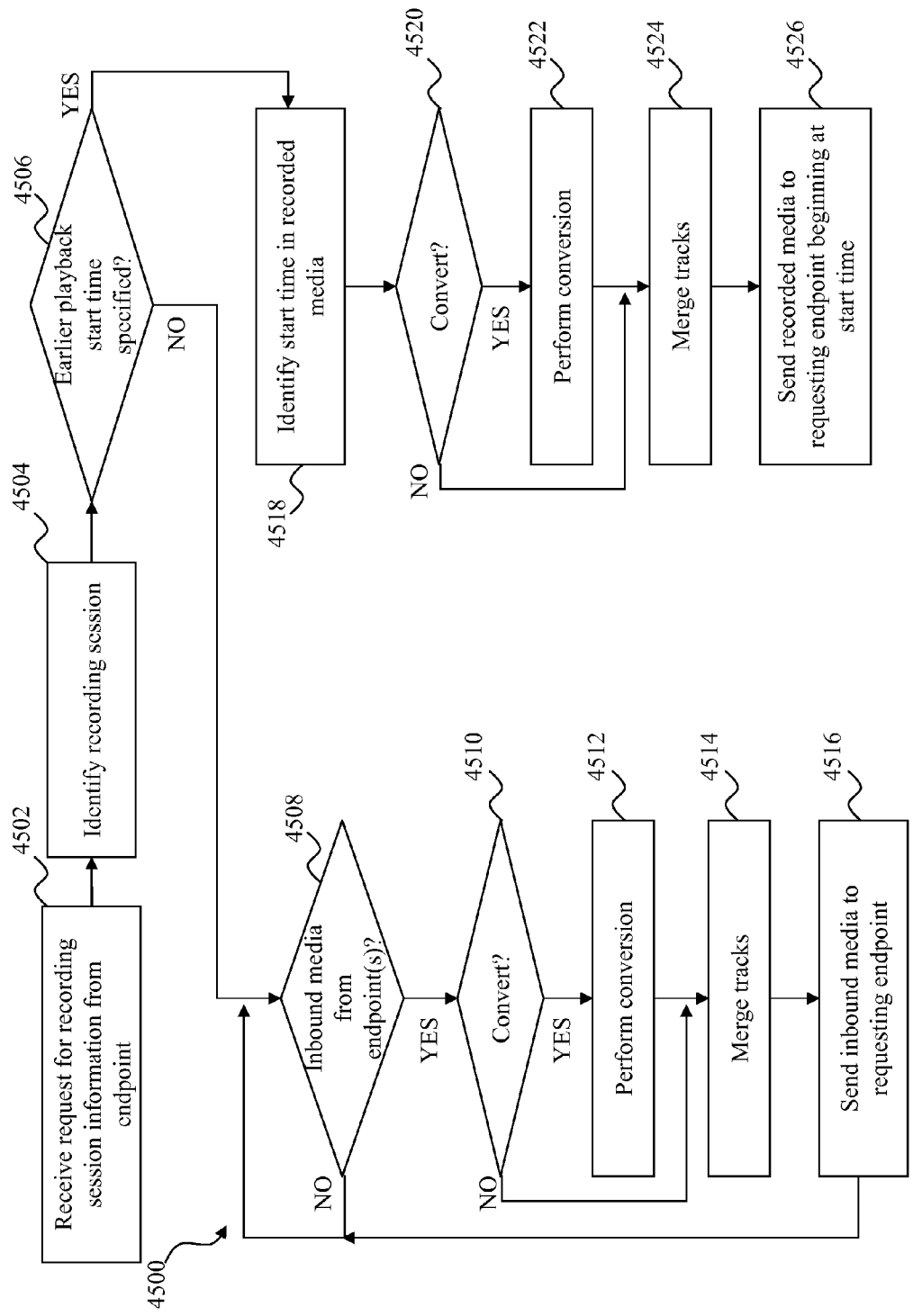
FIG. 45 is a flow chart illustrating one embodiment of a method that may be executed by a media server within the system of FIG. 30 to handle a request from an endpoint for media from a recorded and/or live recording session.

Referring to FIG. 45, in another embodiment, a flowchart illustrates one embodiment of a method 4500 that may represent a process by which a media server such as the media server 3002 of FIG. 30 handles a request from an endpoint such as the endpoint 3402 for media from a recorded and/or live recording session. It is understood that at least some of the functionality provided by the media server 3002 in the current example may be provided by other components of a peer-to-peer hybrid system, such as the access server 102. For example, the endpoint 3402 may request the media from the access server 102 and the access server 102 may then communicate with the media server 3002 to provide the media to the endpoint 3402. In such cases, step 4502 and/or steps 4518/4526 would involve communication with the access server 102 rather than the endpoint 3402. If the endpoint 3402 is recording its outbound media, the media server 3002 may be recording the outbound media from the endpoint 3402 or the endpoint 3402 may recording using a different media server.

In step 4502, a request for recording session information is received. The request may include such information as a unique identifier (e.g., a call-ID), the endpoints involved in the recording session, a start time of the recording and/or a particular time for playback to begin, that only media from a particular endpoint be provided (e.g., that media from other endpoints corresponding to the recording session be excluded), and/or other information. In some embodiments, the media server 3002 may provide information in response to a request such as that described with respect to step 4602 of FIG. 46. In step 4504, the recording session or sessions are identified. For example, the media server 3002 may search for a recording session by call-ID.

In step 4506, a determination is made as to whether an earlier (e.g., not current) playback start time is specified for the playback of the recording session. For example, if the recording is fifteen minutes long, the playback start time may indicate that the playback is to start five minutes into the recording session. The playback start time may be identified in other ways, such as when a particular endpoint started recording. In some embodiments, multiple playback times may be identified, the playback may be reversed and/or forwarded as desired (e.g., reverse and forward buttons may be provided via the endpoint 3402 to a user of the endpoint), and/or the playback may be controlled by events, such as each time a grouping of media packets from a particular endpoint was recorded (e.g., media packets separated from other media from the same endpoint by a defined amount of time such as five or more seconds or when interrupted by another endpoint's media).

If a start time is not specified as determined in step 4506, the method 4500 moves to step 4508. In the present example, if a start time is not specified, the method 4500 views the request as a request for current media from an ongoing recording session. A current start time or other means of identifying that the request is for current media may also be employed and also moves the method 4500 to step 4508. If a start time is specified, the method 4500 moves to step 4518.

In step 4508, a determination is made as to whether there is inbound media from the endpoint or endpoints corresponding to the requested recording session. If there is no inbound media, the method 4500 repeats step 4508 until media is received or until another event occurs to stop step 4508 from repeating, such as a timeout or an instruction to stop the method 4500. If there is inbound media as determined in step 4508, the method 4500 continues to step 4510.

In step 4510, a determination may be made as to whether the media needs to be converted. As described previously, the media may be stored in the same format in which it was received and/or a different format than is needed by the endpoint 3402. If no conversion is needed, the method 4500 moves to step 4514. If conversion is needed, the method 4500 converts the media in step 4512 before moving to step 4514. In step 4514, the media server 3002 merges the tracks if needed. For example, inbound media corresponding to audio from different endpoints may be merged prior to sending the audio to the endpoint 3402. In other embodiments, the media may be sent separately and merged or otherwise aligned by the endpoint 3402. On some occasions, there may be no media to merge if the media is only being received from a single endpoint. It is understood that conversion may occur before or after merging. In step 4516, the media received by the media server 3002 is sent to the endpoint 3402.

If a start time is specified as determined in step 4506, the method 4500 moves to step 4518. In step 4518, the start time is identified in the recording session. In step 4520, a determination may be made as to whether the media needs to be converted. If no conversion is needed, the method 4500 moves to step 4522. If conversion is needed, the method 4500 converts the media in step 4522 before moving to step 4524. In step 4524, the media server 3002 merges the tracks if needed. In step 4526, the recorded media is sent to the endpoint 3402 starting at the identified playback start time.

Figure 46:
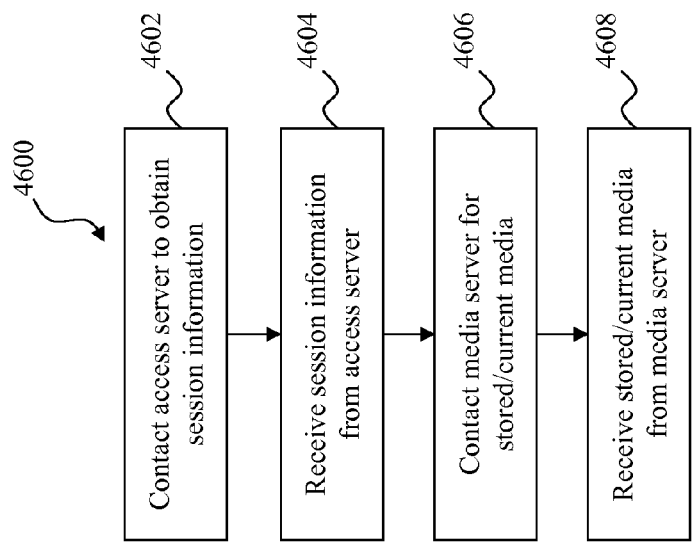
FIG. 46 is a flow chart illustrating one embodiment of a method that may be executed by an endpoint within the system of FIG. 30 to obtain media from a recorded and/or live recording session.

Referring to FIG. 46, in another embodiment, a flowchart illustrates one embodiment of a method 4600 that may represent a process by which an endpoint such as the endpoint 3402 of FIG. 30 obtains media from a recorded and/or live recording session. It is understood that at least some of the functionality provided by the access server 102 and/or media server 3002 in the current example may be provided by other components of a peer-to-peer hybrid system, such as the media server 3002 and access server 102, respectively. For example, the endpoint 3402 may request the media from the access server 102 and the access server 102 may then communicate with the media server 3002 to provide the media to the endpoint 3402. In such cases, steps 4606 and/or 4608 would involve communication with the access server 102 rather than the media server 3002. In another example, the endpoint 3402 may request the session information directly from the media server 3002. In such cases, steps 4602 and 4604 would involve communication with the media server 3002 rather than the access server 102. The access server 102 may be the same access server that authenticated the endpoint 3402 when the endpoint 3402 logged into the peer-to-peer network or may be a different access server. The media server 3002 may be the same media server that is recording media from the endpoint 3402 or may be a different media server.

In step 4602, the endpoint 3402 contacts the access server 102 for session information. As described previously, the request may define different criteria for identifying one or more endpoints or recording sessions, including a unique identifier (e.g., a call-ID), a time or a range of times in which a communication session occurred, and other information that may be used to select a particular recording session. In step 4604, the session information is received from the access server 102. Although not shown, it is understood that the method 4600 may include additional or alternate steps if session information matching the defined criteria does not exist or if the access server 102 requests additional information. For example, if the session information does not exist, a message may be received from the access server 102 indicating that the session information cannot be found. In another example, a request for additional information may be received from the access server 102 to select a recording session from multiple recording sessions or to specify that information pertaining to all of the recording sessions is desired.

In step 4606, the media server 3002 is contacted to obtain the media for the recording session. As described previously, the request may obtain information such as the call-ID, a playback starting time to obtain stored media or a current starting time to obtain media that is currently being received by the media server 3002, and other information. Step 4606 may also include receiving information corresponding to one or more ports from the media server 3002. In step 4608, the endpoint 3402 begins receiving media from the media server 3002.

Figure 47:
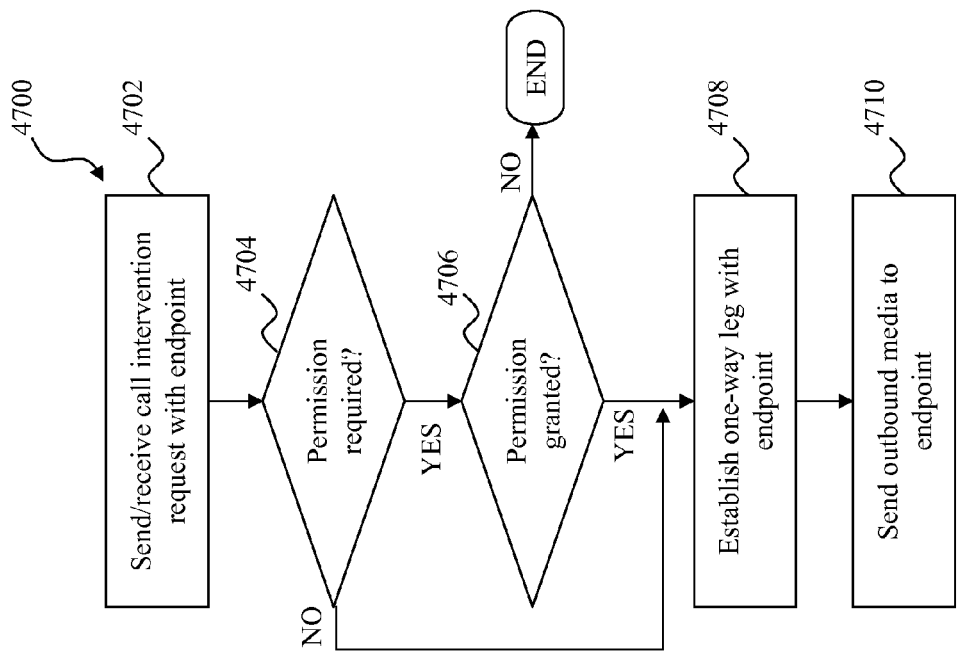
FIG. 47 is a flow chart illustrating one embodiment of a method that may be executed by an endpoint within the system of FIG. 30 to send media into a communication session.

Referring to FIG. 47, in another embodiment, a flowchart illustrates one embodiment of a method 4700 that may represent a process by which an endpoint such as the endpoint 3402 of FIG. 30 sends media into a communication session such as the communication session 3004. Although not shown, it is understood in alternative embodiments that the endpoint 3402 may contact multiple endpoints and may send media directly to those endpoints as described in previous embodiments corresponding to direct peer-to-peer communications. It is further understood that, during the execution of the method 4700, the endpoint 3402 may be receiving media corresponding to the communication session from the media server 3002 as previously described.

In step 4702, the endpoint 3402 communicates with the endpoint 104 in order to send media to the endpoint 104. As described previously, the endpoint 3402 may initiate the communications or the endpoint 104 may initiate the communications. Furthermore, the environment may be a consultation environment where the non-initiating endpoint has to grant permission or a non-consultation environment where no such permission is needed. Accordingly, in step 4704, a determination may be made as to whether permission is needed. If permission is not needed, the method 4700 moves to step 4708. If permission is needed, the method 4700 moves to step

4706, where a determination is made as to whether permission has been granted. For example, if the endpoint 3402 is the initiating endpoint, the endpoint 3402 may send a message to the endpoint 104 requesting permission and may receive a message from the endpoint 104 either approving or denying permission. If the endpoint 104 is the initiating endpoint, the endpoint 3402 may receive a message from the endpoint 104 requesting permission and may send a message to the endpoint 104 either approving or denying permission. If permission is denied, the method 4700 ends. If permission is granted, the method 4700 moves to step 4708.

In step 4708, the endpoint 3402 establishes a one-way leg with the endpoint 104. In some embodiments, the leg may be capable of handling two-way traffic between the endpoints 3402 and 104 even though the traffic will only flow from the endpoint 3402 to the endpoint 104. In step 4710, the endpoint 3402 sends outbound media to the endpoint 104 via the leg. As described previously, the endpoint 104 may then provide a bridge and send the media to the endpoint 106.

Figure 48:
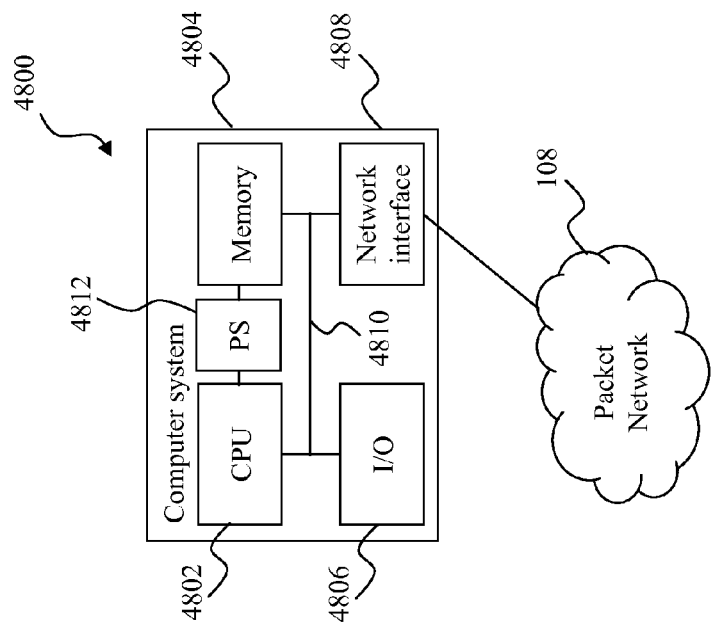
FIG. 48 is a simplified diagram of one embodiment of a computer system that may be used in embodiments of the present disclosure.

Referring to FIG. 48, one embodiment of a computer system 4800 is illustrated. The computer system 4800 is one possible example of a system component or device such as an endpoint, an access server, or a shadow server. The computer system 4800 may include a central processing unit ("CPU") 4802, a memory unit 4804, an input/output ("I/O") device 4806, and a network interface 4808. The components 4802, 4804, 4806, and 4808 are interconnected by a transport system (e.g., a bus) 4810. A power supply (PS) 4812 may provide power to components of the computer system 4800, such as the CPU 4802 and memory unit 4804. It is understood that the computer system 4800 may be differently configured and that each of the listed components may actually represent several different components. For example, the CPU 4802 may actually represent a multi-processor or a distributed processing system; the memory unit 4804 may include different levels of cache memory, main memory, hard disks, and remote storage locations; the I/O device 4806 may include monitors, keyboards, and the like; and the network interface 4808 may include one or more network cards providing one or more wired and/or wireless connections to the packet network 108 (FIG. 1). Therefore, a wide range of flexibility is anticipated in the configuration of the computer system 4800.

The computer system 4800 may use any operating system (or multiple operating systems), including various versions of operating systems provided by Microsoft (such as WINDOWS), Apple (such as Mac OS X), UNIX, and LINUX, and may include operating systems specifically developed for handheld devices, personal computers, and servers depending on the use of the computer system 4800. The operating system, as well as other instructions (e.g., for the endpoint engine 252 of FIG. 2b if an endpoint), may be stored in the memory unit 4804 and executed by the processor 4802. For example, if the computer system 4800 is the access server 102, media server 3202, or an endpoint (e.g., one of the endpoints 104, 106, and 3402), the memory unit 4804 may include instructions for performing functions as described herein with respect to the various embodiments illustrated in sequence diagrams and flowcharts.

In another embodiment, a method for receiving, by a first endpoint, communications in an ongoing peer-to-peer communication session between a second endpoint and a third endpoint in a hybrid peer-to-peer network comprises sending, by the first endpoint, a first request to an access server in the hybrid peer-to-peer network, wherein the first request includes information that enables the access server to identify a session entry corresponding to the ongoing communication session from a plurality of session entries corresponding to a plurality of communication sessions; receiving, by the first endpoint, a response to the first request from the access server, wherein the response includes a network address for a media server; sending, by the first endpoint, a second request to the media server, wherein the second request includes information that enables the media server to identify a recording session corresponding to the ongoing communication session from a plurality of recording sessions corresponding to a plurality of communication sessions, wherein the plurality of recording sessions are stored on the media server and wherein each recording session includes communications sent to the media server for recording by at least one endpoint in each of the plurality of communication sessions; and receiving, by the first endpoint via the media server, peer-to-peer communications from the ongoing communication session between the second and third endpoints, wherein the first endpoint does not communicate with either of the second and third endpoints to receive the peer-to-peer communications. The method may further comprise establishing, by the first endpoint, a communication leg directly with the second endpoint; and sending, by the first endpoint, outbound communications from the first endpoint directly to the second endpoint. The method may further comprise sending, by the first endpoint, a request to the second endpoint for the first endpoint to join in the ongoing communication session; and receiving, by the first endpoint, an approval of the request from the second endpoint, wherein the communication leg is established only after the approval is received. The method may further comprise receiving, by the first endpoint, a request from the second endpoint for the first endpoint to join in the ongoing communication session; and sending, by the first endpoint, an approval of the request to the second endpoint, wherein the communication leg is established only after the approval is sent. The method may further comprise requesting, by the first endpoint, that the second endpoint provide a bridge between the first endpoint and the third endpoint for communications sent by the first endpoint via the communication leg. The method may further comprise sending, by the first endpoint, a third request to the media server, wherein the third request includes information indicating that the first endpoint intends to begin recording the outbound communications from the first endpoint and information that enables the media server to prepare to record the outbound communications from the first endpoint; receiving, by the first endpoint, a response to the third request by the media server indicating that the media server is prepared to receive the outbound communications from the first endpoint; and sending, by the first endpoint, the outbound communications to the media server in addition to sending the outbound communications to the second endpoint. The method may further comprise sending, by the first endpoint, a fourth request to the access server, wherein the fourth request includes information indicating that the first endpoint intends to begin recording the outbound communications from the first endpoint. The method may further comprise receiving, by the first endpoint, a message from the second endpoint instructing the first endpoint to initiate the recording of the outbound communications from the first endpoint. The method may further comprise receiving, by the first endpoint, a permission request from the second endpoint, wherein the permission request requires approval by the first endpoint before the first endpoint initiates the recording of the outbound communications from the first endpoint; and approving, by the first endpoint, the permission request prior sending the third request to the media server. The method may further comprise receiving, by the first endpoint, a permission request from the second endpoint, wherein the permission request requires approval by the first endpoint before the second endpoint initiates recording of the outbound communications from the first endpoint; and sending, by the first endpoint, one of an approval message and a rejection message to the second endpoint in response to the permission request. The method may further comprise sending, by the first endpoint, a notification message directly to the second endpoint indicating that the first endpoint is receiving the peer-to-peer communications from the ongoing communication session between the second endpoint and the third endpoint. The method may further comprise inserting, by the first endpoint, a unique identifier into at least one of the first and second requests, wherein the unique identifier distinguishes the ongoing communication session from a plurality of other communication sessions within the hybrid peer-to-peer network. The method may further comprise inserting, by the first endpoint, a playback start time into the second request, wherein the playback start time indicates a time in the recording session corresponding to the ongoing communication session at which to begin sending communications corresponding to the ongoing communication session from the media server to the first endpoint. The playback start time may indicate that only communications that correspond to the ongoing communication session and are currently being received by the media server are to be sent to the first endpoint. The playback start time may be prior to the current time. The method may further comprise extracting from the response from the access server, by the first endpoint, information indicating that the third endpoint is involved in the ongoing communication session; and inserting, by the first endpoint, the information indicating that the third endpoint is involved in the ongoing communication session into the second request. The method may further comprise sending, by the first endpoint, the first and second requests to a single network address within the hybrid peer-to-peer network.

In another embodiment, a method for joining, by a first endpoint, an ongoing peer-to-peer communication session between a second endpoint and a third endpoint in a hybrid peer-to-peer network comprises identifying, by the first endpoint, the ongoing communication session from a plurality of communication sessions; obtaining from a server, by the first endpoint, first communications occurring between the second and third endpoints that correspond to the ongoing communication session, wherein the server is configured to receive the first communications from the first and second endpoints for recording; establishing, by the first endpoint, a communication leg directly with the second endpoint, wherein the communication leg is capable of carrying second communications from the first endpoint to the second endpoint; and sending, by the first endpoint, the second communications to the second endpoint. The method may further comprise receiving, by the first endpoint, a request from the second endpoint that the first endpoint join the ongoing communication session. The method may further comprise sending, by the first endpoint, a request to the second endpoint that the first endpoint be allowed to join the ongoing communication session, wherein the identifying occurs prior to sending the request. The method may further comprise sending, by the first endpoint, a notification to the second endpoint that the first endpoint is joining the ongoing communication session, wherein the identifying occurs prior to sending the request. The method may further comprise notifying the server, by the first endpoint, that the first endpoint intends to record the second communications; and sending the second communications to the server in addition to the second endpoint.

In another embodiment, an endpoint device comprises a network interface; a processor coupled to the network interface; and a memory coupled to the processor and containing a plurality of instructions for execution by the processor, the instructions including instructions for: receiving a first request to obtain communications from an ongoing communication session between first and second endpoints in a hybrid peer-to-peer network; sending a second request to a server within the hybrid peer-to-peer network, wherein the second request includes information that enables the server to identify a recording session corresponding to the ongoing communication session from a plurality of recording sessions corresponding to a plurality of communication sessions, wherein the plurality of recording sessions are stored on the server and wherein each recording session includes communications sent to the server for recording by at least one endpoint in each of the plurality of communication sessions; and receiving, by the endpoint device via the server, peer-to-peer communications from the ongoing communication session between the first and second endpoints, wherein the endpoint device does not communicate with either of the first and second endpoints to receive the peer-to-peer communications. The endpoint device may also comprise instructions for: establishing a communication leg with only the first endpoint of the first and second endpoints; and sending outbound communications directly to the first endpoint via the communication leg. The endpoint device may also comprise instructions for: sending a third request to the server, wherein the third request includes information indicating that the endpoint device intends to begin recording the outbound communications; receiving a response to the third request by the server indicating that the server is prepared to receive the outbound communications; and sending the outbound communications to the server in addition to sending the outbound communications to the first endpoint. The endpoint device may also comprise instructions for requesting that the first endpoint provide a bridge between the endpoint device and the second endpoint in order to send the outbound communications to the second endpoint via the communication leg.

In another embodiment, a method for recording, by a server in a hybrid peer-to-peer network, communications in an ongoing peer-to-peer communication session between a first endpoint and a second endpoint in the hybrid peer-to-peer network comprises receiving, by the server, a first request from the first endpoint to initiate a first recording session for the ongoing communication session, wherein the first request includes a unique identifier of the ongoing communication session in the hybrid peer-to-peer network and address information of the first endpoint; designating, by the server, recording storage for the first recording session; sending, by the server, a notification to the first endpoint that the server is prepared to begin the first recording session; receiving, by the server, first communications from the first endpoint corresponding to the ongoing communication session; and storing, by the server, the first communications from the first endpoint in the recording storage. The first communications may include inbound and outbound communications from the first endpoint. The method may also comprise receiving, by the server, a second request from the second endpoint to initiate a second recording session for the ongoing communication session, wherein the second request includes the unique identifier of the ongoing communication session and address information of the second endpoint; designating, by the server, recording storage for the second recording session; sending, by the server, a notification to the second endpoint that the server is prepared to begin the second recording session; receiving, by the server, second communications from the second endpoint corresponding to the ongoing communication session; and storing, by the server, the second communications from the second endpoint in the recording storage, wherein the first and second communications are outbound communications of the first and second endpoints, respectively. The method may also comprise establishing, by the server, a recording session file for the first recording session; determining, by the server, that the recording session file exists after receiving the second request; and adding, by the server, the second recording session to the recording session file. The method may also comprise receiving, by the server, a third request from a third endpoint for access to the first recording session; and sending, by the server, communications from the first recording session to the third endpoint. The server may send the communications from the first recording session to the third endpoint as the communications for the first recording session are received by the server. The method may also comprise extracting, by the server, a playback start time from the third request; and sending to the third endpoint, by the server, the communications from the first recording session starting at a time in the first recording session that corresponds to the identified playback start time. The method may also comprise receiving, by the server, a fourth request from the third endpoint to initiate a third recording session for the ongoing communication session, wherein the third request includes the unique identifier of the ongoing communication session and address information of the third endpoint; designating, by the server, recording storage for the third recording session; sending, by the server, a notification to the third endpoint that the server is prepared to begin the third recording session; receiving, by the server, third communications from the third endpoint corresponding to the ongoing communication session; and storing, by the server, the third communications from the third endpoint in the recording storage. The method may also comprise identifying, by the server, that multiple recordings of a single file type are present in the first recording session; and merging, by the server, the multiple recordings prior to sending the communications from the first recording session to the third endpoint. The method may also comprise receiving, by the server, a specific file type in which the communications from the first recording session are to be sent from the server to the third endpoint; and converting, by the server, the communications from the first recording session to the specific file type if the communications from the first recording session are not already stored as the specific file type. The communications from the first recording session may be stored as an identical type as a file type in which the communications from the first recording session were received. The server may be a media server and the method may further comprise receiving, by the server, a request for updated information corresponding to the recording session file from an access server in the peer-to-peer hybrid network; and sending, by the server, the updated information to the access server. The updated information may include an end time of the ongoing communication session.

While the preceding description shows and describes one or more embodiments, it will be understood by those skilled in the art that various changes in form and detail may be made therein without departing from the spirit and scope of the present disclosure. For example, various steps illustrated within a particular sequence diagram or flow chart may be combined or further divided. In addition, steps described in one diagram or flow chart may be incorporated into another diagram or flow chart. Furthermore, the described functionality may be provided by hardware and/or software, and may be distributed or combined into a single platform. Additionally, functionality described in a particular example may be achieved in a manner different than that illustrated, but is still encompassed within the present disclosure. Therefore, the claims should be interpreted in a broad manner, consistent with the present disclosure.

What is claimed is:

1. A method for receiving, by a first endpoint, communications in an ongoing peer-to-peer communication session between a second endpoint and a third endpoint in a hybrid peer-to-peer network comprising:
    sending, by the first endpoint, a first request to an access server in the hybrid peer-to-peer network, wherein the first request includes information that enables the access server to identify a session entry corresponding to the ongoing communication session from a plurality of session entries corresponding to a plurality of communication sessions, wherein the session entry exists only because one of the second and third endpoints submitted a recording request to the access server for the ongoing communication session;
    receiving, by the first endpoint, a response to the first request from the access server, wherein the response includes a network address for a media server;
    sending, by the first endpoint, a second request to the media server, wherein the second request includes information that enables the media server to identify a recording session corresponding to the ongoing communication session from a plurality of recording sessions corresponding to a plurality of communication sessions, wherein the plurality of recording sessions are stored on the media server and wherein each recording session includes communications sent to the media server for recording by at least one endpoint in each of the plurality of communication sessions as a separate stream from the peer-to-peer communication session; and
    receiving, by the first endpoint via the media server, peer-to-peer communications from the ongoing communication session between the second and third endpoints, and wherein the first endpoint does not communicate with either of the second and third endpoints to receive the peer-to-peer communications.

2. The method of claim 1 further comprising:
    establishing, by the first endpoint, a communication leg directly with the second endpoint; and
    sending, by the first endpoint, outbound communications from the first endpoint directly to the second endpoint.

3. The method of claim 2 further comprising:
    sending, by the first endpoint, a request to the second endpoint for the first endpoint to join in the ongoing communication session; and
    receiving, by the first endpoint, an approval of the request from the second endpoint, wherein the communication leg is established only after the approval is received.

4. The method of claim 2 further comprising:
    receiving, by the first endpoint, a request from the second endpoint for the first endpoint to join in the ongoing communication session; and
    sending, by the first endpoint, an approval of the request to the second endpoint, wherein the communication leg is established only after the approval is sent.

5. The method of claim 2 further comprising requesting, by the first endpoint, that the second endpoint provide a bridge between the first endpoint and the third endpoint for communications sent by the first endpoint via the communication leg.

6. The method of claim 2 further comprising:
    sending, by the first endpoint, a third request to the media server, wherein the third request includes information indicating that the first endpoint intends to begin recording the outbound communications from the first endpoint and information that enables the media server to prepare to record the outbound communications from the first endpoint;

receiving, by the first endpoint, a response to the third request by the media server indicating that the media server is prepared to receive the outbound communications from the first endpoint; and sending, by the first endpoint, the outbound communications to the media server in addition to sending the outbound communications to the second endpoint.

7. The method of claim 6 further comprising sending, by the first endpoint, a fourth request to the access server, wherein the fourth request includes information indicating that the first endpoint intends to begin recording the outbound communications from the first endpoint.

8. The method of claim 6 further comprising receiving, by the first endpoint, a message from the second endpoint instructing the first endpoint to initiate the recording of the outbound communications from the first endpoint.

9. The method of claim 6 further comprising:

receiving, by the first endpoint, a permission request from the second endpoint, wherein the permission request requires approval by the first endpoint before the first endpoint initiates the recording of the outbound communications from the first endpoint; and approving, by the first endpoint, the permission request prior sending the third request to the media server.

10. The method of claim 2 further comprising:

receiving, by the first endpoint, a permission request from the second endpoint, wherein the permission request requires approval by the first endpoint before the second endpoint initiates recording of the outbound communications from the first endpoint; and sending, by the first endpoint, one of an approval message and a rejection message to the second endpoint in response to the permission request.

11. The method of claim 1 further comprising sending, by the first endpoint, a notification message directly to the second endpoint indicating that the first endpoint is receiving the peer-to-peer communications from the ongoing communication session between the second endpoint and the third endpoint.

12. The method of claim 1 further comprising inserting, by the first endpoint, a unique identifier into at least one of the first and second requests, wherein the unique identifier distinguishes the ongoing communication session from a plurality of other communication sessions within the hybrid peer-to-peer network.

13. The method of claim 1 further comprising inserting, by the first endpoint, a playback start time into the second request, wherein the playback start time indicates a time in the recording session corresponding to the ongoing communication session at which to begin sending communications corresponding to the ongoing communication session from the media server to the first endpoint.

14. The method of claim 13 wherein the playback start time indicates that only communications that correspond to the ongoing communication session and are currently being received by the media server are to be sent to the first endpoint.

15. The method of claim 13 wherein the playback start time is prior to the current time.

16. The method of claim 1 further comprising:

extracting from the response from the access server, by the first endpoint, information indicating that the third endpoint is involved in the ongoing communication session; and inserting, by the first endpoint, the information indicating that the third endpoint is involved in the ongoing communication session into the second request.

17. The method of claim 1 further comprising sending, by the first endpoint, the first and second requests to a single network address within the hybrid peer-to-peer network.

18. A method for joining, by a first endpoint, an ongoing peer-to-peer communication session between a second endpoint and a third endpoint in a hybrid peer-to-peer network comprising:

identifying, by the first endpoint, the ongoing communication session from a plurality of communication sessions based on a session entry corresponding to the ongoing communication session on a server, wherein the session entry identifies that the second endpoint is sending outbound media corresponding to the ongoing communication session to both the third endpoint and to the server;

obtaining from the server, by the first endpoint, first media communications occurring between the second and third endpoints that correspond to the ongoing communication session, wherein the server is configured to receive the first media communications from the first and second endpoints for recording;

establishing, by the first endpoint, a communication leg directly with the second endpoint, wherein the communication leg is capable of carrying second media communications from the first endpoint to the second endpoint; and sending, by the first endpoint, the second media communications to the second endpoint and the third endpoint, wherein the second media communications are relayed to the third endpoint by the second endpoint.

19. The method of claim 18 further comprising receiving, by the first endpoint, a request from the second endpoint that the first endpoint join the ongoing communication session.

20. The method of claim 18 further comprising sending, by the first endpoint, a request to the second endpoint that the first endpoint be allowed to join the ongoing communication session, wherein the identifying occurs prior to sending the request.

21. The method of claim 18 further comprising sending, by the first endpoint, a notification to the second endpoint that the first endpoint is joining the ongoing communication session, wherein the identifying occurs prior to sending the request.

22. The method of claim 18 further comprising:

notifying the server, by the first endpoint, that the first endpoint intends to record the second communications; and sending the second communications to the server in addition to the second endpoint.

23. An endpoint device comprising:

a network interface;

a processor coupled to the network interface; and a memory coupled to the processor and containing a plurality of instructions for execution by the processor, the instructions including instructions for:

receiving a first request to obtain media communications from an ongoing communication session between first and second endpoints in a hybrid peer-to-peer network;

sending a second request to a server within the hybrid peer-to-peer network, wherein the second request includes information that enables the server to identify a recording session corresponding to the ongoing communication session from a plurality of recording sessions corresponding to a plurality of communication sessions based on a session entry corresponding to the ongoing communication session on the server, wherein the session entry identifies that the first endpoint is sending outbound media corresponding to the ongoing communication session to both the second endpoint and to the server;

obtaining from the server first media communications occurring between the first and second endpoints that correspond to the ongoing communication session, wherein the server is configured to receive the first media communications from the first and second endpoints for recording;

establishing a communication leg directly with the first endpoint, wherein the communication leg is capable of carrying second media communications to the first endpoint; and sending the second media communications to the first endpoint and the second endpoint, wherein the second media communications are relayed to the second endpoint by the third endpoint.

24. The endpoint device of claim 23 further comprising instructions for:

sending a third request to the server, wherein the third request includes information indicating that the endpoint device intends to begin recording the outbound communications;

receiving a response to the third request by the server indicating that the server is prepared to receive the outbound communications; and sending the outbound communications to the server in addition to sending the outbound communications to the first endpoint.

25. The endpoint device of claim 23 further comprising instructions for requesting that the first endpoint provide a bridge between the endpoint device and the second endpoint in order to send the outbound communications to the second endpoint via the communication leg.

26. A method for recording, by a server in a hybrid peer-to-peer network, communications in an ongoing peer-to-peer communication session between a first endpoint and a second endpoint in the hybrid peer-to-peer network comprising:

receiving, by the server, a first request from the first endpoint to initiate a first recording session for the ongoing communication session, wherein the first request includes a unique identifier of the ongoing communication session in the hybrid peer-to-peer network and address information of the first endpoint;

designating, by the server, recording storage for the first recording session;

sending, by the server, a notification to the first endpoint that the server is prepared to begin the first recording session;

receiving, by the server, first communications from the first endpoint corresponding to the ongoing communication session; and storing, by the server, the first communications from the first endpoint in the recording storage.

27. The method of claim 26 wherein the first communications include inbound and outbound communications from the first endpoint.

28. The method of claim 26 further comprising:

receiving, by the server, a second request from the second endpoint to initiate a second recording session for the ongoing communication session, wherein the second request includes the unique identifier of the ongoing communication session and address information of the second endpoint;

designating, by the server, recording storage for the second recording session;

sending, by the server, a notification to the second endpoint that the server is prepared to begin the second recording session;

receiving, by the server, second communications from the second endpoint corresponding to the ongoing communication session; and storing, by the server, the second communications from the second endpoint in the recording storage, wherein the first and second communications are outbound communications of the first and second endpoints, respectively.

29. The method of claim 28 further comprising:

establishing, by the server, a recording session file for the first recording session;

determining, by the server, that the recording session file exists after receiving the second request; and adding, by the server, the second recording session to the recording session file.

30. The method of claim 26 further comprising:

receiving, by the server, a third request from a third endpoint for access to the first recording session; and sending, by the server, communications from the first recording session to the third endpoint.

31. The method of claim 30 wherein the server sends the communications from the first recording session to the third endpoint as the communications for the first recording session are received by the server.

32. The method of claim 30 further comprising:

extracting, by the server, a playback start time from the third request; and sending to the third endpoint, by the server, the communications from the first recording session starting at a time in the first recording session that corresponds to the identified playback start time.

33. The method of claim 30 further comprising:

receiving, by the server, a fourth request from the third endpoint to initiate a third recording session for the ongoing communication session, wherein the third request includes the unique identifier of the ongoing communication session and address information of the third endpoint;

designating, by the server, recording storage for the third recording session;

sending, by the server, a notification to the third endpoint that the server is prepared to begin the third recording session;

receiving, by the server, third communications from the third endpoint corresponding to the ongoing communication session; and storing, by the server, the third communications from the third endpoint in the recording storage.

34. The method of claim 30 further comprising:

identifying, by the server, that multiple recordings of a single file type are present in the first recording session; and merging, by the server, the multiple recordings prior to sending the communications from the first recording session to the third endpoint.

35. The method of claim 30 further comprising:

receiving, by the server, a specific file type in which the communications from the first recording session are to be sent from the server to the third endpoint; and converting, by the server, the communications from the first recording session to the specific file type if the communications from the first recording session are not already stored as the specific file type.

36. The method of claim 26 wherein the communications from the first recording session are stored as an identical type as a file type in which the communications from the first recording session were received.

37. The method of claim 26 wherein the server is a media server and wherein the method further comprises:
  receiving, by the server, a request for updated information corresponding to the recording session file from an access server in the peer-to-peer hybrid network; and
  sending, by the server, the updated information to the access server.

38. The method of claim 37 wherein the updated information includes an end time of the ongoing communication session.

* * * * *